United States Patent
Jeon et al.

(10) Patent No.: US 11,219,062 B2
(45) Date of Patent: Jan. 4, 2022

(54) CHANNEL SELECTION USING A LISTEN BEFORE TALK PROCEDURE

(71) Applicant: Comcast Cable Communications, LLC, Philadelphia, PA (US)

(72) Inventors: Hyoungsuk Jeon, Centreville, VA (US); Esmael Dinan, McLean, VA (US); Alireza Babaei, Fairfax, VA (US); Hua Zhou, Herndon, VA (US); Kai Xu, Herndon, VA (US); Kyungmin Park, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/536,788

(22) Filed: Aug. 9, 2019

(65) Prior Publication Data
US 2020/0053779 A1    Feb. 13, 2020

Related U.S. Application Data

(60) Provisional application No. 62/716,895, filed on Aug. 9, 2018.

(51) Int. Cl.
*H04W 74/08* (2009.01)
*H04B 17/318* (2015.01)
(Continued)

(52) U.S. Cl.
CPC ...... *H04W 74/0808* (2013.01); *H04B 7/0695* (2013.01); *H04B 17/318* (2015.01);
(Continued)

(58) Field of Classification Search
CPC ............. H04W 74/0808; H04W 16/14; H04W 72/042; H04W 74/02; H04W 74/0833;
(Continued)

(56) References Cited

U.S. PATENT DOCUMENTS

| 8,229,494 B1 | 7/2012 | Kela et al. |
| 8,451,781 B2 | 5/2013 | Jeong et al. |

(Continued)

OTHER PUBLICATIONS

"Text Proposal to TR 38.804 on Random Access Procedure," Spokane, WA, 3GPP TSG-RAN WG2 NR Ad Hoc, R2-1700416, Jan. 17-19, 2017, Source: Ericsson.
(Continued)

*Primary Examiner* — Charles C Jiang
*Assistant Examiner* — Shawn D Miller
(74) *Attorney, Agent, or Firm* — Banner & Witcoff, Ltd.

(57) ABSTRACT

Wireless communications between a base station and one or more wireless devices are described. Multiple downlink reference signals may correspond to multiple random access resources for a random access procedure. A base station may provide a set of downlink reference signals before a set of physical random access channels (PRACHs) are available for use. A wireless device performing a random access procedure may select two or more random access resource occasions (e.g., PRACH occasions) based on the downlink reference signals. Using a listen before talk (LBT) procedure, the wireless device may select a first available random access resource occasion from the two or more random access resource occasions that are determined to be clear.

24 Claims, 34 Drawing Sheets

(51) Int. Cl.
  *H04B 7/06* (2006.01)
  *H04L 1/00* (2006.01)
  *H04L 5/00* (2006.01)
  *H04W 16/14* (2009.01)
  *H04W 72/04* (2009.01)
  *H04W 74/02* (2009.01)

(52) U.S. Cl.
  CPC .......... *H04L 1/0026* (2013.01); *H04L 5/0051* (2013.01); *H04W 16/14* (2013.01); *H04W 72/042* (2013.01); *H04W 74/02* (2013.01); *H04W 74/0833* (2013.01)

(58) Field of Classification Search
  CPC ... H04B 17/318; H04B 7/0695; H04L 1/0026; H04L 5/0051; H04L 5/0094; H04L 5/0053; H04L 5/0048
  USPC .......................................................... 370/329
  See application file for complete search history.

(56) References Cited

U.S. PATENT DOCUMENTS

| | | | |
|---|---|---|---|
| 8,494,572 | B2 | 7/2013 | Chen et al. |
| 9,008,050 | B2 | 4/2015 | Feuersanger et al. |
| 9,609,499 | B2 | 3/2017 | Shukla |
| 9,930,700 | B2 | 3/2018 | Wang et al. |
| 10,142,980 | B2 | 11/2018 | Radulescu et al. |
| 2012/0069788 | A1 | 3/2012 | Shen et al. |
| 2012/0149422 | A1 | 6/2012 | Ye et al. |
| 2015/0110072 | A1 | 4/2015 | Kato et al. |
| 2016/0150445 | A1 | 5/2016 | Sandhu et al. |
| 2016/0330740 | A1 | 11/2016 | Uchino et al. |
| 2017/0006640 | A1 | 1/2017 | Dinan |
| 2017/0041841 | A1 | 2/2017 | Pedersen et al. |
| 2017/0273056 | A1* | 9/2017 | Papasakellariou .. H04W 52/143 |
| 2018/0110074 | A1 | 4/2018 | Akkarakaran et al. |
| 2018/0115981 | A1 | 4/2018 | Kim et al. |
| 2018/0213386 | A1* | 7/2018 | Kim ..................... H04J 11/0086 |
| 2018/0270869 | A1 | 9/2018 | Tsai |
| 2019/0053080 | A1* | 2/2019 | Ryu .................. H04W 72/0413 |
| 2019/0058629 | A1* | 2/2019 | Akoum ............... H04W 56/001 |
| 2019/0075598 | A1 | 3/2019 | Li et al. |
| 2019/0173740 | A1 | 6/2019 | Zhang et al. |
| 2020/0092785 | A1* | 3/2020 | Yang ..................... H04W 76/19 |

OTHER PUBLICATIONS

"Discussions on 2 Steps RACH Procedure," Spokane, WA, 3GPP TSG RAN WG2 Meeting AH_NR Meeting, R2-1700471, Jan. 17-19, 2017, Source: SONY.
"Flexible RACH," Spokane, WA, 3GPP TSG-RAN WG2 Meeting NR AH, R2-1700522, Jan. 17-19, 2017, Source: MediaTek Inc.
"2 step Random Access Procedure in NR," Spokane, WA, 3GPP TSG-RAN WG2 Meeting NR ad-hoc, R2-1700564, Jan. 17-19, 2017, Source: Qualcomm Incorporated.
"Considerations on L2 handling for Handover," Athens, Greece, 3GPP TSG-RAN WG2 NR Adhoc, R2-1700816, Feb. 13-17, 2017, Source: Nokia, Alcatel-Lucent Shanghai Bell.
"Random Access in NR—Flexible UE Bandwidth Aspects," Athens, Greece, 3GPP TSG-RAN WG2 Meeting #97, R2-1700821, Feb. 13-17, 2017, Source: Samsung.
"Random Access Enhancements," Athens, Greece, 3GPP TSG-RAN WG2 Meeting #97, R2-1700850, Feb. 13-17, 2017, Source: Ericsson.
"Text proposal on RACH (E-mail discussion NR-AH#12)," Athens, Greece, 3GPP TSG-RAN WG2 Meeting #97, R2-1700851, Feb. 13-17, 2017, Source: Ericsson.
"Pcell change procedure for CA in NR," Athens, Greece, 3GPP TSG-RAN WG2 Meeting #97, R2-1700855, Feb. 13-17, 2017, Source: Ericsson.
"Further details of handover execution in NR," Athens, Greece, 3GPP TSG-RAN WG2 Meeting #97, R2-1700863, Feb. 13-17, 2017, Source: Ericsson.
"Conditional Handover," Athens, Greece, 3GPP TSG-RAN WG2 Meeting #97, R2-1700864, Feb. 13-17, 2017, Source: Ericsson.
"RLC ARQ vs. PDCP data recovery during mobility," Athens, Greece, 3GPP TSG-RAN WG2 Meeting #97, R2-1700865, Feb. 13-17, 2017, Source: Ericsson.
"SeNB to MeNB reconfiguration for NR dual-connectivity," Athens, Greece, 3GPP TSG-RAN WG2 Meeting #97, R2-1700866, Feb. 13-17, 2017, Source: Ericsson.
"RRC involved HO for cell-level mobility," Athens, Greece, 3GPP TSG-RAN WG2 Meeting #97, R2-1700883, Feb. 13-17, 2017, Source: MediaTek Inc.
"Mobility Enhancement for '0ms' interruption," Spokane, WA, 3GPP TSG-RAN WG2 NR, R2-1700897, Jan. 17-19, 2017, Source: MediaTek Inc., ASUS TeK.
"Discussion on Handover Procedure Optimization," Athens, Greece, 3GPP TSG-RAN WG2 Meeting #97, R2-1700956, Feb. 13-17, 2017, Source: OPPO.
"Consideration on Random Access in NR," Athens, Greece, 3GPP TSG-RAN WG2 Meeting #97, R2-1700962, Feb. 13-17, 2017, Source: OPPO.
"Design Principles for Random Access Procedure in NR," Athens, Greece, 3GPP TSG-RAN WG2 Meeting #97, R2-1700969, Feb. 13-17, 2017, Source: CATT.
"Random Access Procedure in NR," Athens, Greece, 3GPP TSG-RAN WG2 Meeting #97, R2-1700970, Feb. 13-17, 2017, Source: CATT.
"L2 Behaviors in NR Handover or Reconfiguration," Athens, Greece, 3GPP TSG-RAN WG2 Meeting #97, R2-1700984, Feb. 13-17, 2017, Source: CATT.
"Further Consideration on Inter-cell HO Mechanism," Athens, Greece, 3GPP TSG-RAN WG2 Meeting #97, R2-1700985, Feb. 13-17, 2017, Source: CATT.
"NR Mobility Enhancement on Single Connectivity," Athens, Greece, 3GPP TSG-RAN WG2 Meeting #97, R2-1700986, Feb. 13-17, 2017, Source: CATT.
"NR Mobility Enhancement on Dual Connectivity," Athens, Greece, 3GPP TSG-RAN WG2 Meeting #97, R2-1700987, Feb. 13-17, 2017, Source: CATT.
"NW Activation-De-activation of autonomous handover in single connectivity," Athens, Greece, 3GPP TSG-RAN WG2 Meeting #97, R2-1701137, Feb. 13-17, 2017, Source: Sharp.
"Mobility in NR Connected—Active," Athens, Greece, 3GPP TSG-RAN WG2 Meeting #97, R2-1701148, Feb. 13-17, 2017, Source: Samsung.
"Inter-cell and Inter-node UE RRC Driven Mobility in NR," Athens, Greece, 3GPP TSG-RAN WG2 Meeting #97, R2-1701194, Feb. 13-17, 2017, Source: InterDigital Communications.
"Introduction of UE autonomous mobility," Athens, Greece, 3GPP TSG-RAN WG2 Meeting #97, RZ-1701360, Feb. 13-17, 2017, Source: Samsung.
"Discussion on intra-frequency operation for dual-connectivity in HF NR," Athens, Greece, 3GPP TSG-RAN WG2 Meeting #97, R2-1701361, Feb. 13-17, 2017, Source: Samsung.
"Consideration on dual connected handover," Athens, Greece, 3GPP TSG-RAN WG2 Meeting #97, R2-1701384, Feb. 13-17, 2017, Source: ZTE, ZTE Microelectronics.
"Solutions for single connected handover," Athens, Greece, 3GPP TSG-RAN WG2 Meeting #97, R2-1701385, Feb. 13-17, 2017, Source: ZTE, ZTE Microelectronics.
"Remaining RAN2 aspects on random access procedure for NR," Athens, Greece, 3GPP TSG-RAN WG2 Meeting #97, R2-1701520, Feb. 13-17, 2017, Source: NTT DOCOMO, Inc.
"RA enhancement for New RAT," Athens, Greece, 3GPP TSG-RAN WG2 Meeting #97, R2-1701539, Feb. 13-17, 2017, Source: LG Electronics Inc.
"NW controlled autonomous handover in single connectivity," Athens, Greece, 3GPP TSG-RAN WG2 Meeting #97, R2-1701711, Feb. 13-17, 2017, Source: Intel Corporation.

(56) References Cited

OTHER PUBLICATIONS

"Mobility type support for multiple beams in NR," Athens, Greece, 3GPP TSG-RAN WG2 Meeting #97, R2-1701712, Feb. 13-17, 2017, Source: Intel Corporation.
"Further considerations of random access in NR," Athens, Greece, 3GPP TSG-RAN WG2 Meeting #97, R2-1701721, Feb. 13-17, 2017, Source: Intel Corporation.
"Considerations on NR RA procedure," Athens, Greece, 3GPP TSG-RAN WG2 Meeting #97, R2-1701771, Feb. 13-17, 2017, Source: Qualcomm Incorporated.
"Handover in single connectivity scenario," Athens, Greece, 3GPP TSG-RAN WG2 Meeting #97, R2-1701798, Feb. 13-17, 2017, Source: Huawei, HiSilicon.
"0ms interruption handover for NR," Athens, Greece, 3GPP TSG-RAN WG2 Meeting #97, R2-1701799, Feb. 13-17, 2017, Source: Huawei, HiSilicon.
"Enhancements for robust handover," Athens, Greece, 3GPP TSG-RAN Meeting #97, R2-1701800, Feb. 13-17, 2017, Source: Huawei, HiSilicon.
"NR mobility in Connected," Athens, Greece, 3GPP TSG-RAN WG2 Meeting #97, R2-1701833, Feb. 13-17, 2017, Source: Sharp.
"Mobility Enhancements in NR phase 1 (Release 15)," Athens, Greece, 3GPP TSG-RAN WG2 Meeting #97, R2-1701905, Feb. 13-17, 2017, Source: Samsung.
"How to define zero mobility interruption time," Athens, Greece, 3GPP TSG-RAN WG2 Meeting #97, R2-1701906, Feb. 13-17, 2017, Source: Samsung.
"Condition based handover procedure in NR," Athens, Greece, 3GPP TSG-RAN2 Meeting #97, R2-1701966, Feb. 13-17, 2017, Source: LG Electronics Inc.
"2-Step Random Access Procedure in NR," Reno, Nevada, 3GPP TSG-Ran WG2 Meeting #96, R2-168520, Nov. 14-18, 2016, Source: Intel Corporation.
Jun 21, 2018—Partial International Search Report and Written Opinion—PCT/US2018/023886.
"2-Step Random Access Procedure," Spokane, WA, 3GPP TSG RAN WG1 NR, AH_NR Meeting R1-1700105, Jan. 16-20, 2017, Source: ZTE, ZTE Microelectronics (Version 2).
Aug. 13, 2018—International Search Report and Written Opinion—PCT/2018/023886.
U.S. Appl. No. 62/427,736, filed Nov. 29, 2016.
3GPP TS 38.213 V15.2.0 (Jun. 2018), Technical Specification, 3rd Generation Partnership Project; Technical Specification Group Radio Access Network; NR; Physical layer procedures for control (Release 15).
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
R1-1709897 3GPP TSG RAN WG1 NR Ad-hoc #2, Qingdao, P.R. China, Jun. 27-30, 2017, Source: ZTE, Title: 4-step random access procedure.
R1-1710035 3GPP TSG RAN WG1 NR Ad-Hoc #2, Qingdao, P.R. China, Jun. 27-30, 2017, Source: CATT, Title: Further details on NR 4-step RA Procedure.
R1-1710138 3GPP TSG RAN WG1 NR Ad-Hoc #2, Qingdao, P.R. China, Jun. 27-30, 2017, Source: Guangdong OPPO Mobile Telecom, Title: NR 4-Step Random Access Procedure.
R1-1710218 3GPP TSG-RAN WG1 NR Ad-Hoc #2, Qingdao, P.R. China, Jun. 27-30, 2017, Source: Mitsubishi Electric, Title: RACH transmission count.
R1-1710234 3GPP TSG-RAN WG1 NR Ad-Hoc #2, Qingdao, P.R. China, Jun. 27-30, 2017, Source: Fujitsu, Title: Discussion on 4-step RA procedure.
R1-1710271 3GPP TSG RAN WG1 NR #2, Qingdao, P.R. China, Jun. 27-30, 2017, Source: LG Electronics, Title: RACH procedure.
R1-1710422 3GPP TSG RAN WG1 Ad hoc Meeting #2, Qingdao, P.R. China, Jun. 26-30, 2017, Source: AT&T, Title: DL Tx Beam Reporting in msg. 3.
R1-1710478 3GPP TSG RAN WG1 NR Ad-Hoc Meeting, Qingdao, P.R. China, Jun. 27-30, 2017, Source: Huawei, HiSilicon, Title: RACH procedures and resource configuration.
R1-1710513 3GPP TSG RAN WG1 NR Adhoc #2, Qingdao, P.R. China, Jun. 27-30, 2017, Source: Intel Corporation, Title: 4-step PRACH procedures.
R1-1710636 3GPP TSG RAN WG1 Meeting NR AH #2, Qingdao, P.R. China, Jun. 27-30, 2017, Source: Samsung, Title: 4-step RACH procedure discussion.
R1-1710774 3GPP TSG RAN WG1 Meeting NR Adhoc, Qingdao, P.R. China, Jun. 27-30, 2017, Source: CMCC, Title: Discussion on RACH configuration.
R1-1710824 3GPP TSG RAN WG1 NR Ad-Hoc #2, Qingdao, P.R. China, Jun. 27-30, 2017, Source: MediaTek Inc., Title: On 4-step RACH procedure.
R1-1710860 3GPP TSG RAN WG1 NR Ad-Hoc #2, Qingdao, P.R. China, Jun. 27-30, 2017, Source: SONY, Title: Considerations on 4-step RA Procedure.
R1-1710871 3GPP TSG-RAN WG1 NR Ad-Hoc #2, Qingdao, P.R. China, Jun. 27-20, 2017, Source: InterDigital Inc., Title: Multiple Msg1 transmissions for one monitored RAR window.
R1-1710892 3GPP TSG RAN WG1 NR Ad-Hoc #2, Qingdao, P.R. China, Jun. 27-30, 2017, Source: Nokia, Alcatel-Lucent Shanghai Bell, Title: NR 4-step RACH procedure.
R1-1711068 3GPP TSG RAN WG1 NR Ad-Hoc #2, Qingdao, P.R. China, Jun. 27-30, 2017, Source: NTT DOCOMO, Inc., Title: Discussion on 4-step RA procedure for NR.
R1-1711148 3GPP TSG-RAN WG1 Meeting #89, Hangzhou, China, May 15-19, 2017, Source: Qualcomm Incorporated, Title: 4-step RACH procedure consideration.
R1-1711279 3GPP TSG RAN WG1 NR Ad-Hoc #2, Qingdao, P.R. China, Jun. 27-30, 2017, Source: Motorola Mobility, Lenovo, Title: RACH configuration and procedure.
R1-1711383 3GPP TSG RAN WG1 NR Ad-Hoc #2, Qingdao, P.R. China, Jun. 27-30, 2017, Source: Ericsson, Title: 4-step random access procedure.
Dec. 16, 2019—European Extended Search Report—EP 19190988.6.
R1-1806545 3GPP TSG RAN WG1 Meeting #93, Busan, Korea, May 21-25, 2018, Source: Intel Corporation, Title: Potential enhancements to NR initial access and mobility to support unlicensed operation.
R2-1713954 3GPP TSG RAN WG2 Meeting #100, Reno, USA, Nov. 27-Dec. 1, 2017, Source: ZTE Corporation, Sanechips, Title: Discussion on the beam failure recovery impact on RAN2.
R1-164131 3GPP TSG RAN WG1 Meeting #85, Nanjing, China, May 23-27, 2017, Source: Intel Corporation, Title: PRACH Transmission for eLAA.
R1-162358 3GPP TSG RAN WG1 Meeting #84bis, Busan, Korea, Apr. 11-15, 2016, Source: Intel Corporation, Title: PRACH Design for eLAA.
3GPP TS 36.300 V8.5.0 (May 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 10.1.2-10.1.2.7: Handover Procedure: Mobility Management in ECM-Connected.
"Further Consideration on two-step RACH," Spokane, WA, 3GPP TSG RAN WG1 NR, Ad Hoc Meeting R1-1700035, Jan. 16-20, 2017, Source: Huawei, HiSilicon.
"General discussion of UL power control for NR," Spokane, WA, 3GPP TSG RAN WG1 NR, Ad Hoc Meeting R1-1700063, Jan. 16-20, 2017, Source: Huawei, HiSilicon.
"Detailed considerations on UL power control design for NR," Spokane, WA, 3GPP TSG RAN WG1 NR, Ad Hoc Meeting R1-1700064, Jan. 16-20, 2017, Source: Huawei, HiSilicon.
"2-Step Random Access Procedure," Spokane, WA, 3GPP TSG RAN WG1 NR, AH_NR Meeting R1-1700105, Jan. 16-20, 2017, Source: ZTE, ZTE Microelectronics.

(56) References Cited

OTHER PUBLICATIONS

"Discussion on UL power control for NR," Spokane, WA, 3GPP TSG RAN WG1 NR Ad-Hoc Meeting R1-1700142, Jan. 16-20, 2017, Source: ZTE, ZTE Microelectronics.
"On 2-step random access procedure and physical channel in NR," Spokane, WA, 3GPP TSG RAN WG1 NR Meeting #87, R1-1700172, Jan. 16-20, 2017, Source: MediaTek Inc.
"NR two-step random access procedure," Spokane, WA, 3GPP TSG-RAN WG1 NR adhoc, R1-1700300, Jan. 16-20, 2017, Source: Ericsson.
"Further considerations on a 2-step RA Procedure," Spokane, WA, 3GPP TSG RAN WG1 AH_NR, R1-1700186, Jan. 16-20, 2017, Source: CATT.
"2-Step RA Procedure for NR," Spokane, WA, 3GPP TSG RAN1 NR Ad-Hoc Meeting, R1-1700311, Jan. 16-20, 2017, Source: AT&T.
"On Uplink Power Control," Spokane, WA, 3GPP TSG RAN WG1 NR Ad-Hoc Meeting, R1-1700358, Jan. 16-20, 2017, Source: Intel Corporation.
"Discussion on 2-step RA procedure issues," Spokane, WA, 3GPP TSG RAN WG1 Meeting #87, R1-1700426, Jan. 16-20, 2017, Source: ITRI.
"Discussion on 2 step RACH," Spokane, WA, 3GPP TSG RAN WG1 NR Ad-Hoc Meeting, R1-1700464, Jan. 16-20, 2017, Source: LG Electronics.
"Discussion on UL transmit power control for NR," Spokane, WA, 3GPP TSG RAN WG1 NR Ad-Hoc Meeting, R1-1700492, Jan. 16-20, 2017, Source: LG Electronics.
"Uplink power control for NR," Spokane, WA, 3GPP TSG RAN WG1 NR Ad-Hoc, R1-1700553, Jan. 16-20, 2017, Source: Guangdong OPPO Mobile Telecom.
"On 2-step RA procedure for NR," Spokane, WA, 3GPP TSG RAN WG1 Ad-Hoc Meeting, R1-1700577, Jan. 16-20, 2017, Source: ETRI.
"Design considerations for 2-step RACH," Spokane, WA, 3GPP TSG RAN WG1 NR Ad-Hoc Meeting, R1-1700587, Jan. 16-20, 2017, Source: HTC.
"Uplink power control considering waveform switching," Spokane, WA, 3GPP TSG-RAN WG1-NR, R1-1700601, Jan. 16-20, 2017, Source: NTT DOCOMO, Inc.
"On 2-step Random Access Procedure," Spokane, WA, 3GPP TSG-RAN WG1 AH_NR Meeting, R1-1700652, Jan. 16-20, 2017, Source: Nokia, Alcatel-Lucent Shanghai Bell.
"Discussions on 2 Steps RACH Procedure," Spokane, WA, 3GPP TSG RAN WG1 Meeting AH_NR Meeting, R1-1700668, Jan. 16-20, 2017, Source: SONY.
"2-step random access procedure," Spokane, WA, 3GPP TSG RAN WG1 AH_NR Meeting, R1-1700703, Jan. 16-20, 2017, Source: InterDigital Communications.
"2-step RACH procedure consideration," Spokane, WA, 3GPP TSG-RAN WG1 NR AdHoc Meeting, R1-1700792, Jan. 16-20, 2017, Source: Qualcomm Incorporated.
"UL power control in multi-beam based approaches," Spokane, WA, 3GPP TSG RAN WG1 AH_NR Meeting, R1-1700868, Jan. 16-20, 2017, Source: ASUS TeK.
"Physical channel design for 2-step RACH," Spokane, WA, 3GPP TSG RAN WG1 Meeting NR, R1-1700880, Jan. 16-20, 2017, Source: Motorola Mobility.
"NR 2-step random access procedure," Spokane, WA, 3GPP TSG RAN WG1 NR Ad Hoc, R1-1700892, Jan. 16-20, 2017, Source: Samsung.
"UL Power Control Aspects," Spokane, WA, 3GPP TSG RAN WG1 NR Ad-Hoc Meeting, R1-1700940, Jan. 16-20, 2017, Source: Samsung.
"Dynamic network coordination for URLLC in the 5G New Radio," Spokane, WA, 3GPP TSG RAN WG1 NR Ad-Hoc Meeting, R1-1701108, Jan. 16-20, 2017, Source: Nokia, Alcatel-Lucent Shanghai Bell.
"Uplink Power Control for MIMO," Spokane, WA, 3GPP TSG RAN WG1 NR Ad-Hoc Meeting, R1-1701109, Jan. 16-20, 2017, Source: Nokia, Alcatel-Lucent Shanghai Bell.
"General discussion of UL power control for NR," Athens, Greece, 3GPP TSG RAN WG1 Meeting #88, R1-1701687, Feb. 13-17, 2017, Source: Huawei, HiSilicon.
"Detailed considerations on UL power control design for NR," Athens, Greece, 3GPP TSG RAN WG1 Meeting #88, R1-1701688, Feb. 13-17, 2017, Source: Huawei, HiSilicon.
"Uplink power control for NR," Athens, Greece, 3GPP TSG RAN WG1 Meeting #88, R1-1701947, Feb. 13-17, 2017, Source: Guangdong OPPO Mobile Telecom.
"On UL Power Control," Athens, Greece, 3GPP TSG-RAN WG1 Meeting #88, R1-1702216, Feb. 13-17, 2017, Source Intel Corporation.
"Discussion on uplink power control for NR," Athens, Greece, 3GPP TSG RAN WG1 Meeting #88, R1-1702468, Feb. 13-17, 2017, Source: LG Electronics.
"Discussion on uplink power control," Athens, Greece, 3GPP TSG RAN WG1 Meeting #88, R1-1702623, Feb. 13-17, 2017, Source: Qualcomm Incorporated.
"On power control for NR," Athens, Greece, 3GPP TSG-RAN WG1 Meeting #88, R1-1702695, Feb. 13-17, 2017, Source: Ericsson.
"UL Power Control Aspects," Athens, Greece, 3GPP TSG RAN WG1 Meeting #88, R1-1702964, Feb. 13-17, 2017, Source: Samsung.
"UL power control in multi-beam based approaches," Spokane, WA, 3GPP TSG RAN WG1 AH_NR Meeting, R1-1703052, Jan. 16-20, 2017, Source: ASUS TeK.
"Consideration on use cases of 2-step RACH procedure," Spokane, WA, 3GPP TSG-RAN WG2 Meeting #NR Ad Hoc, R2-1700023, Jan. 17-19, 2017, Source: ASUS TeK.
"Consideration on fallback of 2-step RACH procedure," Spokane, WA, 3GPP TSG-RAN WG2 Meeting #NR Ad Hoc, R2-1700024, Jan. 17-19, 2017, Source: ASUS TeK.
"Considerations on RACH procedure in NR," Spokane, WA, 3GPP TSG-RAN WG2 NR Ad Hoc, R2-1700089, Jan. 17-19, 2017, Source: Huawei, HiSilicon.
"Considerations on the Random-Access Procedure in Massive MIMO NR," Spokane, WA, 3GPP TSG-RAN WG2 NR Ad Hoc, R2-1700103, Jan. 17-19, 2017, Source: National Instruments.
"2-Step RACH to 4-step RACH fallback," Spokane, WA, 3GPP TSG RAN WG2 NR Adhoc, R2-1700137, Jan. 17-19, 2017, Source: Sony.
"Considerations on the two-step RACH in NR," Spokane, WA, 3GPP TSG-RAN WG2 NR Ad Hoc, R2-1700155, Jan. 17-19, 2017, Source: ZTE, ZTE Microelectronics.
"Considerations on 2-step RA," Spokane, WA, 3GPP TSG RAN WG2 Meeting Ad Hoc, RZ-1700205, Jan. 17-19, 2017, Source: CATT.
"2-Step Random Access Procedure in NR," Spokane, WA, 3GPP TSG-RAN WG2 NR Ad Hoc, RZ-1700237, Jan. 17-19, Z017, Source: InterDigital Communications.
"Consideration on use cases of 2-step RACH procedure," Spokane, WA, 3GPP TSG-RAN WG2 Meeting #NR Ad Hoc, R2-1700356, Jan. 17-19, 2017, Source: ASUSTeK, MediaTek Inc.
"Consideration on 2-step RACH," Spokane, WA, 3GPP TSG-RAN WG2 Meeting NR, R2-1700357, Jan. 17-19, 2017, Source: Samsung.
"Consideration on fallback of 2-step RACH procedure," Spokane, WA, 3GPP TSG-RAN WG2 Meeting #NR Ad Hoc, R2-1700358, Jan. 17-19, 2017, Source: ASUSTeK.
"Random Access enhancements," Spokane, WA, 3GPP TSG-RAN WG2 NR Ad Hoc, R2-1700412, Jan. 17-19, 2017, Source: Ericsson.
"On Two-step Random Access and Random Access Latency," Spokane, WA, 3GPP TSG-RAN WG2 NR Ad hoc, R2-1700413, Jan 17-19, 2017, Source: Ericsson.

* cited by examiner

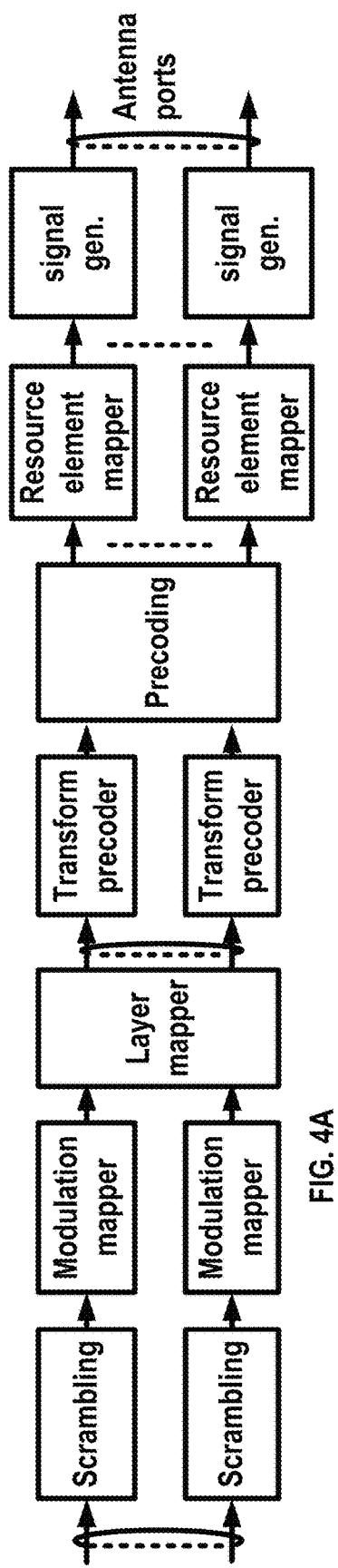
FIG. 4A
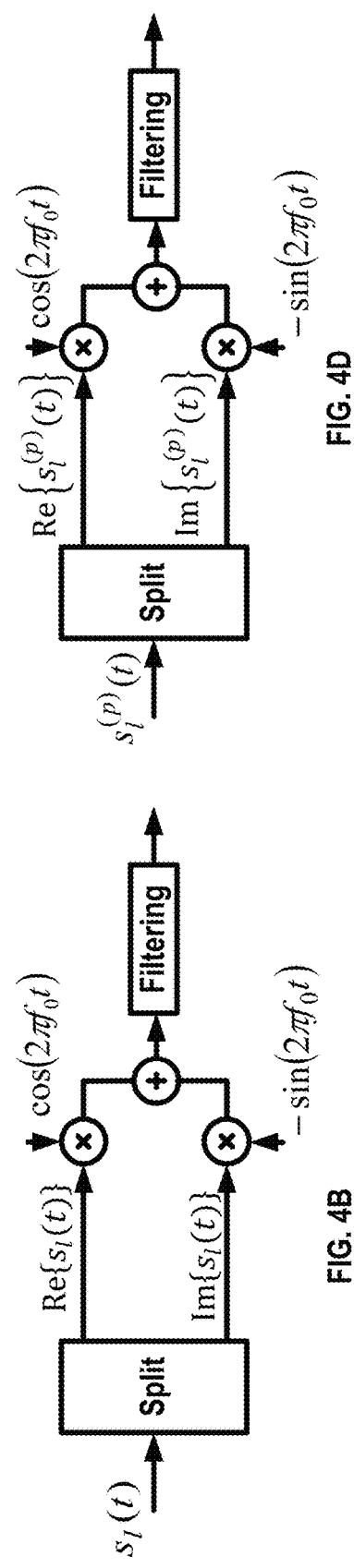
FIG. 4B
FIG. 4D
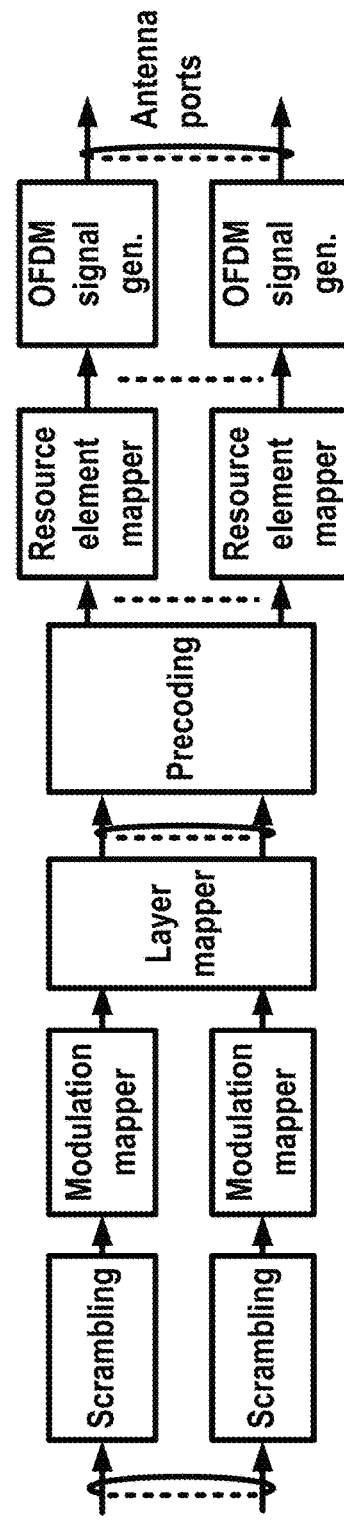
FIG. 4C

```
BWP ::=                                 SEQUENCE {
    locationAndBandwidth                    INTEGER (0..37949),
    subcarrierSpacing                       SubcarrierSpacing,
    cyclicPrefix                            ENUMERATED { extended }
        OPTIONAL -- Need R
}

BWP-Uplink ::=                          SEQUENCE {
    bwp-Id                                  BWP-Id,
    bwp-Common                              BWP-UplinkCommon
        OPTIONAL, -- Need M
    bwp-Dedicated                           BWP-UplinkDedicated
        OPTIONAL, -- Need M
    ...
}

BWP-UplinkCommon ::=                    SEQUENCE {
    genericParameters                       BWP,
    rach-ConfigCommon                       SetupRelease { RACH-ConfigCommon }
        OPTIONAL,       -- Need M
    pusch-ConfigCommon                      SetupRelease { PUSCH-ConfigCommon }
        OPTIONAL,       -- Need M
    pucch-ConfigCommon                      SetupRelease { PUCCH-ConfigCommon }
        OPTIONAL,       -- Need M
    ...
}

BWP-UplinkDedicated ::=                 SEQUENCE {
    pucch-Config                            SetupRelease { PUCCH-Config }
        OPTIONAL,       -- Need M
    pusch-Config                            SetupRelease { PUSCH-Config }
        OPTIONAL,       -- Cond SetupOnly
    configuredGrantConfig                   SetupRelease { ConfiguredGrantConfig }
        OPTIONAL,       -- Need M
    srs-Config                              SetupRelease { SRS-Config }
        OPTIONAL,       -- Need M
    beamFailureRecoveryConfig               SetupRelease { BeamFailureRecoveryConfig }
        OPTIONAL, -- Cond SpCellOnly
    ...
}

BWP-Downlink ::=                        SEQUENCE {
    bwp-Id                                  BWP-Id,
    bwp-Common                              BWP-DownlinkCommon
        OPTIONAL, -- Need M
    bwp-Dedicated                           BWP-DownlinkDedicated
        OPTIONAL, -- Need M
    ...
}

BWP-DownlinkCommon ::=                  SEQUENCE {
    genericParameters                       BWP,
    pdcch-ConfigCommon                      SetupRelease { PDCCH-ConfigCommon }
        OPTIONAL, -- Need M
    pdsch-ConfigCommon                      SetupRelease { PDSCH-ConfigCommon }
        OPTIONAL, -- Need M
    ...
}

BWP-DownlinkDedicated ::=               SEQUENCE {
    pdcch-Config                            SetupRelease { PDCCH-Config }
        OPTIONAL, -- Need M
    pdsch-Config                            SetupRelease { PDSCH-Config }
        OPTIONAL, -- Need M
    sps-Config                              SetupRelease { SPS-Config }
        OPTIONAL,       -- Need M
    radioLinkMonitoringConfig               SetupRelease { RadioLinkMonitoringConfig }
        OPTIONAL, -- Need M
    ...
}
```

FIG. 16

```
ServingCellConfig ::=              SEQUENCE {
    tdd-UL-DL-ConfigurationDedicated TDD-UL-DL-ConfigDedicated
    OPTIONAL,        -- Cond TDD initialDownlinkBWP              BWP-DownlinkDedicated
    OPTIONAL,        -- Cond ServCellAdd
    downlinkBWP-ToReleaseList       SEQUENCE (SIZE (1..maxNrofBWPs)) OF BWP-Id
    OPTIONAL,        -- Need N
    downlinkBWP-ToAddModList        SEQUENCE (SIZE (1..maxNrofBWPs)) OF BWP-Downlink
    OPTIONAL,        -- Need N
    firstActiveDownlinkBWP-Id       BWP-Id
    OPTIONAL,        -- Cond SyncAndCellAdd
    bwp-InactivityTimer             ENUMERATED { ms2, ms3, ms4, ms5, ms6, ms8, ms10, ms20, ms30,
                                                 ms40,ms50, ms60, ms80, ms100, ms200, ms300, ms500,
                                                 ms750, ms1280, ms1920, ms2560, spare10, spare9, spare8,
                                                 spare7, spare6, spare5, spare4, spare3, spare2, spare1 }
    OPTIONAL,        -- Need R
    defaultDownlinkBWP-Id           BWP-Id
        OPTIONAL,    -- Need S uplinkConfig                    UplinkConfig
    OPTIONAL,        -- Cond ServCellAdd-UL
    supplementaryUplink             UplinkConfig
    OPTIONAL,        -- Cond ServCellAdd-SUL pdcch-ServingCellConfig         SetupRelease { PDCCH-ServingCellConfig }
    OPTIONAL,        -- Need M
    pdsch-ServingCellConfig         SetupRelease { PDSCH-ServingCellConfig }
    OPTIONAL,        -- Need M
    csi-MeasConfig                  SetupRelease { CSI-MeasConfig }
    OPTIONAL,        -- Need M
    sCellDeactivationTimer          ENUMERATED { ms20, ms40, ms80, ms160, ms200, ms240,
                                                 ms320, ms400, ms480, ms520, ms640, ms720,
                                                 ms840, ms1280, spare2,spare1}
    OPTIONAL,        -- Cond ServingCellWithoutPUCCH
    crossCarrierSchedulingConfig    CrossCarrierSchedulingConfig
    OPTIONAL,        -- Need M
    tag-Id                          TAG-Id,
    ue-BeamLockFunction             ENUMERATED {enabled}
    OPTIONAL,        -- Need R
    pathlossReferenceLinking        ENUMERATED {pCell, sCell}
    OPTIONAL,        -- Cond SCellOnly
    servingCellMO                   MeasObjectId
    OPTIONAL,        -- Cond MeasObject
    ...
}

UplinkConfig ::=                   SEQUENCE {
    initialUplinkBWP                BWP-UplinkDedicated
    OPTIONAL,        -- Cond ServCellAdd
    uplinkBWP-ToReleaseList         SEQUENCE (SIZE (1..maxNrofBWPs)) OF BWP-Id
    OPTIONAL,        -- Need N
    uplinkBWP-ToAddModList          SEQUENCE (SIZE (1..maxNrofBWPs)) OF BWP-Uplink
    OPTIONAL,        -- Need N
    firstActiveUplinkBWP-Id         BWP-Id
        OPTIONAL,    -- Cond SyncAndCellAdd pusch-ServingCellConfig         SetupRelease { PUSCH-ServingCellConfig }
    OPTIONAL,        -- Need M
    carrierSwitching                SetupRelease { SRS-CarrierSwitching  }
    OPTIONAL,        -- Need M
    ...
}
```

FIG. 17

RACH-ConfigCommon information element

```
-- ASN1START
-- TAG-RACH-CONFIG-COMMON-START

RACH-ConfigCommon ::=        SEQUENCE {
    rach-ConfigGeneric           RACH-ConfigGeneric,
    totalNumberOfRA-Preambles    INTEGER (1..63)                                                    OPTIONAL,  -- Need S
    ssb-perRACH-OccasionAndCB-PreamblesPerSSB  CHOICE {
        oneEighth                    ENUMERATED {n4,n8,n12,n16,n20,n24,n28,n32,n36,n40,n44,n48,n52,n56,n60,n64},
        oneFourth                    ENUMERATED {n4,n8,n12,n16,n20,n24,n28,n32,n36,n40,n44,n48,n52,n56,n60,n64},
        oneHalf                      ENUMERATED {n4,n8,n12,n16,n20,n24,n28,n32,n36,n40,n44,n48,n52,n56,n60,n64},
        one                          ENUMERATED {n4,n8,n12,n16,n20,n24,n28,n32,n36,n40,n44,n48,n52,n56,n60,n64},
        two                          ENUMERATED {n4,n8,n12,n16,n20,n24,n28,n32},
        four                         INTEGER (1..16),
        eight                        INTEGER (1..8),
        sixteen                      INTEGER (1..4)
    },
    groupBconfigured             SEQUENCE {
        ra-Msg3SizeGroupA            ENUMERATED { b56, b144, b208, b256, b282, b480, b640,
                                                  b800, b1000, minusinfinity, spare7, spare6, spare5, spare4, spare3, spare2, spare1},
        messagePowerOffsetGroupB     ENUMERATED { minusinfinity, dB0, dB5, dB8, dB10, dB12, dB15, dB18},
        numberOfRA-PreamblesGroupA   INTEGER (1..64)
    }                                                                                                OPTIONAL,  -- Need R
    ra-ContentionResolutionTimer  ENUMERATED { sf8, sf16, sf24, sf32, sf40, sf48, sf56, sf64},
    rsrp-ThresholdSSB             RSRP-Range                                                         OPTIONAL,  -- Need R
    rsrp-ThresholdSSB-SUL         RSRP-Range                                                         OPTIONAL,  -- Cond SUL
    prach-RootSequenceIndex       CHOICE {
        l839                         INTEGER (0..837),
        l139                         INTEGER (0..137)
    },
    msg1-SubcarrierSpacing        SubcarrierSpacing                                                  OPTIONAL,  -- Need S
    restrictedSetConfig           ENUMERATED {unrestrictedSet, restrictedSetTypeA, restrictedSetTypeB},
    msg3-transformPrecoding       ENUMERATED {enabled}                                               OPTIONAL,  -- Need R
    ...
}

-- TAG-RACH-CONFIG-COMMON-STOP
-- ASN1STOP
```

FIG. 18

| RACH-ConfigCommon field descriptions |
|---|
| messagePowerOffsetGroupB<br>Threshold for preamble selection. Value in dB. Value minusinfinity corresponds to -infinity. Value dB0 corresponds to 0 dB, dB5 corresponds to 5 dB and so on. (see FFS_Spec, section FFS_Section) |
| msg1-SubcarrierSpacing<br>Subcarrier spacing of PRACH. Only the values 15 or 30 kHz (<6GHz), 60 or 120 kHz (>6GHz) are applicable. Corresponds to L1 parameter 'prach-Msg1SubcarrierSpacing' (see 38.211, section FFS_Section). If absent, the UE applies the SCS as derived from the prach-ConfigurationIndex in RACH-ConfigGeneric (see 38.211, section XXX). |
| msg3-transformPrecoding<br>Indicates to a UE whether transform precoding is enabled for Msg3 transmission. Absence indicates that it is disabled. Corresponds to L1 parameter 'msg3-tp' (see 38.213, section 8.1) |
| numberOfRA-PreamblesGroupA<br>The number of CB preambles per SSB in group A. This determines implicitly the number of CB preambles per SSB available in group B. (see 38.321, section 5.1.1). The setting should be consistent with the setting of ssb-perRACH-OccasionAndCB-PreamblesPerSSB. |
| prach-RootSequenceIndex<br>PRACH root sequence index. Corresponds to L1 parameter 'PRACHRootSequenceIndex' (see 38.211, section 6.3.3.1). The value range depends on whether L=839 or L=139 |
| ra-ContentionResolutionTimer<br>The initial value for the contention resolution timer (see 38.321, section 5.1.5). Value ms8 corresponds to 8 ms, value ms16 corresponds to 16 ms, and so on. |
| ra-Msg3SizeGroupA<br>Transport Blocks size threshold in bit below which the UE shall use a contention based RA premable of group A. (see 38.321, section 5.1.2) |
| rach-ConfigGeneric<br>Generic RACH parameters |
| restrictedSetConfig<br>Configuration of an unrestricted set or one of two types of restricted sets, see 38.211 6.3.3.1 |
| rsrp-ThresholdSSB<br>UE may select the SS block and corresponding PRACH resource for path-loss estimation and (re)transmission based on SS blocks that satisfy the threshold (see 38.213, section REF). |
| rsrp-ThresholdSSB-SUL<br>The UE selects SUL carrier to perform random access based on this threshold (see TS 38.321, section 5.1.1) |
| ssb-perRACH-OccasionAndCB-PreamblesPerSSB<br>Number of SSBs per RACH occasion (L1 parameter 'SSB-per-rach-occasion') and the number of Contention Based preambles per SSB (L1 parameter 'CB-preambles-per-SSB'). The total number of CB preambles in a RACH occasion is given by CB-preambles-per-SSB * max(1,SSB-per-rach-occasion). |
| totalNumberOfRA-Preambles<br>Total number of preambles used for contention based and contention free random access, excluding preambles used for other purposes (e.g. for SI request). If the field is absent, the UE may use all 64 preambles for RA. |

FIG. 19

RACH-ConfigGeneric information element

```
-- ASN1START
-- TAG-RACH-CONFIG-GENERIC-START

RACH-ConfigGeneric ::=          SEQUENCE {
    prach-ConfigurationIndex        INTEGER (0..255),
    msg1-FDM                        ENUMERATED {one, two, four, eight},
    msg1-FrequencyStart             INTEGER (0..maxNrofPhysicalResourceBlocks-1),
    zeroCorrelationZoneConfig       INTEGER (0..15),
    preambleReceivedTargetPower     INTEGER (-202..-60),
    preambleTransMax                ENUMERATED {n3, n4, n5, n6, n7, n8, n10, n20, n50, n100, n200},
    powerRampingStep                ENUMERATED {dB0, dB2, dB4, dB6},
    ra-ResponseWindow               ENUMERATED {sl1, sl2, sl4, sl8, sl10, sl20, sl40, sl80},
    ...
}

-- TAG-RACH-CONFIG-GENERIC-STOP
-- ASN1STOP
```

| RACH-ConfigGeneric field descriptions |
|---|
| *msg1-FDM*<br>The number of PRACH transmission occasions FDMed in one time instance. Corresponds to L1 parameter 'prach-FDM' (see 38.211, section FFS_Section) |
| *msg1-FrequencyStart*<br>Offset of lowest PRACH transmission occasion in frequency domain with respective to PRB 0. The value is configured so that the corresponding RACH resource is entirely within the bandwidth of the UL BWP. Corresponds to L1 parameter 'prach-frequency-start' (see 38.211, section FFS_Section) |
| *powerRampingStep*<br>Power ramping steps for PRACH (see 38.321,5.1.3) |
| *prach-ConfigurationIndex*<br>PRACH configuration index. Corresponds to L1 parameter 'PRACHConfigurationIndex' (see 38.213, section 6.3.3.2) |
| *preambleReceivedTargetPower*<br>The target power level at the network receiver side (see 38.213, section 7.4, 38.321, section 5.1.2, 5.1.3). Only multiples of 2 dBm may be chosen (e.g. -202, -200, -198, ...) |
| *preambleTransMax*<br>Max number of RA preamble transmission performed before declaring a failure (see 38.321, section 5.1.4, 5.1.5) |
| *ra-ResponseWindow*<br>Msg2 (RAR) window length in number of slots. The network configures a value lower than or equal to 10 ms (see 38.321, section 5.1.4) |
| *zeroCorrelationZoneConfig*<br>N-CS configuration, see Table 6.3.3.1-3 in 38.211 |

FIG. 20

RACH-ConfigDedicated information element

```
-- ASN1START
-- TAG-RACH-CONFIG-DEDICATED-START

-- FFS_Standlone: resources for msg1-based on-demand SI request

RACH-ConfigDedicated ::=    SEQUENCE {
    cfra                        CFRA                                                OPTIONAL,   -- Need N
    ra-Prioritization           RA-Prioritization                                   OPTIONAL.   -- Need N
    ...
}

CFRA ::=                    SEQUENCE {
    occasions                   SEQUENCE {
        rach-ConfigGeneric          RACH-ConfigGeneric,
        ssb-perRACH-Occasion        ENUMERATED {oneEighth, oneFourth, oneHalf, one, two, four, eight, sixteen}   OPTIONAL,-- Cond SSB-CFRA
    }                                                                                           OPTIONAL,   -- Need S
    resources                   CHOICE {
        ssb                         SEQUENCE {
            ssb-ResourceList            SEQUENCE (SIZE(1..maxRA-SSB-Resources)) OF CFRA-SSB-Resource,
            ra-ssb-OccasionMaskIndex    INTEGER (0..15)
        },
        csirs                       SEQUENCE {
            csirs-ResourceList          SEQUENCE (SIZE(1..maxRA-CSIRS-Resources)) OF CFRA-CSIRS-Resource,
            rsrp-ThresholdCSI-RS        RSRP-Range
        }
    },
    ...
}

CFRA-SSB-Resource ::=       SEQUENCE {
    ssb                         SSB-Index,
    ra-PreambleIndex            INTEGER (0..63),
    ...
}

CFRA-CSIRS-Resource ::=     SEQUENCE {
    csi-RS                      CSI-RS-Index,
    ra-OccasionList             SEQUENCE (SIZE(1..maxRA-OccasionsPerCSIRS)) OF INTEGER (0..maxRA-Occasions-1),
    ra-PreambleIndex            INTEGER (0..63),
    ...
}

-- TAG-RACH-CONFIG-DEDICATED-STOP
-- ASN1STOP
```

FIG. 21

CFRA field descriptions ra-ssb-OccasionMaskIndex
Explicitly signalled PRACH Mask Index for RA Resource selection in TS 36.321. The mask is valid for all SSB resources signalled in ssb-ResourceList rach-ConfigGeneric
Configuration of contention free random access occasions for CFRA.

ssb-perRACH-Occasion
Number of SSBs per RACH occasion (L1 parameter 'SSB-per-rach-occasion').

CFRA-CSIRS-Resource field descriptions csi-RS
The ID of a CSI-RS resource defined in the measurement object associated with this serving cell.

ra-OccasionList
RA occasions that the UE shall use when performing CF-RA upon selecting the candidate beam identified by this CSI-RS.

ra-PreambleIndex
The RA preamble index to use in the RA occasions associated with this CSI-RS.

CFRA-SSB-Resource field descriptions ra-PreambleIndex
The preamble index that the UE shall use when performing CF-RA upon selecting the candidate beams identified by this SSB.

ssb
The ID of an SSB transmitted by this serving cell.

RACH-ConfigDedicated field descriptions cfra
Parameters for contention free random access to a given target cell. If the field is absent, the UE performs contention based random access.

ra-prioritization
Parameters which apply for prioritized random access procedure to a given target cell (see 38.321, section 5.1.1).

| Conditional Presence | Explanation |
|---|---|
| SSB-CFRA | The field is mandatory present if the field resources in CFRA is set to ssb; otherwise it is not present. |

FIG. 22

PRACH Mask Index values

| PRACH Mask Index | Allowed PRACH occasion(s) of SSB |
|---|---|
| 0 | All |
| 1 | PRACH occasion index 1 |
| 2 | PRACH occasion index 2 |
| 3 | PRACH occasion index 3 |
| 4 | PRACH occasion index 4 |
| 5 | PRACH occasion index 5 |
| 6 | PRACH occasion index 6 |
| 7 | PRACH occasion index 7 |
| 8 | PRACH occasion index 8 |
| 9 | Every even PRACH occasion |
| 10 | Every odd PRACH occasion |
| 11 | Reserved |
| 12 | Reserved |
| 13 | Reserved |
| 14 | Reserved |
| 15 | Reserved |

FIG. 23

| Channel Access Priority Class ($p$) | QCI |
|---|---|
| 1 | 1, 3, 5, 65, 66, 69, 70 |
| 2 | 2, 7 |
| 3 | 4, 6, 8, 9 |
| 4 | - |

FIG. 24

CHANNEL SELECTION USING A LISTEN BEFORE TALK PROCEDURE

CROSS-REFERENCE TO RELATED APPLICATIONS

This application claims the benefit of U.S. Provisional Application No. 62/716,895, titled "PRACH Selection With LBT In Random Access" and filed on Aug. 9, 2018. The above-referenced application is hereby incorporated by reference in its entirety.

BACKGROUND

Wireless communications may use a shared communication medium, such as unlicensed bands shared with other wireless technologies (e.g., WiFi). A wireless device may determine whether a medium is clear, for example, by using a listen before talk (LBT) procedure. If the medium is busy, the wireless device may not send (e.g., transmit) a message and/or may forgo a transmission opportunity. If the medium is clear, the wireless device may send (e.g., transmit) a message and/or use the transmission opportunity.

SUMMARY

The following summary presents a simplified summary of certain features. The summary is not an extensive overview and is not intended to identify key or critical elements.

Wireless communications between a base station and one or more wireless devices are described. Wireless communications may enable multiple opportunities to start or restart communication between a base station and a wireless device. The opportunities may be presented in a burst or grouped form, for example, based on a set of reference signals presented before a set of transmission opportunities.

Multiple downlink reference signals may be used in a shared medium during a random access procedure. Each downlink reference signal may correspond to a random access channel, such as a physical random access channel (PRACH). A base station may provide a set of downlink reference signals (e.g., more than one downlink reference signal) before a set of random access channels (e.g., more than one random access channel) are available for use. The wireless device performing a random access procedure may select more than one (e.g., two or more) random access channel occasions based on the downlink reference signals. The wireless device may select a first-in-time random access channel occasion from two or more random access channels that is determined to be clear (e.g., not busy), for example, using a listen before talk (LBT) procedure. A wireless device performing a random access procedure may measure at least two downlink reference signals to determine at least two random access channels available for transmission before another set (e.g., burst) of downlink reference signals is provided by the base station. The wireless device may select a first random access channel from the two or more random access channels for sending a preamble. The wireless device may perform an LBT procedure that may indicate that the medium is busy, for example, during a first random access channel occasion via a first random access channel. The wireless device may select a second random access channel from the two or more random access channels, for example, after or in response to the LBT procedure indicating that the medium is busy. The wireless device may use the second random access channel for a preamble transmission, for example, based on a determination that the second random access channel is clear during a second random access channel occasion.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

FIG. 16 shows an example bandwidth part configuration information element.

FIG. 17 shows an example serving cell configuration information element.

FIG. 18 shows an example random access resource configuration.

FIG. 19 shows example field descriptions of a common random access resource configuration.

FIG. 20 shows an example generic random access resource configuration, and field descriptions.

FIG. 21 shows an example dedicated random access resource configuration.

FIG. 22 shows example field descriptions of a dedicated random access resource configuration.

FIG. 23 shows example random access occasion mask index values.

FIG. 24 shows an example channel access priority class values.

DETAILED DESCRIPTION

Figure 1:
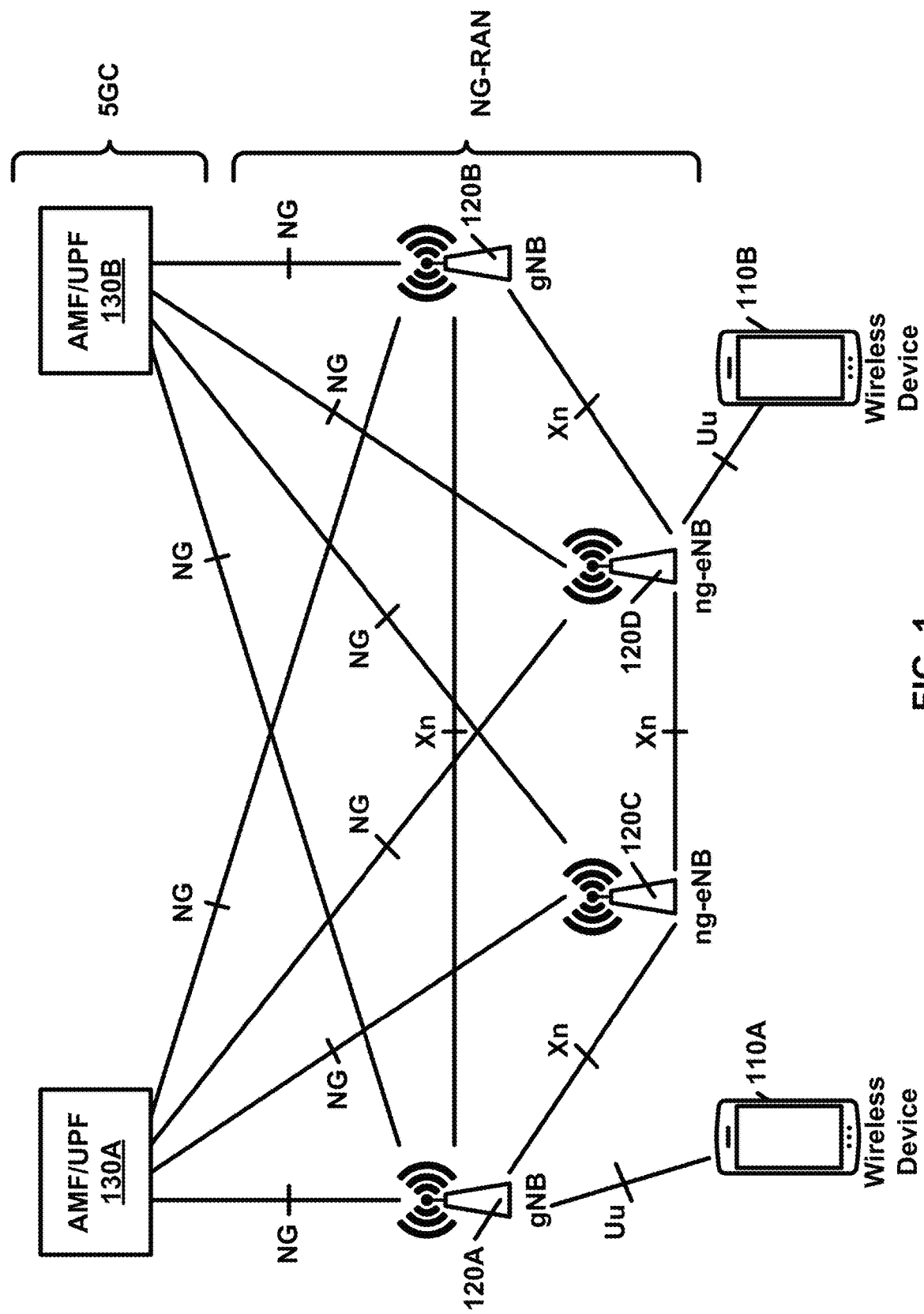
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to cell and wireless resource (e.g., bandwidth part) activation/deactivation and/or wireless resource (e.g., bandwidth part) switching in multicarrier communication systems.

The following acronyms are used throughout the drawings and/or descriptions, and are provided below for convenience although other acronyms may be introduced in the detailed description:
3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BFR Beam Failure Recovery
BLER Block Error Rate
BPSK Binary Phase Shift Keying
BSR Buffer Status Report
BWP Bandwidth Part
CA Carrier Aggregation
CC Component Carrier
CCCH Common Control CHannel
CDMA Code Division Multiple Access
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCH Logical Channel
LCID Logical Channel Identifier
LTE Long Term Evolution
MAC Medium Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QCLed Quasi-Co-Located
QCL Quasi-Co-Location
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RLM Radio Link Monitoring
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SINR Signal-to-Interference-plus-Noise Ratio
SMF Session Management Function
SN Secondary Node
SpCell Special Cell
SR Scheduling Request
SRB Signaling Radio Bearer
SRS Sounding Reference Signal
SS Synchronization Signal
SSB Synchronization Signal Block
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TRP Transmission and Receiving Point
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide, for example, NG interface management, wireless device (e.g., UE) context management, wireless device (e.g., UE) mobility management, transport of NAS messages, paging, PDU session management, configuration transfer, and/or warning message transmission, combinations thereof, and/or the like.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
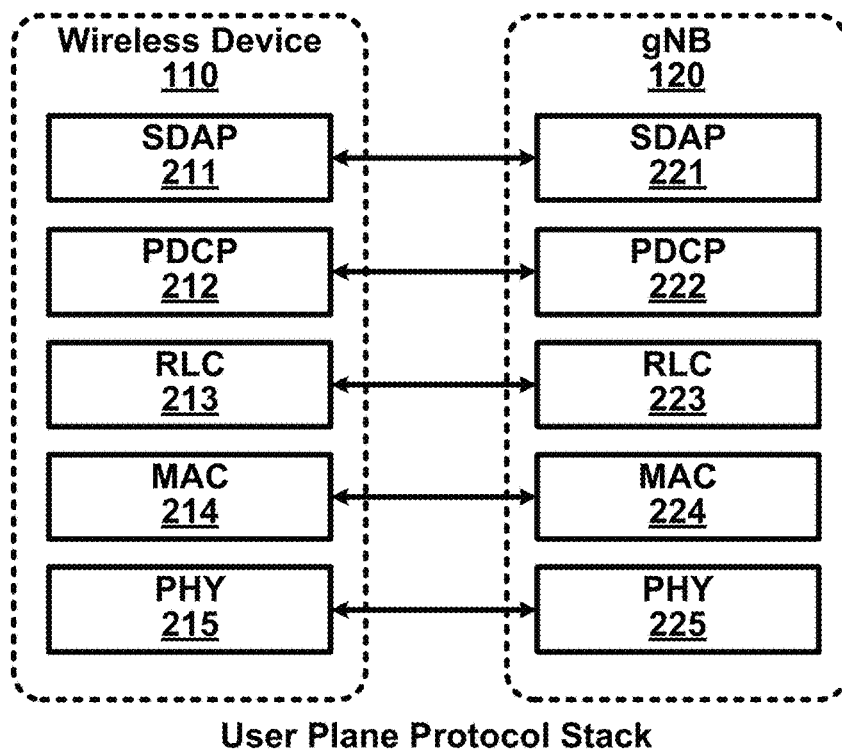
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use.

An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
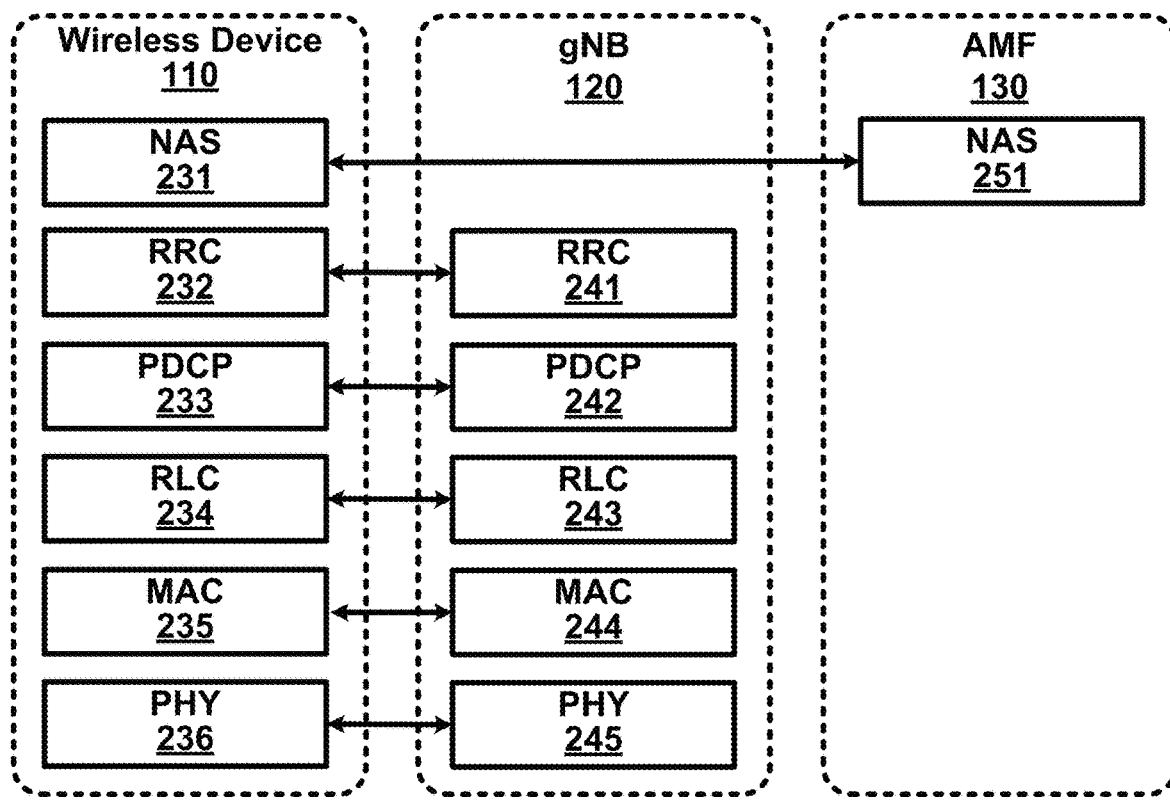
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs that indicate one or more timing advance values for one or more Timing Advance Groups (TAGs).

Figure 3:
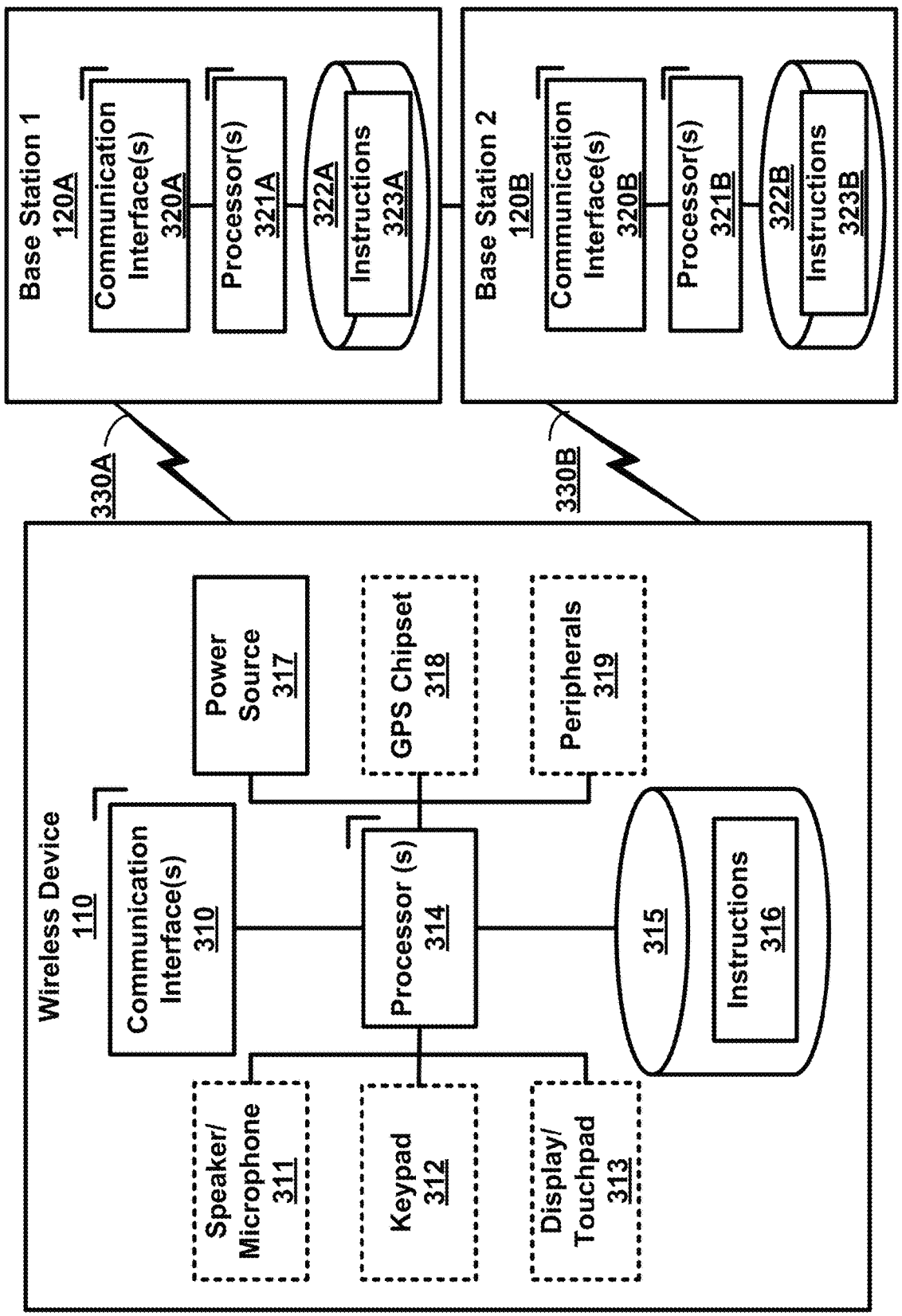
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting;

detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g., AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel. A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
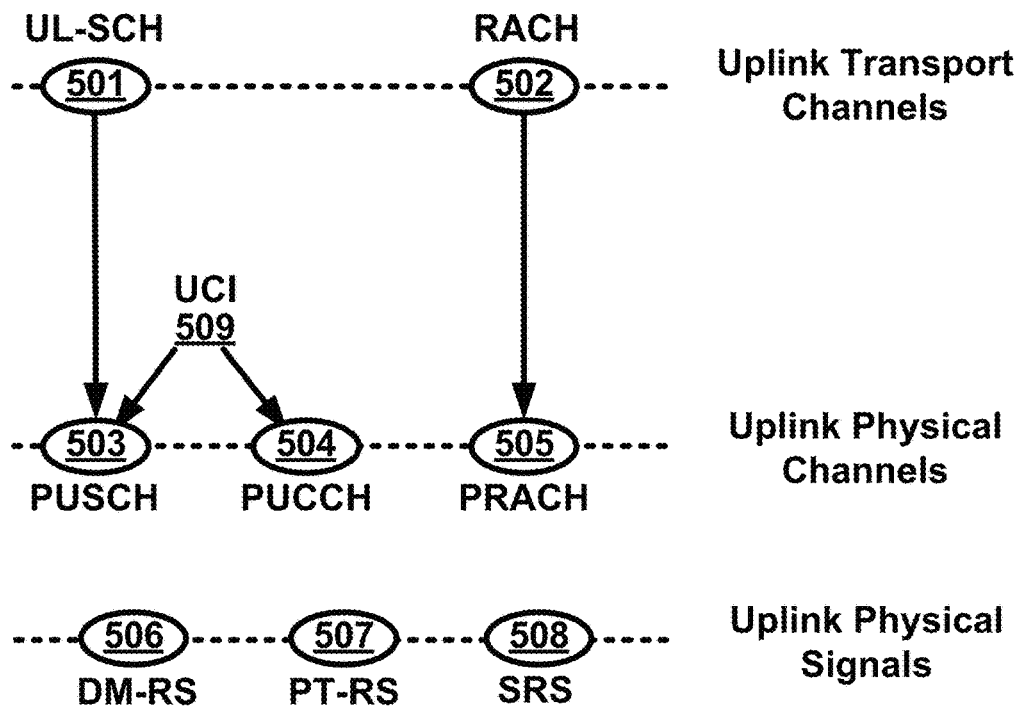
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
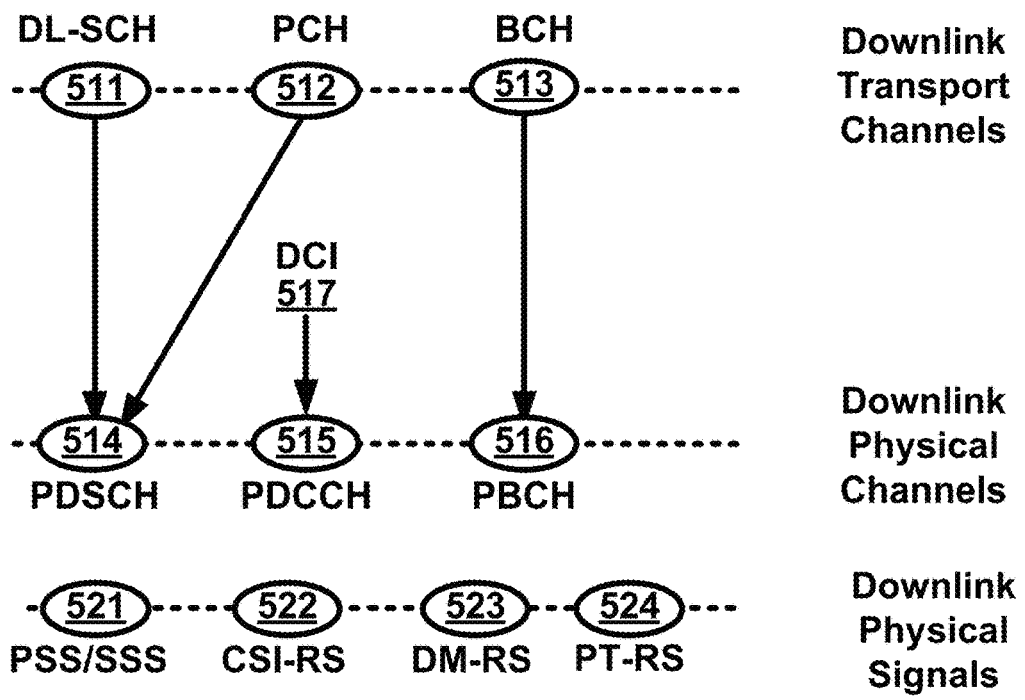
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SSB/PBCH, for example, if the downlink CSI-RS 522 and SSB/PBCH are spatially quasi co-located and resource elements associated with the downlink CSI-RS 522 are outside of the PRBs configured for the SSB/PBCH.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. ADM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
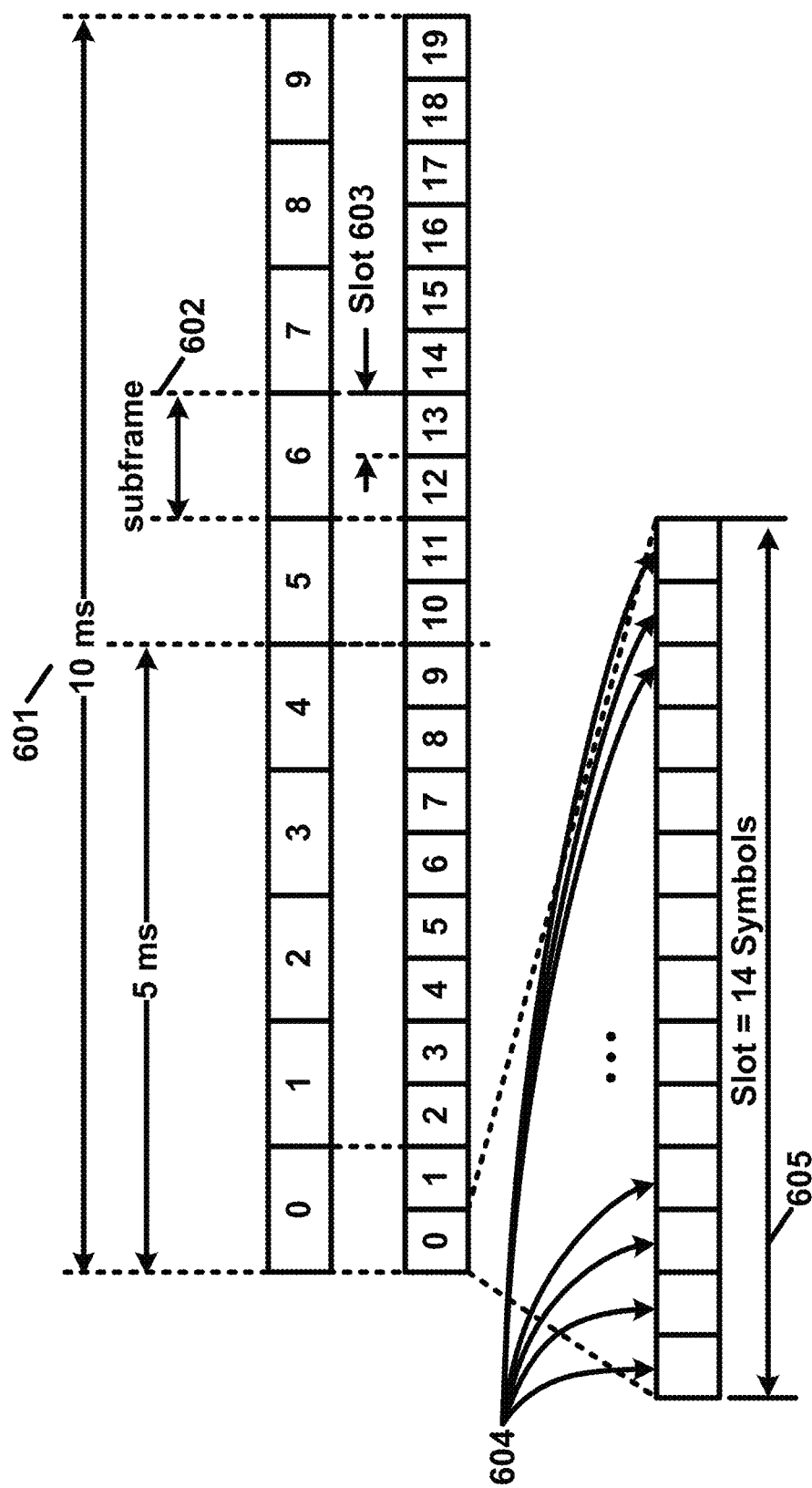
FIG. 6 shows an example transmission time and/or reception time for a carrier.

FIG. 6 shows an example frame structure, as well as an example frame structure, for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame structure. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
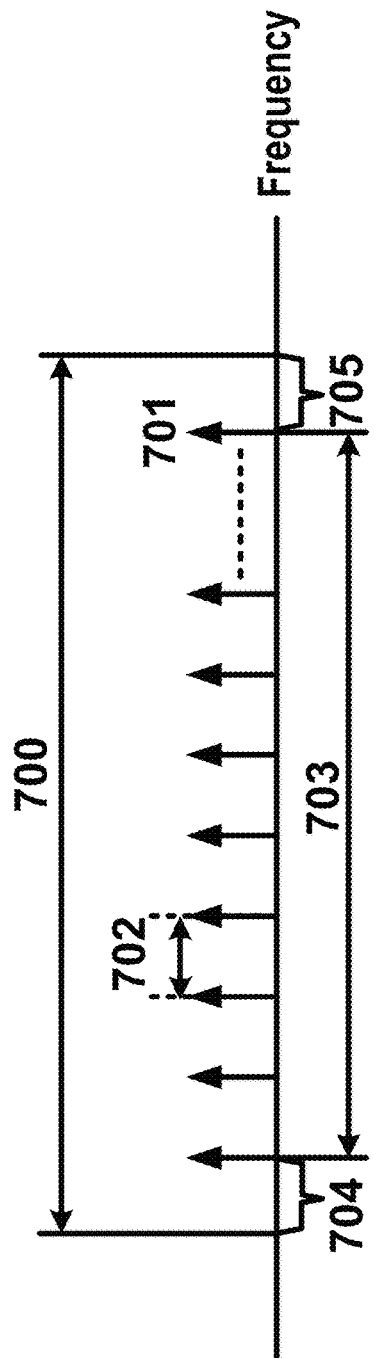
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
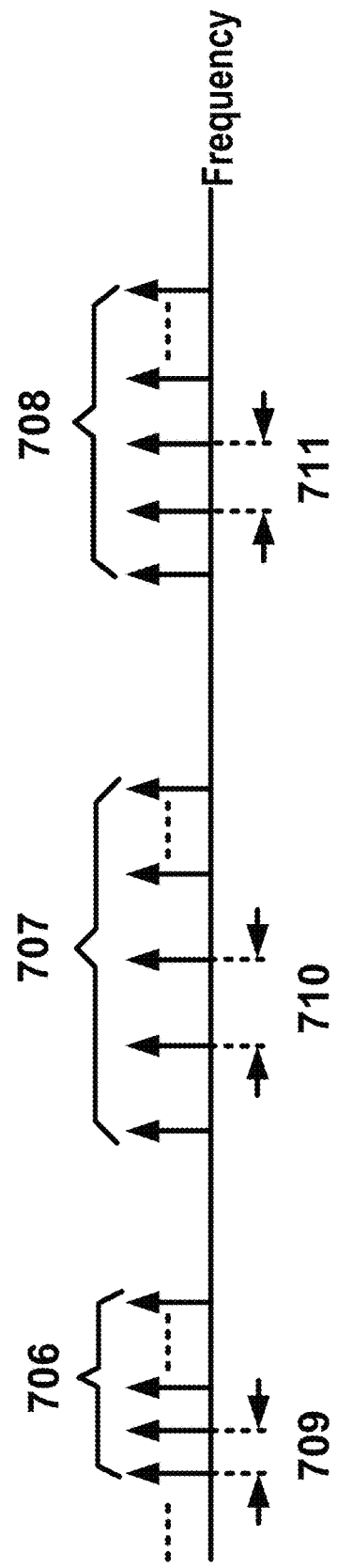

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
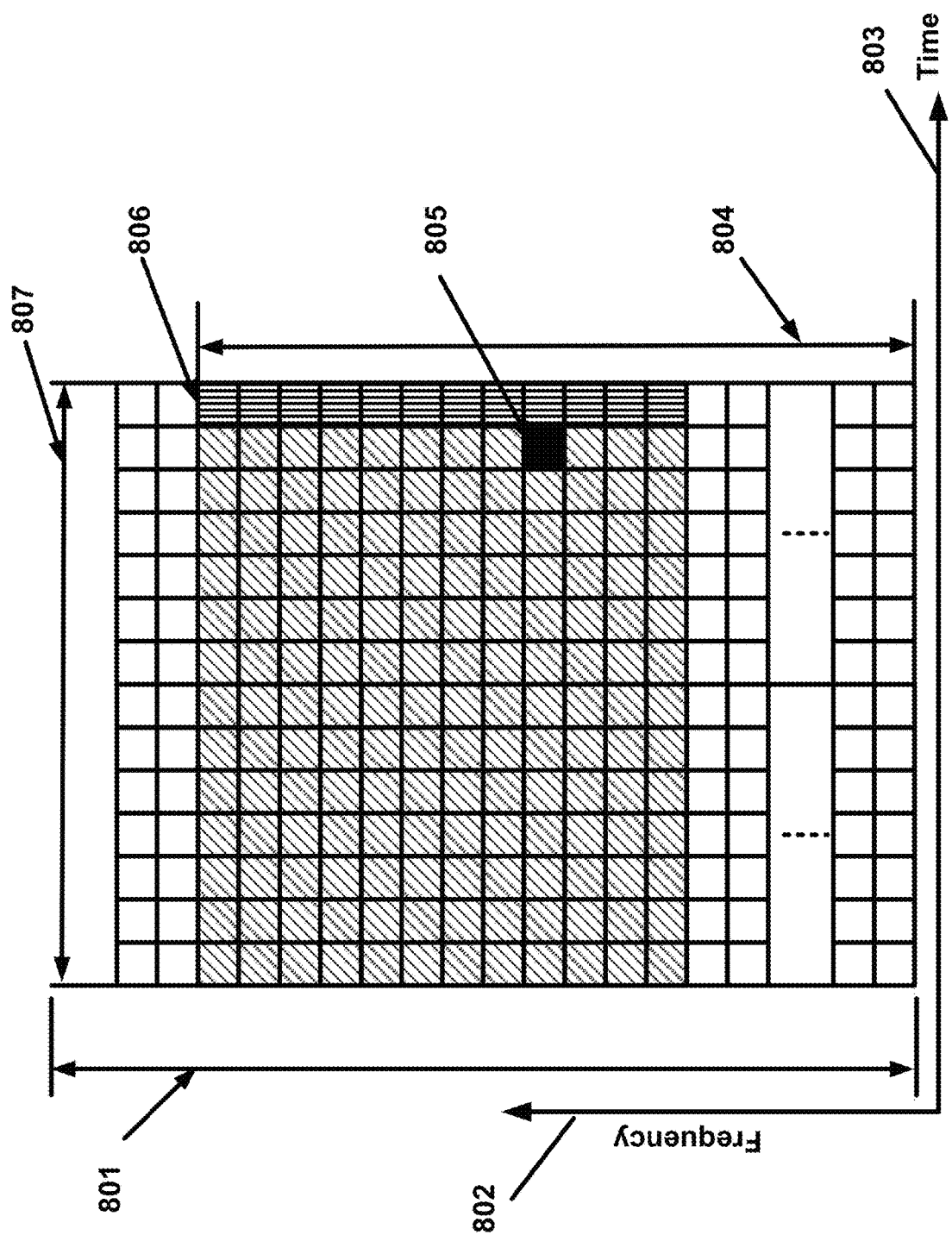
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
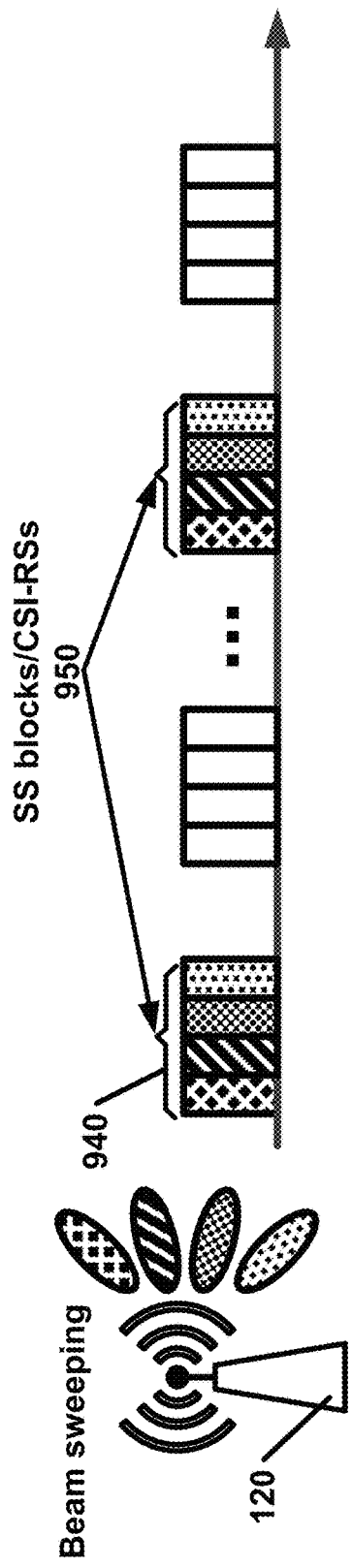
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
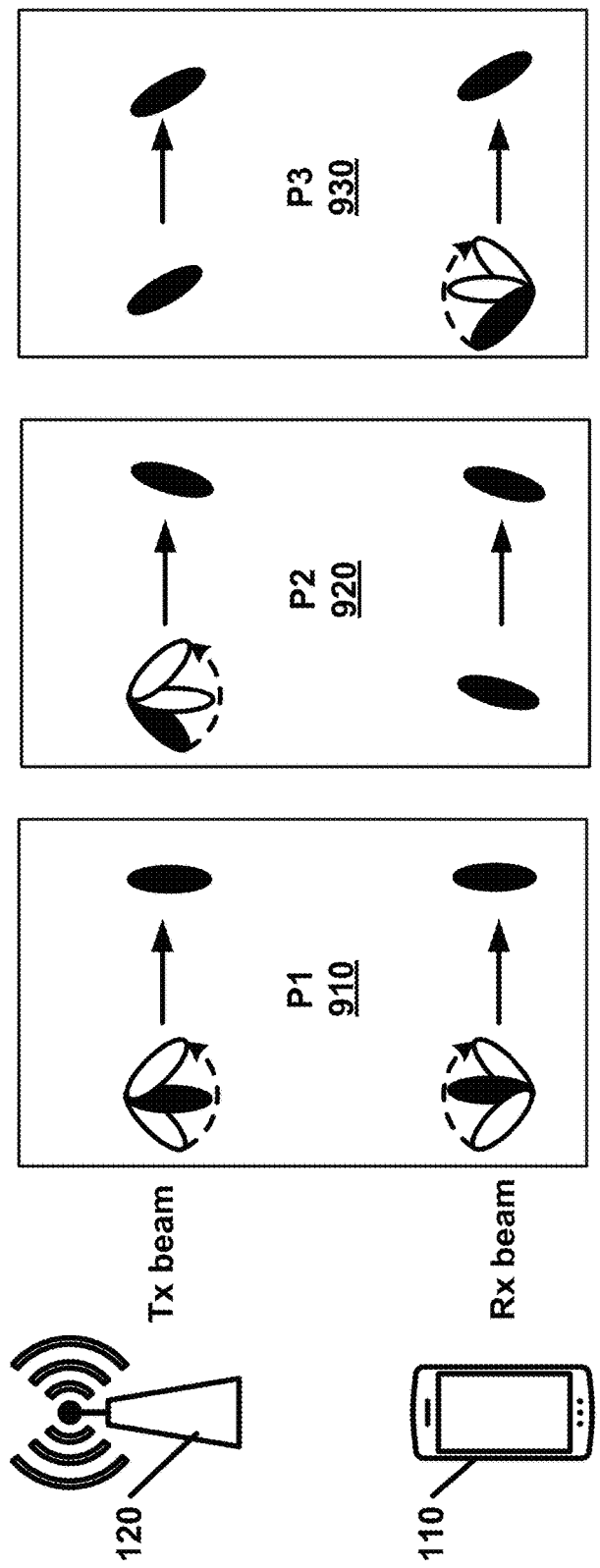
FIG. 9B shows an example downlink beam management procedure.

FIG. 9B shows an example of a beam management procedure, such as a new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth (s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
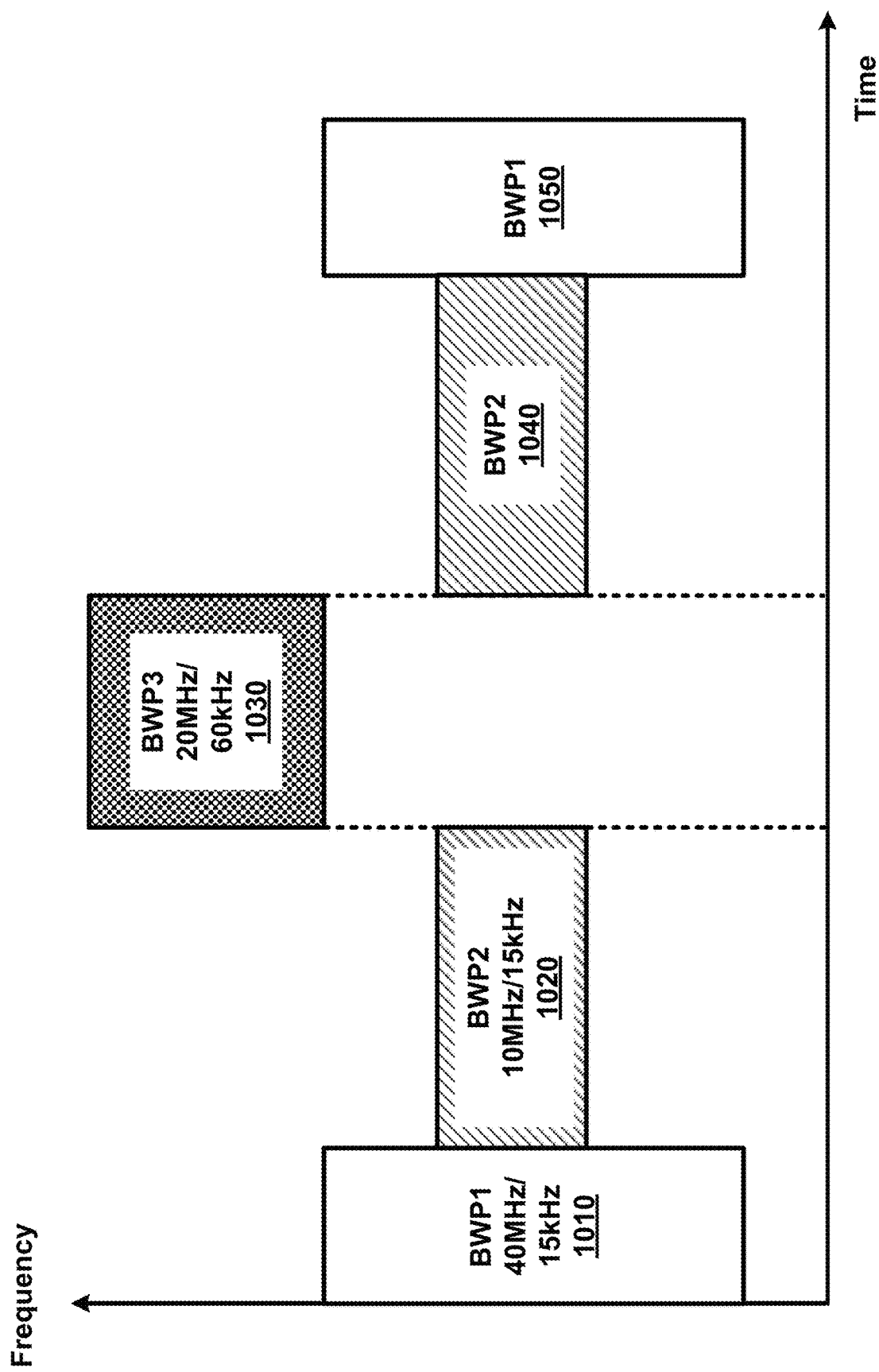
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a CORESETs for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
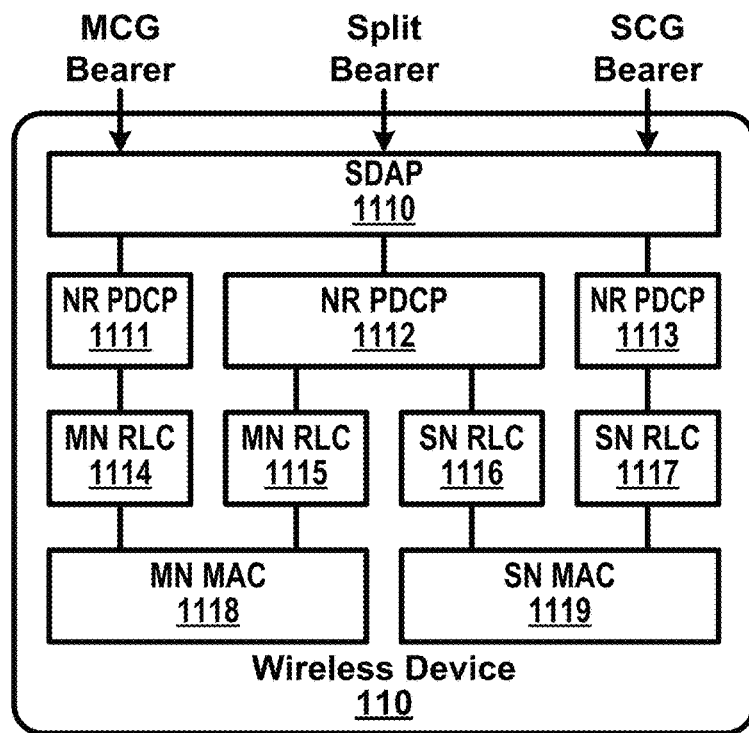
FIG. 11A and FIG. 11B show examples of multi connectivity.
Figure 11B:
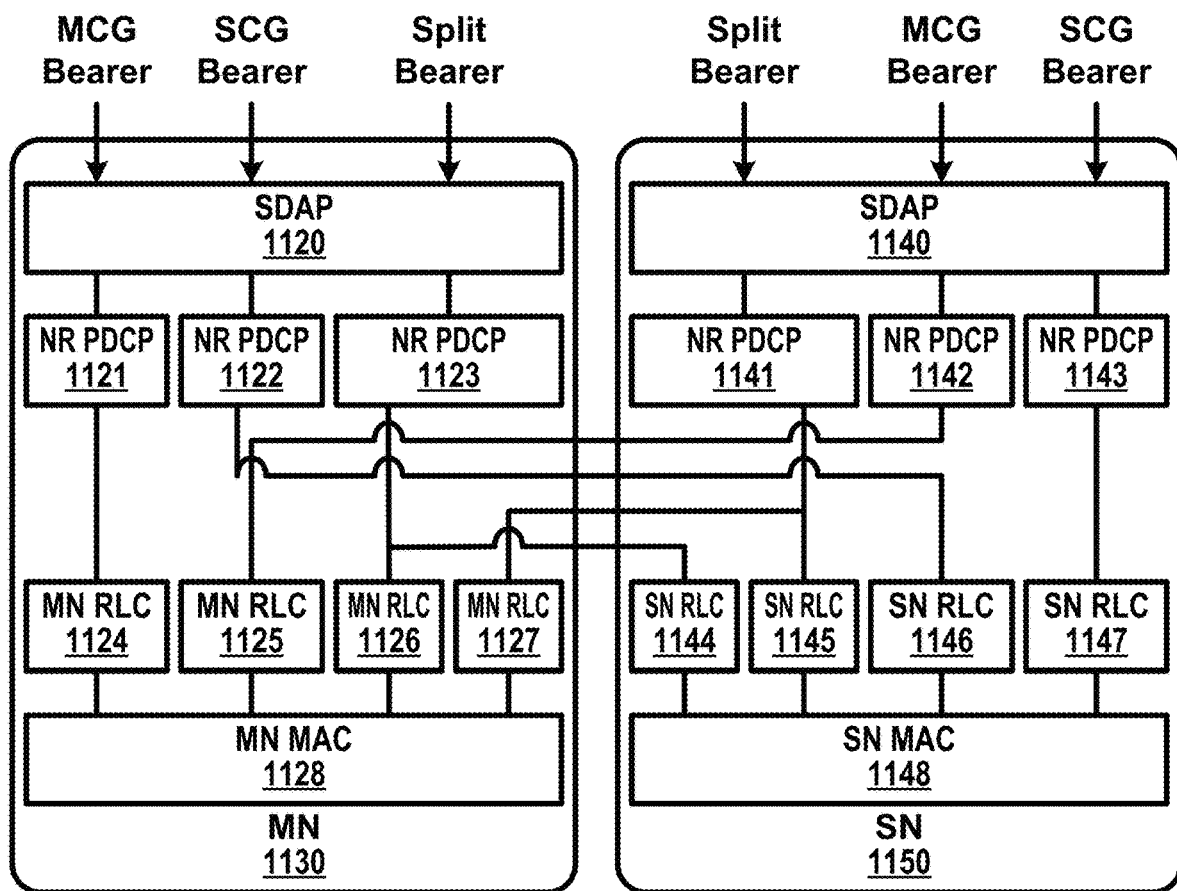

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
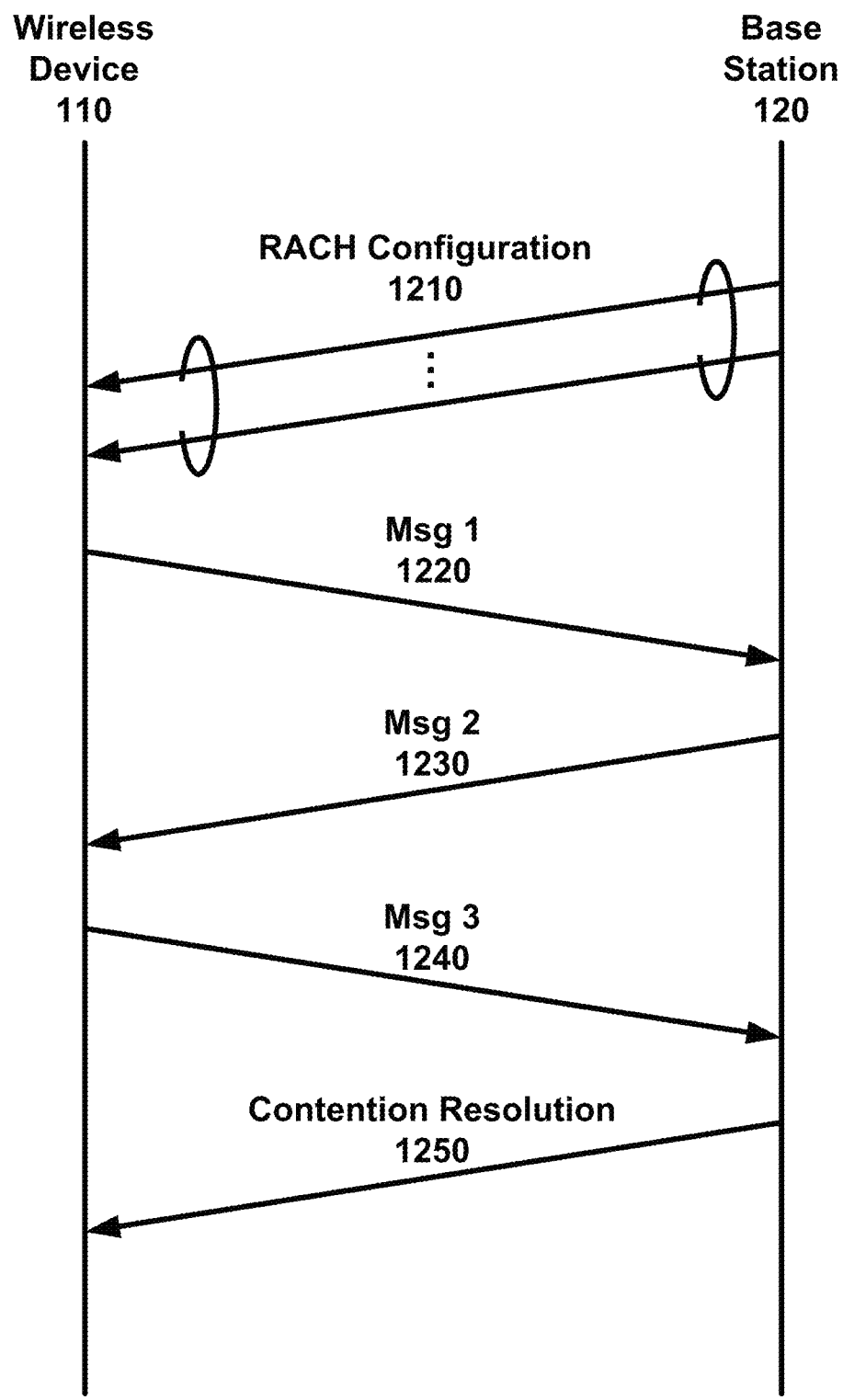
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery request and corresponding PRACH resource(s) (e.g., if any), a time window to monitor RA response(s), a time window to monitor response(s) on a beam failure recovery request, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery request associated with at least one of SS blocks and/or CSI-RSs. A wireless device may select a random access preamble index corresponding to a selected SS block or a CSI-RS from a set of one or more random access preambles for a beam failure recovery request, for example, if at least one of the SS blocks with an RSRP above a first RSRP threshold among associated SS blocks is available, and/or if at least one of CSI-RSs with a RSRP above a second RSRP threshold among associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold among associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold among the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
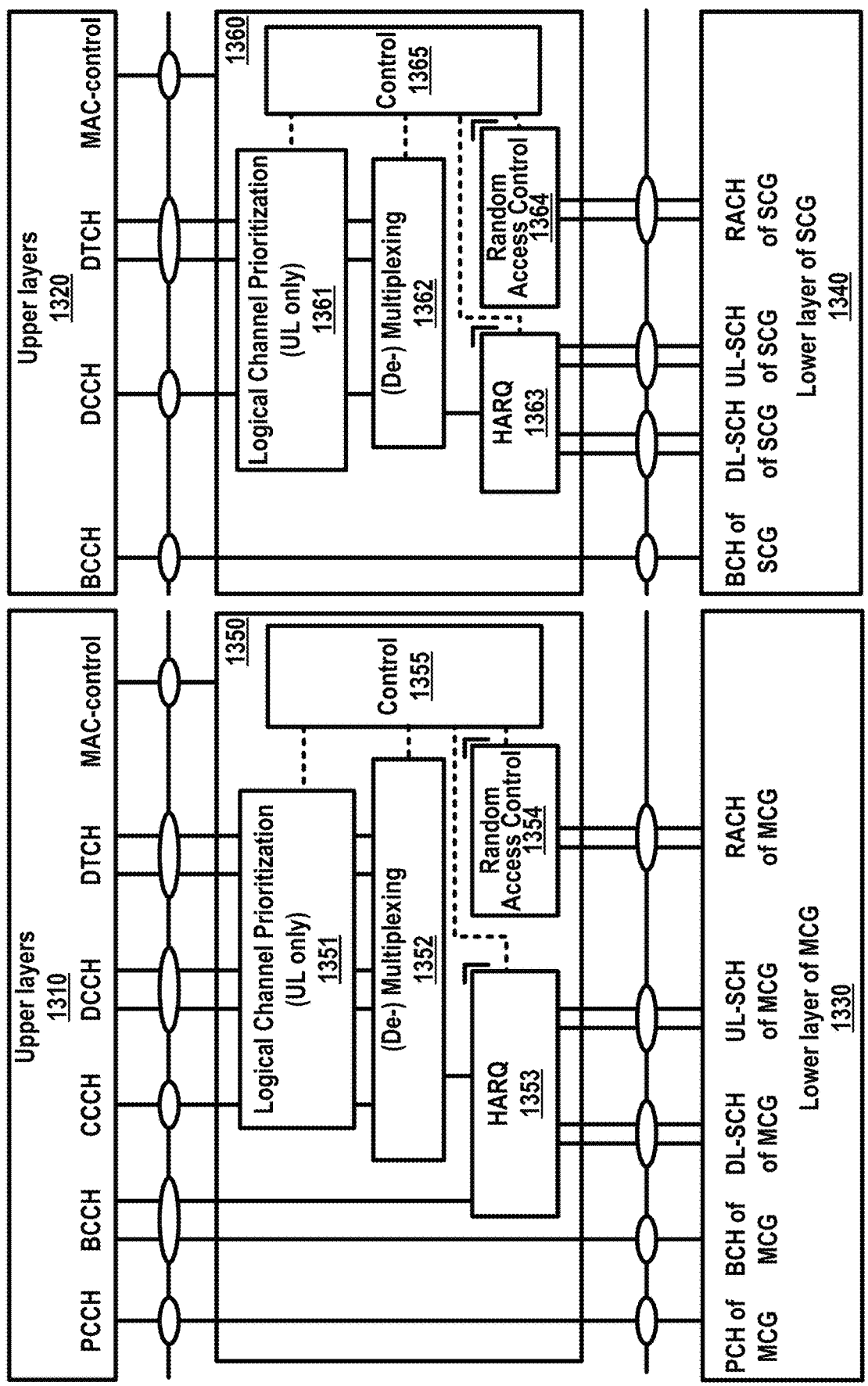
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
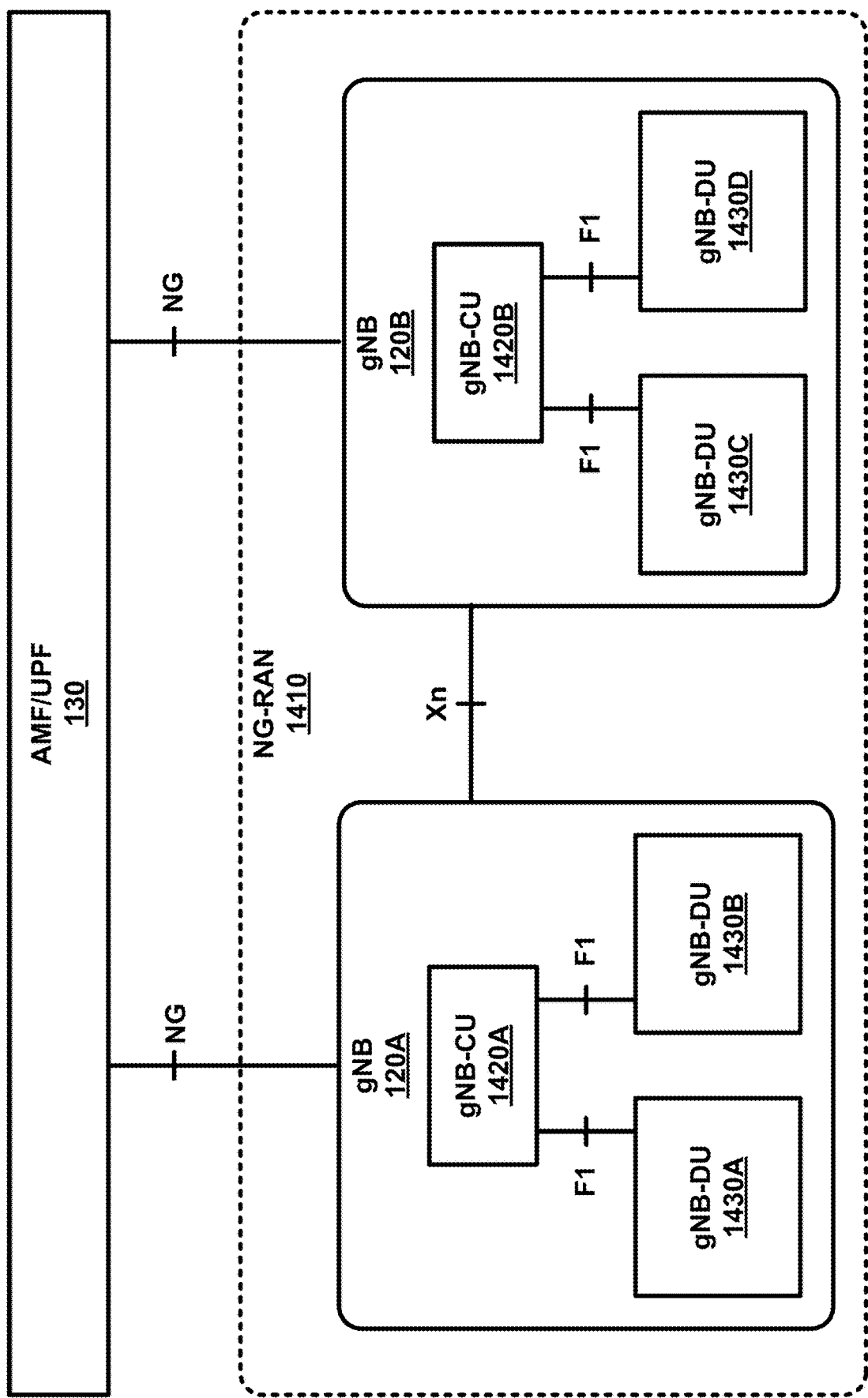
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
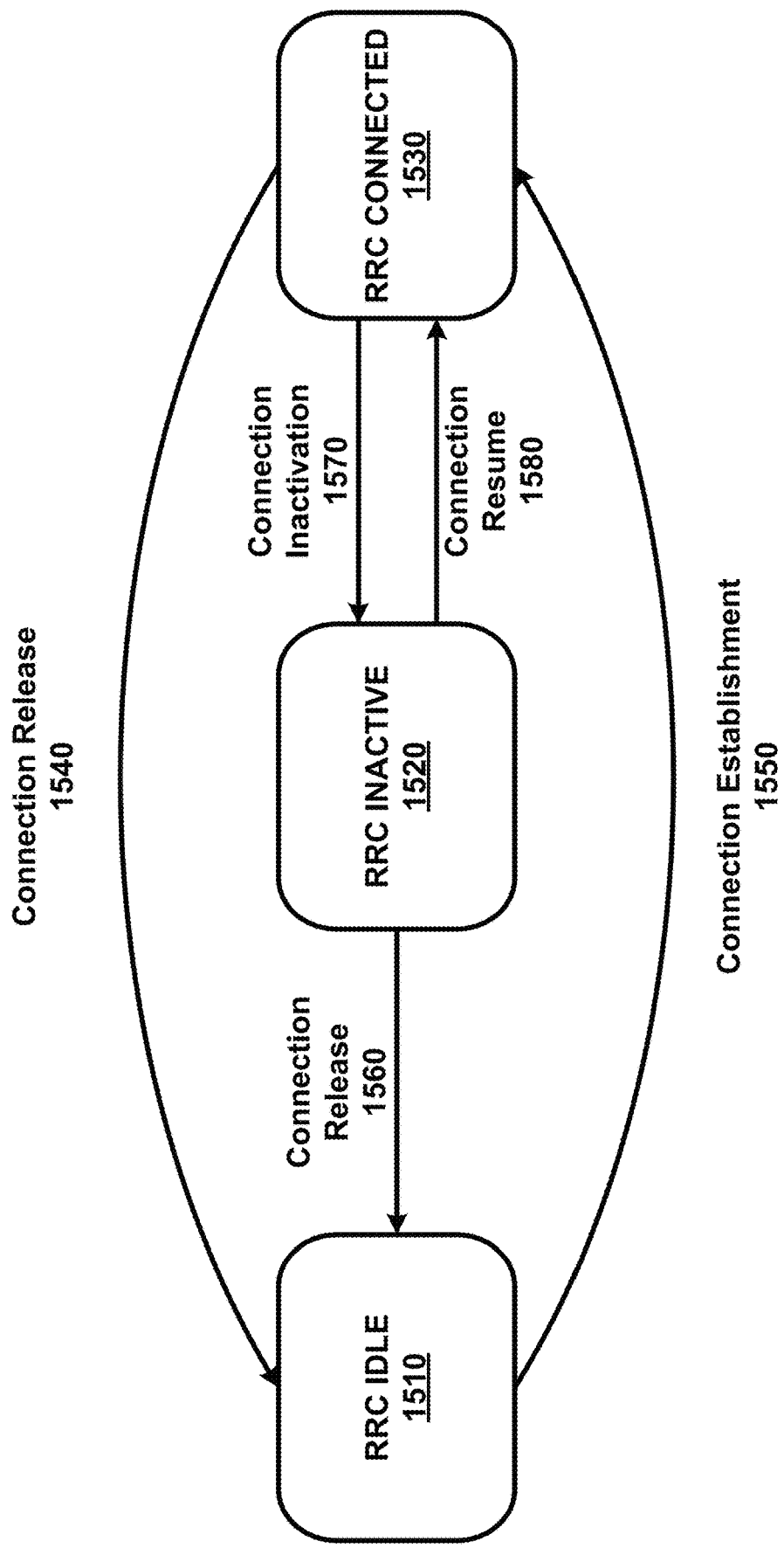
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/ MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer. Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

A serving cell may be configured with one or multiple BWPs. A maximum number/quantity of BWPs per serving cell may be a first quantity. The BWP switching for a serving cell may be used to activate an inactive BWP, and/or deactivate an active BWP, at a time. The BWP switching may be controlled: by a PDCCH message (e.g., order) indicating a downlink assignment or an uplink grant, by the timer (e.g., bwp-InactivityTimer), by RRC signaling, and/or by the wireless device (e.g., a MAC entity of a wireless device) itself (e.g., upon initiation of a random access procedure). The DL BWP and UL BWP indicated by a downlink BWP index (e.g., firstActiveDownlinkBWP-Id) and an uplink BWP index (e.g., firstActiveUplinkBWP-Id), respectively, may be active without receiving a PDCCH message indicating a downlink assignment or an uplink grant, for example, based on or in response to an addition of an SpCell or an activation of an SCell. The active BWP for a serving cell may be indicated, for example, by an RRC and/or a PDCCH message. A DL BWP may be paired with a UL BWP, and BWP switching may be common for both UL and DL, for example, for unpaired spectrum.

A wireless device (e.g., a MAC entity of the wireless device), for example, for an activated serving cell configured with a BWP (e.g., if the BWP is activated): may send (e.g., transmit) a message via an UL-SCH using the BWP; may send (e.g., transmit) a message via a RACH using the BWP; may monitor the PDCCH using the BWP; may send (e.g., transmit) a message via a PUCCH using the BWP; may send (e.g., transmit) an SRS using the BWP; may receive a message via a DL-SCH using the BWP; and/or may initialize and/or reinitialize suspended configured uplink grants (e.g., of configured grant Type 1) on the active BWP (e.g., according to the stored configuration, if any, and/or starting in a symbol).

A wireless device (e.g., a MAC entity of the wireless device), for example, for an activated serving cell configured with a BWP (e.g., if the BWP is deactivated): may not send (e.g., transmit) a message via an UL-SCH using the BWP; may not send (e.g., transmit) a message via a RACH using the BWP; may not monitor the PDCCH using the BWP; may not send (e.g., transmit) a message via a PUCCH using the BWP; may not report CSI for the BWP; may not send (e.g., transmit) an SRS using the BWP; may not receive a message via a DL-SCH using the BWP; may clear configured downlink assignment(s) and/or configured uplink grant(s) (e.g., of configured grant Type 2) using the BWP; and/or may suspend configured uplink grants (e.g., of configured grant Type 1) using the inactive BWP.

A wireless device (e.g., a MAC entity of the wireless device), for example, after initiation of the random access procedure on a serving cell (e.g., if random access resource occasions (e.g., PRACH occasions) are not configured for the active UL BWP): may switch the active UL BWP to a BWP indicated by an uplink BWP index (e.g., initialUplinkBWP). The wireless device (e.g., the MAC entity of the wireless device) may switch the active DL BWP to a BWP indicated by a downlink BWP index (e.g., initialDownlinkBWP), for example, if the serving cell is a SpCell. The wireless device (e.g., a MAC entity of the wireless device) may perform a random access procedure on the active DL BWP of an SpCell and/or an active UL BWP of the serving cell.

A wireless device (e.g., a MAC entity of the wireless device) may switch the active DL BWP to the DL BWP with the same index (e.g., bwp-Id) as the active UL BWP, for example, after initiation of the random access procedure on a serving cell, if PRACH occasions are configured for the active UL BWP, if the serving cell is a SpCell and/or if the active DL BWP does not have the same BWP index (e.g., bwp-Id) as the active UL BWP. The wireless device (e.g., MAC entity of the wireless device) may perform the random access procedure on the active DL BWP of SpCell and active UL BWP of the serving cell.

The wireless device (e.g., a MAC entity of the wireless device) may perform BWP switching to a BWP indicated by the PDCCH, for example, if the wireless device (e.g., MAC entity of the wireless device) receives a PDCCH for BWP switching of a serving cell, if there is no ongoing random access procedure associated with this serving cell; and/or if the ongoing random access procedure associated with this serving cell is successfully completed upon reception of this PDCCH addressed to the temporary identifier (e.g., C-RNTI).

A wireless device may switch a BWP and/or ignore a PDCCH message (e.g., order) for BWP switching, for example, if the wireless device (e.g., a MAC entity of the wireless device) receives a PDCCH message for BWP switching for a serving cell during a random access procedure associated with that serving cell. The wireless device may not switch a BWP and/or may not ignore a PDCCH message for BWP switching, for example, if a PDCCH reception for BWP switching is addressed to a temporary identifier (e.g., C-RNTI) that may indicate a successful random access procedure completion. The wireless device may perform BWP switching to a BWP indicated by the PDCCH message, for example, based on the PDCCH reception for BWP switching addressed to the temporary identifier (e.g., C-RNTI) for successful random access procedure completion. The wireless device may stop the ongoing random access procedure and/or may initiate a random access procedure on the new activated BWP, for example, after reception of the PDCCH message for BWP switching without successful contention resolution, if the wireless device decides to perform BWP switching. The wireless device (e.g., a MAC entity of the wireless device) may continue with an ongoing random access procedure on the active BWP, for example, if the wireless device (e.g., MAC entity of the wireless device) determines to ignore the PDCCH message for BWP switching.

A wireless device may, for each activated serving cell, start and/or restart an inactivity timer (e.g., bwp-InactivityTimer) associated with an active DL BWP, for example: if an inactivity timer (e.g., bwp-InactivityTimer) is configured, if the default downlink BWP (e.g., defaultDownlinkBWP) is configured, and the active DL BWP is not the BWP indicated by the default downlink BWP; if the default downlink BWP is not configured, and the active DL BWP is not the initial downlink BWP (e.g., initialDownlinkBWP), if a PDCCH message addressed to a temporary identifier (C-RNTI or CS-RNTI) indicating downlink assignment or uplink grant is received on the active BWP; if a PDCCH message addressed to the temporary identifier (C-RNTI or CS-RNTI) indicating downlink assignment or uplink grant is received for the active BWP; if a MAC PDU is sent in a configured uplink grant or received in a configured downlink assignment (e.g., if there is no ongoing random access procedure associated with this serving cell); and/or if the ongoing random access procedure associated with this serving cell is successfully completed upon reception of the PDCCH message addressed to C-RNTI.

A wireless device may, for each activated serving cell, start or restart the inactivity timer associated with the active DL BWP, for example: if an inactivity timer (e.g., bwp-InactivityTimer) is configured, if a default downlink BWP is configured, and the active DL BWP is not the BWP indicated by the default downlink BWP; and/or if the default downlink BWP is not configured, the active DL BWP is not the initial downlink BWP (e.g., if a PDCCH message for BWP switching is received on the active DL BWP), and/or the wireless device (e.g., a MAC entity of the wireless device) switches the active BWP.

A wireless device may, for each activated serving cell, stop the inactivity timer associated with the active DL BWP of this serving cell (if running), for example, if an inactivity timer (e.g., bwp-InactivityTimer) is configured, if the default Downlink BWP (e.g., defaultDownlinkBWP) is configured, and/or if the active DL BWP is not the BWP indicated by the default downlink BWP; and/or if the default downlink BWP is not configured and/or if the active DL BWP is not the initial downlink BWP (e.g., if random access procedure is initiated on this serving cell). The wireless device may stop the inactivity timer (e.g., bwp-InactivityTimer) associated with the active DL BWP of SpCell, if running, for example, if the serving cell is an SCell.

A wireless device (e.g., a MAC entity of the wireless device) may perform BWP switching to a BWP indicated by the default downlink BWP, for example, if the inactivity timer (e.g., bwp-InactivityTimer) is configured, if the default Downlink BWP (e.g., defaultDownlinkBWP) is configured, and/or if the active DL BWP is not the BWP indicated by the defaultDownlinkBWP; and/or if the default Downlink BWP (e.g., defaultDownlinkBWP) is not configured and the active DL BWP is not the initial downlink BWP, if the inactivity timer (e.g., bwp-InactivityTimer) associated with the active DL BWP expires, and/or if the default Downlink BWP (e.g., defaultDownlinkBWP) is configured. Otherwise, the wireless device may perform BWP switching to the initial downlink BWP.

A wireless device configured for operation in bandwidth parts (BWPs) of a serving cell may be configured, by higher layers (e.g., higher layer entities) for the serving cell, with a set having a maximum quantity (e.g., four) of bandwidth parts (BWPs) for reception by the wireless device (e.g., a DL BWP set) in a DL bandwidth by a parameter (e.g., BWP-Downlink) for a serving cell. The wireless device may be configured with a set having a maximum quantity (e.g., four) of BWPs for transmissions by the wireless device (e.g., UL BWP set) in an UL bandwidth by a parameter (e.g., BWP-Uplink) for the serving cell.

An initial active DL BWP may be indicated by a location and quantity of contiguous PRBs, a subcarrier spacing, and/or a cyclic prefix (e.g., for the control resource set for Type0-PDCCH common search space). For operation on the primary cell or on a secondary cell, a wireless device may be provided with an initial active UL BWP by a higher layer parameter (e.g., initialuplinkBWP). If the wireless device is configured with a supplementary carrier, the wireless device may be provided an initial UL BWP on the supplementary carrier by higher layer parameter (e.g., initialUplinkBWP) in a supplementary uplink parameter (e.g., supplementaryUplink). If a wireless device has dedicated BWP configuration, the wireless device may be provided by a higher layer parameter (e.g., firstActiveDownlinkBWP-Id) a first active DL BWP for receptions and by a higher layer parameter (e.g., firstActiveUplinkBWP-Id) for a first active UL BWP for transmissions on the primary cell.

For each DL BWP or UL BWP in a set of DL BWPs or UL BWPs, respectively, the wireless device may be configured with parameters for the serving cell: a subcarrier spacing provided by a higher layer parameter (e.g., subcarrierSpacing); a cyclic prefix provided by a higher layer parameter (e.g., cyclicPrefix); a first PRB and a quantity of contiguous PRBs indicated by a higher layer parameter (e.g., locationAndBandwidth) that may be interpreted as a resource indicator value (RIV) (e.g., setting=275) and the first PRB may be a PRB offset relative to the PRB indicated by higher layer parameters (e.g., offsetToCarrier and subcarrierSpacing); an index in the set of DL BWPs or UL BWPs by respective a higher layer parameter (e.g., bwp-Id); a set of BWP-common and a set of BWP-dedicated parameters by higher layer parameters (e.g., bwp-Common and bwp-Dedicated).

A DL BWP from the set of configured DL BWPs with index provided by higher layer parameter (e.g., bwp-Id) for the DL BWP may be linked with an UL BWP from the set of configured UL BWPs with index provided by higher layer parameter (e.g., bwp-Id) for the UL BWP, if the DL BWP index and the UL BWP index are equal, for example, for unpaired spectrum operation. A wireless device may not expect to receive a configuration in which the center frequency for a DL BWP may be different from the center frequency for an UL BWP, if the BWP index (e.g., bwp-Id) of the DL BWP is equal to the BWP index (e.g., bwp-Id) of the UL BWP, for example, for unpaired spectrum operation.

A wireless device may be configured with control resource sets for common search space and for wireless device-specific search space, for example, for each DL BWP in a set of DL BWPs on the primary cell. The wireless device may not expect to be configured without a common search space on the PCell, or on the PSCell, in the active DL BWP.

A wireless device may be configured with resource sets for PUCCH transmissions, for example, for each UL BWP in a set of UL BWPs. A wireless device may receive a message via a PDCCH and/or via a PDSCH using a DL BWP, for example, according to a configured subcarrier spacing and CP length for the DL BWP. A wireless device may send (e.g., transmit) a message via a PUCCH and/or via a PUSCH using an UL BWP, for example, according to a configured subcarrier spacing and CP length for the UL BWP.

A bandwidth part indicator field value may indicate the active DL BWP, from the configured DL BWP set, for DL receptions, for example, if a bandwidth part indicator field is configured in DCI format 1_1. The bandwidth part indicator field value may indicate the active UL BWP, from the configured UL BWP set, for UL transmissions, for example, if a bandwidth part indicator field is configured in DCI format 0_1.

A wireless device may prepend any number or character (e.g., zeros) to an information field, for example, until its size meets the size limitations for an information field for the UL BWP or DL BWP. The wireless device may prepend these zeroes prior to interpreting the DCI format 0_1 or DCI format 1_1 information fields, respectively, for example: if a bandwidth part indicator field is configured in DCI format 0_1 or DCI format 1_1; if a bandwidth part indicator field indicates an UL BWP and/or a DL BWP is different from the active UL BWP and/or the active DL BWP, respectively, for each information field in the received DCI format 0_1 or DCI format 1_1; and/or if the size of the information field is smaller than a size required for the DCI format 0_1 and/or DCI format 1_1 interpretation for the UL BWP and/or the DL BWP that is indicated by the bandwidth part indicator, respectively. The wireless device may use a quantity of least significant bits of DCI format 0_1 and/or DCI format 1_1 equal to the quantity required for the UL BWP and/or the DL BWP indicated by a bandwidth part indicator, for example, prior to interpreting the DCI format 0_1 and/or the DCI format 1_1 information fields, respectively, for example, if the size of the information field is larger than the size required for the DCI format 0_1 and/or DCI format 1_1 interpretation for the UL BWP and/or the DL BWP that is indicated by the bandwidth part indicator, respectively. The wireless device may set the active UL BWP and/or the DL BWP to the UL BWP and/or the DL BWP indicated by the bandwidth part indicator in the DCI format 0_1 or DCI format 1_1, respectively. A wireless device may expect to detect a DCI format 0_1 indicating active UL BWP change, and/or a DCI format 1_1 indicating active DL BWP change, for example, if a corresponding PDCCH message is received within a first quantity (e.g., 3) of symbols of a slot.

A wireless device may be provided by a higher layer parameter (e.g., defaultDownlinkBWP-Id) a default DL BWP among the configured DL BWPs, for example, for the primary cell. The default DL BWP may be the initial active DL BWP, for example, if a wireless device is not provided a default DL BWP by a higher layer parameter (e.g., defaultDownlinkBWP-Id). The wireless device procedures on the secondary cell may be the same as on the primary cell. The wireless device may use a timer value for the secondary cell and the default DL BWP for the secondary cell, for example, if a wireless device is configured for a secondary cell with higher layer parameter indicating a default DL BWP index (e.g., defaultDownlinkBWP-Id) for a default DL BWP among the configured DL BWPs. The wireless device may be configured with higher layer parameter inactivity timer (e.g., bwp-InactivityTimer) indicating a timer value.

The wireless device may increment a timer each interval of a particular frequency range (e.g., each 1 millisecond for frequency range 1, or each 0.5 milliseconds for frequency range 2), for example, based on: the wireless device not detecting a DCI format for message reception via a PDSCH on the primary cell (e.g., for paired spectrum operation); the wireless device not detecting a DCI format for message reception via a PDSCH; a DCI format for message transmission via a PUSCH on the primary cell (e.g., for unpaired spectrum operation during the interval); the wireless device being configured by a higher layer parameter indicating a timer value (e.g., bwp-InactivityTimer) for the primary cell; and/or the timer running.

The wireless device may increment the timer each interval of a particular frequency range (e.g., each 1 millisecond for frequency range 1, or each 0.5 milliseconds for frequency range 2), for example, based on: the wireless device not detecting a DCI format for message reception via a PDSCH on the secondary cell (e.g., for paired spectrum operation); the wireless device not detecting a DCI format for message reception via a PDSCH; a DCI format for message transmission via a PUSCH on the secondary cell (e.g., for unpaired spectrum operation during the interval); and/or if a wireless device is configured by a higher layer parameter indicating a timer value for a secondary cell and the timer is running, The wireless device may deactivate the secondary cell, for example, after the timer expires.

The wireless device may use the indicated DL BWP and/or the indicated UL BWP on the secondary cell as the first active DL BWP and/or the first active UL BWP on the secondary cell or supplementary carrier, for example, based on whether a wireless device is configured by a higher layer parameter indicating an active DL BWP index (e.g., firstActiveDownlinkBWP-Id) for a first active DL BWP, and/or by a higher layer parameter indicating an active UL BWP index (e.g., firstActiveUplinkBWP-Id) for a first active UL BWP on a secondary cell or supplementary carrier.

A wireless device may determine not to send (e.g., transmit) HARQ-ACK information via a PUCCH resource indicated by a DCI format 1_0 or a DCI format 1_1, for example, based on: paired spectrum operation; the wireless device changing its active UL BWP of the PCell between a time of a detection of the DCI format 1 0 or the DCI format 1_1; and/or a time of a corresponding HARQ-ACK information transmission via the PUCCH. A wireless device may not expect to monitor messages via a PDCCH, for example, based on the wireless device performing RRM over a bandwidth that is not within the active DL BWP for the wireless device.

FIG. 16 shows an example bandwidth part configuration information element (e.g., a BWP IE). A BWP IE may be used to configure a bandwidth part. The network may configure at least an initial bandwidth part comprising at least a downlink bandwidth part and one (e.g., if the serving cell is configured with an uplink) or two (e.g., if using supplementary uplink (SUL)) uplink bandwidth parts, for example, for each serving cell. The network may configure additional uplink and downlink bandwidth parts for a serving cell.

The bandwidth part configuration may be split into uplink and downlink parameters and/or into common and dedicated parameters. Common parameters (e.g., BWP-UplinkCommon and BWP-DownlinkCommon) may be cell specific and/or the network may ensure the necessary alignment with corresponding parameters of other wireless devices. Common parameters of the initial bandwidth part of the PCell may be provided via system information. The network may provide the common parameters via dedicated signaling.

A field, IE, or prefix (e.g., cyclic prefix) may indicate whether to use the extended cyclic prefix for this bandwidth part. The wireless device may use the normal cyclic prefix (CP), for example, if the CP is not set. Normal CP may be supported for all numerologies and slot formats. Extended CP may be supported only for 60 kHz subcarrier spacing (or some other frequency subcarrier spacing). A parameter (e.g., locationAndBanddwidth) may indicate a frequency domain location and/or a bandwidth of this bandwidth part. The value of the field may be interpreted as a RIV. A first PRB may be a PRB determined by a subcarrier spacing parameter (e.g., subcarrierSpacing) of this BWP and/or an offset parameter (e.g., offsetToCarrier (configured in SCS-SpecificCarrier contained within FrequencyInfoDL)) corresponding to this subcarrier spacing. A BWP-pair (e.g., UL BWP and DL BWP with the same index) may have the same center frequency, for example, based on use of TDD. The subcarrier spacing parameter may indicate subcarrier spacing to be used in this BWP for channels and reference signals unless explicitly configured elsewhere. The value kHz15 may correspond to µ=0, kHz30 to µ=1, and so on. The values 15, 30, or 60 kHz may be used. A BWP index (e.g., bwp-Id) may indicate an identifier for a bandwidth part.

Other parts of the RRC configuration may use the BWP index (e.g., BWP-Id) to associate with a particular bandwidth part. A BWP ID=0 may be associated with an initial BWP and/or may not be used with other bandwidth parts. The NW may trigger the wireless device to switch UL or DL BWP using a DCI field. The four code points in the DCI field may map to the RRC-configured BWP index (e.g., BWP-Id). The DCI code point may be equivalent to the BWP ID (initial=0, first dedicated=1, . . . ), for example, for up to three configured BWPs (in addition to the initial BWP). The BWPs may be identified by DCI code points 0 to 3, for example, if the NW configures 4 dedicated bandwidth parts. It may not be possible to switch to the initial BWP using the DCI field, for example, with this configuration. The BWP index (e.g., bwp-Id) may indicate an identifier for a bandwidth part. Other parts of the RRC configuration may use the BWP index (e.g., BWP-Id) to associate themselves with a particular bandwidth part. A BWP ID=0 may be associated with the initial BWP and may not be used in other bandwidth parts.

The NW may trigger the wireless device to switch an UL BWP and/or a DL BWP using a DCI field. The four code points in that DCI field may map to the RRC-configured BWP index (e.g., BWP-ID). The DCI code point may be equivalent to the BWP index (e.g., BWP ID where initial=0, first dedicated=1, . . . ), for example, for up to three configured BWPs (in addition to the initial BWP). The BWPs may be identified by DCI code points 0 to 3, for example, if the NW configures four dedicated bandwidth parts. It may not be possible to switch to the initial BWP using the DCI field, for example, with this configuration. A common random access configuration (e.g., rach-Config-Common) may indicate configuration of cell specific random access parameters that the wireless device may use for contention based random access, contention free random access, and/or contention based beam failure recovery. The NW may configure SSB-based RA (including RACH-ConfigCommon) for UL BWPs, for example, based on the linked DL BWPs allowing the wireless device to acquire the SSB associated to the serving cell. An uplink control channel configuration (e.g., PUCCH-config) may indicate an uplink control channel configuration (e.g., PUCCH configuration) for one BWP of the regular UL or SUL of a serving cell. The network may configure PUCCH on the BWPs of one of the uplinks (UL or SUL), for example, if the wireless device is configured with SUL.

The network may configure PUCCH-Config for each SpCell. The network may configure one additional SCell of a cell group with an uplink control channel configuration (e.g., PUCCH-Config for a PUCCH SCell), for example, if supported by the wireless device. The IE BWP-Id may be used to refer to BWP. The initial BWP may be referred to by a zero index (e.g., BWP-Id 0). The other BWPs may be referred to by a non-zero index (e.g., BWP-Id 1 to a maximum number/quantity of BWPs (e.g., maxNrofBWPs)).

FIG. 17 shows an example serving cell configuration information element. A serving cell configuration (e.g., ServingCellConfig IE) may be used to configure (e.g., add or modify) the wireless device with a serving cell. The serving cell may be the SpCell or an SCell of an MCG or SCG. The parameters of the serving cell configuration may comprise wireless device specific parameters and/or cell specific parameters (e.g. additionally configured BWPs).

An inactivity timer (e.g., bwp InactivityTimer) may be configured to have a duration in milliseconds (ms) after which the wireless device may fall back to the default bandwidth part. A value 0.5 ms may be applicable for carriers greater than 6 GHz. If the network releases the timer configuration, the wireless device may stop the timer without switching to the default BWP.

A default downlink BWP index (e.g., defaultDownlinkBWP-Id) may correspond to a default L1 downlink BWP parameter (e.g., 'default-DL-BWP'). The initial bandwidth part may be referred to by a BWP index (e.g., BWP-Id=0). The ID of the downlink bandwidth part may be used after timer expiry. This ID field may be wireless device specific. The wireless device may use the initial BWP as default BWP, for example, if the field is absent.

A downlink BWP list (e.g., downlinkBWP-ToAddModList) may indicate a list of additional downlink BWPs to be added or modified. A downlink BWP release list (e.g., downlinkBWP-ToReleaseList) may indicate a list of additional downlink BWPs to be released.

The active DL BWP index may contain the ID of the DL BWP to be activated, for example, based on or upon performing the reconfiguration in which it is received, for example, if an active DL BWP index (e.g., firstActiveDownlinkBWP-Id) is configured for an SpCell. The RRC reconfiguration may not impose a BWP switch (which may correspond to L1 parameter 'active-BWP-DL-Pcell'), for example, if the field is absent. The field may contain the ID of the downlink bandwidth part to be used upon MAC-activation of an SCell, for example, if configured for an SCell. The initial bandwidth part may be referred to by a zero index (e.g., BWP-Id=0).

An initial DL BWP parameter (e.g., initialDownlinkBWP) may indicate a dedicated (e.g., UE-specific) configuration for the initial downlink bandwidth-part. An active UL BWP index (e.g., firstActiveUplinkBWP-Id) may contain an ID of the DL BWP to be activated upon performing the reconfiguration in which it is received, for example, if configured for an SpCell. The RRC reconfiguration may not impose a BWP switch (e.g., corresponding to L1 parameter 'active-BWP-UL-Pcell'), for example, if the field is absent. The field may contain the ID of the uplink bandwidth part to be used upon MAC-activation of an SCell, for example, if configured for an SCell. The initial bandwidth part may be used in a BWP parameter (e.g., BandwidthPartId=0). An initial uplink BWP parameter (e.g., initialUplinkBWP) may indicate a dedicated (e.g., UE-specific) configuration for the initial uplink bandwidth-part.

A base station may send (e.g., transmit), to a wireless device, one or more messages indicating random access parameters. The one or more messages may be broadcast via RRC message, via wireless device specific RRC message, and/or via a combination thereof. The one or more messages may comprise at least one of a common, generic, and/or dedicated random access resource configuration (e.g., RACH-ConfigCommon, RACH-ConfigGeneric, and/or RACH-ConfigDedicated). A wireless device may receive, from a base station, a common and/or a generic random access resource configuration (e.g., RACH-ConfigCommon and/or RACH-ConfigGeneric), for example, for a contention based random access procedure. A wireless device may receive, from a base station, at least a dedicated random access resource configuration (e.g., RACH-ConfigDedicated), for example, for a contention free random access procedure.

FIG. 18 shows an example common random access resource configuration (e.g., a RACH-ConfigCommon IE). FIG. 19 shows example field descriptions of a common random access resource configuration (e.g., a RACH-ConfigCommon IE). FIG. 20 shows an example generic random access resource configuration (e.g., a RACH-ConfigGeneric IE), and example field descriptions. FIG. 21 shows an example dedicated random access resource configuration (e.g., a RACH-ConfigDedicated IE). FIG. 22 shows example field descriptions of the dedicated random access resource configuration (e.g., RACH-ConfigDedicated).

A random access procedure may be initiated in different ways, for example, based at least on one of a common random access resource configuration (e.g., RACH-ConfigCommon), a generic random access resource configuration (e.g., RACH-ConfigGeneric), and/or a dedicated random access resource configuration (e.g., RACH-ConfigDedicated). The random access procedure may be initiated by a PDCCH order sent (e.g., transmitted) by a base station, by the wireless device (e.g., a MAC entity of a wireless device) of a wireless device, and/or by RRC. A random access procedure may be ongoing at any point in time in a wireless device (e.g., a MAC entity of a wireless device). A random access procedure on an SCell may be initiated by a PDCCH order with an index (e.g., ra-PreambleIndex) different from 0b000000. The wireless device may continue with the ongoing procedure and/or start with the new procedure (e.g. for an SI request), for example, if the wireless device (e.g., a MAC entity of a wireless device) receives a request for a random access procedure at a time that another random access procedure is already ongoing in the wireless device (e.g., a MAC entity of a wireless device).

A base station may send (e.g., transmit) one or more RRC messages to configure a wireless device that include one or more parameters. A random access index parameter (e.g., prach-ConfigIndex) may indicate an available set of random access resource occasions (e.g., PRACH occasions) for transmission of the random access preamble. A random access power parameter (e.g., preambleReceivedTargetPower) may indicate an initial random access preamble power.

A RSRP SSB threshold parameter (e.g., rsrp-ThresholdSSB) may indicate an RSRP threshold for a selection of the SSB and corresponding random access preamble and/or random access resource occasion (e.g., PRACH occasion). The RSRP SSB threshold parameter may refer to a RSRP SSB threshold parameter in a beam failure recovery configuration (e.g., BeamFailureRecoveryConfig IE), for example, if the random access procedure is initiated for beam failure recovery.

A RSRP CSI-RS threshold parameter (e.g., rsrp-ThresholdCSI-RS) may indicate an RSRP threshold for the selection of CSI-RS and corresponding random access preamble and/or random access resource occasion (e.g., PRACH occasion). A RSRP CSI-RS threshold parameter may be set to a value calculated by multiplying the RSRP CSI-RS threshold parameter in a beam failure recovery configuration (e.g., BeamFailureRecoveryConfig IE) by a power control offset parameter (e.g., powerControlOffset), for example, if the random access procedure is initiated for beam failure recovery. A RSRP SSB SUL parameter (e.g., rsrp-ThresholdSSB-SUL) may indicate an RSRP threshold for the selection between the NUL carrier and the SUL carrier.

A power control offset parameter (e.g., powerControlOffset) may indicate a power offset between a RSRP SSB threshold parameter (e.g., rsrp-ThresholdSSB) and a RSRP CSI-RS threshold parameter (e.g., rsrp-ThresholdCSI-RS) to be used, for example, if the random access procedure is initiated for beam failure recovery. A power ramping step parameter (e.g., powerRampingStep) may indicate a power-ramping factor. A power ramping step high priority parameter (e.g., powerRampingStepHighPriority) may indicate a power-ramping factor in case of a differentiated random access procedure. A preamble index parameter (e.g., ra-PreambleIndex) may indicate a random access preamble index.

FIG. 23 shows example random access occasion mask index values for a random access occasion mask parameter (e.g., ra-ssb-OccasionMaskIndex). The random access occasion mask index values may define random access resource occasion(s) (e.g., PRACH occasion) associated with an SSB in which the wireless device (e.g., a MAC entity of a wireless device) may send (e.g., transmit) a random access preamble.

An occasion list parameter (e.g., ra-OccasionList) may define a random access resource occasion(s) (e.g., PRACH occasion) associated with a CSI-RS in which the wireless device (e.g., a MAC entity of a wireless device) may send (e.g., transmit) a random access preamble. A preamble maximum transmission parameter (e.g., preambleTransMax) may define the maximum quantity of random access preamble transmissions. A SSB mapping parameter (e.g., ssb-perRACH-OccasionAndCB-PreamblesPerSSB) may define a quantity of SSBs mapped to each random access resource occasion (e.g., PRACH occasion). A quantity of random access preambles mapped to each SSBA random access preamble occasion parameter may indicate: a set of random access preambles and/or random access resource occasions (e.g., PRACH occasions) for SI request, if any; and/or a set of random access preambles and/or random access resource occasions (e.g., PRACH occasions) for beam failure recovery request, if any. A response window parameter (e.g., ra-ResponseWindow) may indicate a time window to monitor RA response(s). A contention resolution timer parameter (e.g., ra-ContentionResolutionTimer) may indicate a configuration for the Contention Resolution Timer.

A random access procedure may be initiated for beam failure detection and recovery. A wireless device may be configured by RRC with a beam failure recovery procedure that may be used for indicating to the serving base station of a SSB or CSI-RS, for example, if beam failure is detected on the serving SSB(s)/CSI-RS(s). Beam failure may be detected by counting beam failure instance indication from the lower layers of the wireless device (e.g., a MAC entity of a wireless device). A base station may configure, via RRC, the parameters in a beam failure recovery configuration (e.g., BeamFailureRecoveryConfig) for a beam failure detection and recovery procedure. A beam failure maximum count parameter (e.g., beamFailureInstanceMaxCount) may indicate a maximum count value for the beam failure detection. A beam failure timer parameter (e.g., beamFailureDetectionTimer) may indicate a configuration for a timer for the beam failure detection. A beam failure recovery timer parameter (e.g., beamFailureRecoveryTimer) may indicate a configuration for a timer for a beam failure recovery procedure. A RSRP SSB threshold (e.g., rsrp-ThresholdSSB) may indicate an RSRP threshold for the beam failure recovery.

A power ramping step parameter (e.g., powerRampingStep) may indicate a power ramping factor for a beam failure recovery. A preamble target power parameter (e.g., preambleReceivedTargetPower) may indicate a target power for the beam failure recovery. A maximum quantity of preambles parameter (e.g., preambleTransMax) may indicate a maximum quantity of preambles for the beam failure recovery. A response window parameter (e.g., ra-ResponseWindow) may indicate a time window to monitor response(s) for the beam failure recovery using contention-free random access preamble. A random access configuration index parameter (e.g., prach-ConfigIndex) may indicate a preamble format and PRACH subframe assignment index for the beam failure recovery. An occasion mask index parameter (e.g., ra-ssb-OccasionMaskIndex) may indicate a SSB mask index for the beam failure recovery. An occasion list parameter (e.g., ra-OccasionList) may indicate random access resource occasions for the beam failure recovery.

A wireless device may use one or more parameters for a random access procedure. A wireless device may use at least one of PREAMBLE_INDEX; PREAMBLE_TRANSMISSION_COUNTER; PREAMBLE_POWER_RAMPING_COUNTER; PREAMBLE_POWER_RAMPING_STEP; PREAMBLE_RECEIVED_TARGET_POWER; PREAMBLE_BACKOFF; PCMAX; SCALING_FACTOR_BI; and/or TEMPORARY_C-RNTI.

A wireless device may perform random access resource selection for selecting one or more preambles and one or more random access resource occasions (e.g., PRACH occasions) (or resources comprising time, frequency, and/or code). A wireless device may determine one or more operations have occurred or settings configured. A random access procedure may be initiated for beam failure recovery. The beamFailureRecoveryTimer may be running or not configured. The contention-free random access resources for beam failure recovery request associated with any of the SSBs and/or CSI-RSs may be explicitly provided by RRC signaling. At least one of the SSBs may be available, for example, based on SS-RSRP above a threshold (e.g., rsrp-ThresholdSSB) among the SSBs in a candidate beam list (e.g., candidateBeamRSList), and/or the CSI-RSs with CSI-RSRP above a threshold (e.g., rsrp-ThresholdCSI-RS) among the CSI-RSs in a candidate beam list (e.g., candidateBeamRSList). The wireless device may select an SSB with SS-RSRP above a threshold (e.g., rsrp-ThresholdSSB) among the SSBs in a candidate beam list (e.g., candidateBeamRSList) or a CSI-RS with CSI-RSRP above a threshold (e.g., rsrp-ThresholdCSI-RS) among the CSI-RSs in a candidate beam list (e.g., candidateBeamRSList), for example, based these observations by the wireless device. A wireless device may set a PREAMBLE_INDEX to a preamble index parameter (e.g., ra-PreambleIndex) corresponding to the SSB in a candidate beam list (e.g., candidateBeamRSList) which is quasi-collocated with the selected CSI-RS, for example, if CSI-RS is selected, and there is no ra-PreambleIndex associated with the selected CSI-RS. The wireless device may set the PREAMBLE_INDEX to the preamble index parameter corresponding to the selected SSB or CSI-RS from the set of random access preambles for beam failure recovery request.

A random access procedure may be initiated and/or a preamble index parameter (e.g., ra-PreambleIndex) may be explicitly provided via PDCCH and/or RRC signaling. For example, the preamble index parameter may not be 0b000000, and/or a contention-free random access resource associated with SSBs and/or CSI-RSs may not be explicitly provided by RRC signaling. A wireless device may set the PREAMBLE_INDEX to the signaled preamble index parameter.

A random access procedure may be initiated, and/or the contention-free random access resources associated with SSBs may be explicitly provided, via RRC, and at least one SSB with SS-RSRP above a threshold (e.g., rsrp-ThresholdSSB) among the associated SSBs may be available. The wireless device may select an SSB with SS-RSRP above the threshold (e.g., rsrp-ThresholdSSB) among the associated SSBs. The wireless device may set the PREAMBLE_INDEX to a preamble index parameter (e.g., ra-PreambleIndex) corresponding to the selected SSB.

A wireless device may initiate a random access procedure. Contention-free random access resources associated with CSI-RSs may be explicitly provided via RRC signaling, and at least one CSI-RS with CSI-RSRP above a threshold (e.g., rsrp-ThresholdCSI-RS) among the associated CSI-RSs may be available. A wireless device may select a CSI-RS with CSI-RSRP above a threshold (e.g., rsrp-ThresholdCSI-RS) among the associated CSI-RSs. The wireless device may set the PREAMBLE_INDEX to a preamble index parameter (e.g., ra-PreambleIndex) corresponding to the selected CSI-RS.

A wireless device may initiate a random access procedure, for example, based on at least one of the SSBs with SS-RSRP above a threshold (e.g., rsrp-ThresholdSSB) being available. A wireless device may select an SSB with SS-RSRP above a threshold (e.g., rsrp-ThresholdSSB). Alternatively, the wireless device may select any SSB. The wireless device may perform a random access resource selection, for example, if Msg3 is being resent (e.g., retransmitted). A wireless device may select a same group of random access preambles as was used for the random access preamble transmission attempt corresponding to a first transmission of Msg3. A wireless device may select a preamble index parameter (e.g., ra-PreambleIndex) randomly (e.g., with equal probability from the random access preambles associated with the selected SSB and the selected random access preambles group), for example, if the association between random access preambles and SSBs is configured. If the association between random access preambles and SSBs is not configured, a wireless device may select a preamble index parameter (e.g., ra-PreambleIndex) randomly (e.g., with equal probability from the random access preambles within the selected random access preambles group). A wireless device may set the PREAMBLE_INDEX to the selected a preamble index parameter (e.g., ra-PreambleIndex).

A wireless device may determine the next available random access resource occasion (e.g., PRACH occasion) from the random access resource occasions (e.g., PRACH occasions) corresponding to the selected SSB permitted by the restrictions given by the occasion mask index parameter (e.g., ra-ssb-OccasionMaskIndex), for example, if configured, if an SSB is selected, and/or an association between random access resource occasions (e.g., PRACH occasions) and SSBs is configured. The wireless device (e.g., a MAC entity of a wireless device) may select a random access resource occasion (e.g., PRACH occasion) randomly (e.g., with equal probability among the random access resource occasions (e.g., PRACH occasions) occurring simultaneously but on different subcarriers, corresponding to the selected SSB). The wireless device (e.g., a MAC entity of a wireless device) may take into account the possible occurrence of measurement gaps, for example, if determining the next available random access resource occasion (e.g., PRACH occasion) corresponding to the selected SSB.

A wireless device may determine the next available random access resource occasion (e.g., PRACH occasion) from the random access resource occasions (e.g., PRACH occasions) in an occasion list parameter (e.g., ra-OccasionList) corresponding to the selected CSI-RS, for example, if a CSI-RS is selected and an association between random access resource occasions (e.g., PRACH occasions) and CSI-RSs is configured. The wireless device (e.g., a MAC entity of a wireless device) may select a random access resource occasion (e.g., PRACH occasion) randomly (e.g., with equal probability among the random access resource occasions (e.g., PRACH occasions) occurring simultaneously but on different subcarriers, corresponding to the selected CSI-RS). The wireless device (e.g., a MAC entity of a wireless device) may take into account the possible occurrence of measurement gaps during determining the next available random access resource occasion (e.g., PRACH occasion) corresponding to the selected CSI-RS.

A wireless device may determine the next available random access resource occasion (e.g., PRACH occasion) from the random access resource occasions (e.g., PRACH occasions), for example, permitted by the restrictions given by an occasion mask index parameter (e.g., ra-ssb-OccasionMaskIndex), if configured. The occasion mask index parameter may correspond to the SSB in the candidateBeamRSList, which may be quasi-collocated with the selected CSI-RS, if a CSI-RS is selected and/or if there is no contention-free random access resource associated with the selected CSI-RS. The wireless device (e.g., a MAC entity of a wireless device) may take into account the possible occurrence of measurement gaps, for example, during determining the next available random access resource occasion (e.g., PRACH occasion) corresponding to the SSB which may be quasi-collocated with the selected CSI-RS.

A wireless device may determine a next available random access resource occasion (e.g., PRACH occasion). The wireless device (e.g., a MAC entity of a wireless device) may select a random access resource occasion (e.g., PRACH occasion) randomly (e.g., with equal probability among the random access resource occasions (e.g., PRACH occasions) occurring simultaneously but on different subcarriers). The wireless device (e.g., a MAC entity of a wireless device) may take into account a possible occurrence of measurement gaps during determining the next available random access resource occasion (e.g., PRACH occasion).

A wireless device may perform a random access preamble transmission, for example, based on a selected PREABLE INDEX and random access resource occasion (e.g., PRACH occasion). A wireless device may increment a power ramping counter (e.g., PREAMBLE_POWER_RAMPING_COUNTER) by 1, for example, if a notification of suspending power ramping counter has not been received from lower layers (e.g., lower layer entities of the wireless device); and/or if SSB selected is not changed (e.g., a same SSB as a previous random access preamble transmission). The wireless device may select a value of DELTA_PREAMBLE that may be predefined and/or semi-statistically configured by a base station. The wireless device may set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP. The wireless device (e.g., via an entity of the wireless device) may instruct a physical layer entity of the wireless device to send (e.g., transmit) the random access preamble via the selected random access resource (e.g., PRACH), corresponding RA-RNTI (if available), PREAMBLE_INDEX, and/or PREAMBLE_RECEIVED_TARGET_POWER. The wireless device may determine an RA-RNTI associated with the random access resource occasion (e.g., PRACH occasion) in which the random access preamble is sent (e.g., transmitted). The RA-RNTI associated with the PRACH in which the random access preamble is sent, may be determined as:

RA-RNTI=1+s_id+14×t_id+14×80×f_id+14×80×8×ul_carrier_id s_id may be the index of the first OFDM symbol of the specified PRACH (0≤s_id<14). t_id may be the index of the first slot of the specified PRACH in a system frame (0≤t_id<80). f_id may be the index of the specified PRACH in the frequency domain (0≤f_id<8). ul_carrier_id may be the UL carrier used for Msg1 transmission (0 for NUL carrier, and 1 for SUL carrier).

An amount of data traffic carried over a network may be expected to change over time. A quantity of users and/or devices may increase. Each user and/or device may access an increasing quantity and/or variety of services (e.g., video delivery, large files, images, etc.). Network access may not only require high capacity, but also may cause provisioning very high data rates to meet user expectations for interactivity and/or responsiveness. More spectrum may be needed for operators to meet the increasing demand. It may be beneficial that more spectrum be made available for deploying macro cells as well as small cells for communications systems, for example, considering user expectations of high data rates along with seamless mobility.

There may be increasing interest from operators in deploying some complementary access utilizing unlicensed spectrum to meet traffic growth, for example, striving to meet the market demands. Operator-deployed Wi-Fi networks and the 3GPP standardization of interworking solutions with Wi-Fi (e.g., LTE/WLAN interworking) may indicate operator interest. This interest may indicate that unlicensed spectrum, if present, may be an effective complement to licensed spectrum for network operators to help address traffic increase. In at least some systems (e.g., LTE), licensed assisted access (LAA) and/or new radio on unlicensed band(s) (NR-U) may offer an alternative for operators to make use of unlicensed spectrum for managing a network. This use of unlicensed spectrum may offer new possibilities for optimizing a network's efficiency.

Listen-before-talk (LBT) may be implemented for transmission in a cell (which may be referred to as an LAA cell and/or a NR-U cell). An LAA cell, NR-U cell, and/or any other cell may be interchangeable and may refer a cell operating in unlicensed band. The cell may be operated as non-standalone or standalone, with or without an anchor cell in licensed band, configured in an unlicensed band. An LBT procedure may comprise a clear channel assessment. In an LBT procedure, a wireless device and/or a base station may apply a clear channel assessment (CCA) check before using the channel. The CCA may utilize at least energy detection to determine the presence or absence of other signals on a channel in order to determine whether a channel is occupied or clear. A regulation of a country may alter configurations of the LBT procedure. European and Japanese regulations may mandate the usage of LBT in the unlicensed bands, for example, in a 5 GHz unlicensed band. Carrier sensing via LBT may be used for equitable sharing of the unlicensed spectrum.

Discontinuous transmission on an unlicensed carrier with limited maximum transmission duration may be enabled. Channel reservation may be enabled by the transmission of signals (e.g., by an NR-U node), after gaining channel access via a successful LBT operation. Channel reservation may enable other nodes that receive a sent (e.g., transmitted) signal with energy above a certain threshold a capability to sense the channel to be occupied. Functions that may need to be supported by one or more signals for operation in unlicensed band with discontinuous downlink transmission may include one or more of: detection of the downlink transmission in unlicensed band (including cell identification) by wireless devices; and/or time and frequency synchronization of wireless devices.

DL transmission and frame structure design for an operation in unlicensed band may use subframe boundary alignment according to carrier aggregation timing relationships across serving cells aggregated by CA. Base station transmissions may not start at the subframe boundary. LAA, NR-U, and/or any other technologies may support sending messages via PDSCH, for example, if not all OFDM symbols are available for transmission in a subframe according to LBT. Delivery of necessary control information for the PDSCH may also be supported.

LBT procedures may be used for coexistence of 3GPP systems (e.g., LTE, NR, and/or any other communications system or technology) with other operators and technologies operating in unlicensed spectrum. LBT procedures on a node attempting to send (e.g., transmit) on a carrier in unlicensed spectrum may require the node to perform a clear channel assessment to determine if the channel is free for use. An LBT procedure may involve, at least, energy detection to determine if the channel is being used. Regulatory requirements in some regions, (e.g., in Europe) may specify an energy detection threshold. If a node receives energy greater than a threshold, the node may determine that the channel is not clear. While nodes may follow such regulatory requirements, a node may optionally use a lower threshold for energy detection than that specified by regulatory requirements. NR-U and/or other technologies may use a mechanism to adaptively change the energy detection threshold. A mechanism may be used to adaptively lower the energy detection threshold from an upper bound. An adaptation mechanism may not preclude static or semi-static setting of the threshold. A Category 4 LBT mechanism or other type of LBT mechanisms may be implemented.

Various LBT mechanisms may be used. An LBT procedure may not be performed by the transmitting entity, for example, for some signals. A Category 1 (CAT1, e.g., no LBT) may be used. A channel in an unlicensed band may be held by a base station for DL transmission. A wireless device may take over the channel for UL transmission. The wireless device may perform the UL transmission without performing LBT. A Category 2 (CAT2, e.g. LBT without random back-off) may be used. The duration of time that the channel may be sensed to be idle before the transmitting entity sends may be deterministic. A Category 3 (CAT3, e.g. LBT with random back-off with a contention window of fixed size) may be used. A transmitting entity may draw a random number N within a contention window. A size of the contention window may be specified by a minimum and maximum value of N. The size of the contention window may be fixed. The random number N may be used in the LBT procedure to determine the duration of time that the channel is sensed to be idle before the transmitting entity sends via the channel.

A Category 4 (CAT4, e.g. LBT with random back-off with a contention window of variable size) may be used. A transmitting entity may draw a random number N within a contention window. The size of contention window may be specified by the minimum and maximum value of N. The transmitting entity may vary the size of the contention window based on drawing the random number N. The random number N may be used in the LBT procedure to determine the duration of time that the channel is sensed to be idle before the transmitting entity sends (e.g., transmits) on the channel.

A wireless device may use uplink LBT. The UL LBT may be different from the DL LBT (e.g. by using different LBT mechanisms or parameters). The UL may be based on scheduled access that affects a wireless device's channel contention opportunities. Other UL LBT configurations include, but are not limited to, multiplexing of multiple wireless devices in a subframe (slot, and/or mini-slot).

A DL transmission burst may be a continuous transmission from a DL transmitting node with no transmission immediately before or after from the same node via the same component carrier (CC). An UL transmission burst from a wireless device perspective may be a continuous transmission from a wireless device with no transmission immediately before or after from the same wireless device via the same CC. An UL transmission burst may be defined from a wireless device perspective. An UL transmission burst may be defined from a base station perspective. A base station may operate DL+UL via a same unlicensed carrier. DL transmission burst(s) and UL transmission burst(s) may be scheduled in a TDM manner via the same unlicensed carrier. An instant in time may be part of a DL transmission burst or an UL transmission burst.

Channel observation time (COT) sharing may be used. COT sharing may be a mechanism (e.g., enabled by ETSI-BRAN) wherein one device acquires a COT using CAT4 LBT and another device shares it using a 25 μs LBT with a gap, for example, provided the amount of transmission does not exceed the MCOT limit for the given priority class. COT sharing may allow a concession for UL via an unlicensed band in which a base station sends (e.g., transmits) a grant to a wireless device before it can be sent (e.g., transmitted) via the UL. The delay between the grant and the corresponding UL transmission may be a period of time (e.g., at least 4 ms). A pause (e.g., 4 ms) may not be accounted in the COT duration. A base station may indicate the remaining time to one or more wireless devices via a PDCCH, for example, if the base station acquired a COT and sent a message indicating the COT via the DL without exhausting the full COT. The wireless device may perform UL transmissions with dynamic grant and/or configured grant (e.g., Type 1, Type2, autonomous UL) with 25 μs LBT in the configured period Single and multiple DL to UL and UL to DL switching within a shared COT may be supported. LBT requirements to support single or multiple switching points, may be different for different gaps. No-LBT may be used, for example, for a gap of less than 16 μs. A one-shot LBT may be used, for example, for a gap of between 16 μs and 25 μs. A one-shot LBT may be used, for example, for single switching point, and for the gap from DL transmission to UL transmission exceeding 25 μs. A one-shot LBT may be used, for example, for multiple switching points, and for the gap from DL transmission to UL transmission exceeding 25 μs.

A signal that facilitates detection with low complexity may be useful for wireless device power saving, improved coexistence, spatial reuse (which may be within the same operator network), serving cell transmission burst acquisition, etc. Operation of at least some technologies (e.g., NR-U) may use a signal comprising at least SS/PBCH block burst set transmission. Other channels and signals may be sent together as part of the signal. The design of this signal may determine that there are no gaps within the time span the signal is sent, for example, at least within a beam. Gaps may be needed for beam switching. The occupied channel bandwidth may be satisfied. A block-interlaced based message via a PUSCH may be used. The same interlace structure for messages via a PUCCH and/or a PUSCH may be used. Interlaced based messages via a PRACH may be used.

An initial active DL/UL BWP may be approximately 20 MHz for a first unlicensed band (e.g., 5 GHz band). An initial active DL/UL BWP may be approximately 20 MHz for a second unlicensed band (e.g., 6 GHz band), if similar channelization as the first unlicensed band (e.g., 5 GHz band) is used for the second unlicensed band (e.g., 6 GHz band).

HARQ acknowledge and negative acknowledge (A/N) for the corresponding data may be sent in the same shared COT. The HARQ A/N may be sent in a separate COT from the one the corresponding data was sent. Flexible triggering and/or multiplexing of HARQ feedback may be used for one or more DL HARQ processes, for example, if UL HARQ feedback is sent on unlicensed band. The dependencies of HARQ process information to the timing may be removed. UCI messages via PUSCH may carry HARQ process ID, NDI, RVID. Downlink Feedback Information (DFI) may be used for transmission of HARQ feedback for a configured grant.

CBRA and CFRA may be supported on an SpCell. CFRA may be supported on SCells. An RAR may be sent via an SpCell, for example, in a non-standalone configuration. An RAR may be sent via an SpCell and/or via an SCell, for example, in a standalone configuration. A predefined HARQ process ID for an RAR may be used.

Carrier aggregation between a licensed band PCell (e.g., NR (PCell)) and an SCell (e.g., NR-U (SCell)) may be supported. An SCell may have both DL and UL, or DL-only. Dual connectivity between various licensed band PCells (e.g., LTE (PCell)) and PSCells (e.g., NR-U (PSCell)) may be supported. Stand-alone cells (e.g., NR-U) in which all carriers are in one or more unlicensed bands may be supported. A cell (e.g., an NR cell) with a DL in an unlicensed band and an UL in a licensed band, or vice versa, may be supported. Dual connectivity between licensed band cells (e.g., a NR (PCell) and NR-U (PSCell)) may be supported.

An operating bandwidth may be an integer multiple of 20 MHz, for example, if an absence of Wi-Fi cannot be guaranteed (e.g., by regulation) in a band (e.g., sub-7 GHz) via which a communications network or system (e.g., NR-U) is operating. LBT may be performed in units of 20 MHz, for example, for bands where absence of Wi-Fi cannot be guaranteed (e.g., by regulation). Receiver assisted LBT (e.g., RTS/CTS type mechanism) and/or on-demand receiver assisted LBT (e.g., for example receiver assisted LBT enabled only if needed) may be used. Techniques to enhance spatial reuse may be used. Preamble detection may be used.

A network may gain access to the channel to send (e.g., transmit) a message via PDCCH such that a wireless device may need to perform LBT again prior to sending via the channel, for example, with scheduled PUSCH transmissions via an unlicensed carrier. The procedure may tend to increase latency and may become worse if the channel is loaded. A mechanism of autonomous uplink transmission may be used. A wireless device may be pre-allocated with a resource for transmission (e.g., similar to UL SPS) and may perform LBT prior to using the resource. Autonomous uplink may be based on the configured grant functionality (e.g., Type 1 and/or Type 2).

A HARQ process identity may be sent by the wireless device (e.g., as UCI). A wireless device may use the first available transmission opportunity irrespective of the HARQ process. UCI messages via PUSCH may be used to carry HARQ process ID, NDI and RVID.

A UL dynamic grant scheduled UL transmission may increase a delay and/or transmission failure possibility due to at least two LBTs of the wireless device and the base station, for example, for unlicensed bands. A pre-configured grant (e.g., such as configured grant in NR) may be used (e.g., such as for NR-U). The pre-configured grant may decrease a quantity of LBTs performed and control signaling overhead. An uplink grant may be provided by an RRC message (e.g., in a Type 1 configured grant). An uplink grant may be stored as configured uplink grant. An uplink grant (e.g., a Type 1 configured grant) may be initiated based on or in response to receiving the RRC. An uplink grant may be provided by a PDCCH. An uplink grant may be stored and/or cleared as a configured uplink grant, for example, based on L1 signaling indicating configured grant activation and/or deactivation (e.g. using a Type 2 configured grant).

A dependency between HARQ process information to the timing may not exist. UCI messages via a PUSCH may carry HARQ process ID, NDI, RVID, etc. A wireless device may autonomously select one HARQ process ID that is informed to a base station by UCI message(s). A wireless device may perform non-adaptive retransmission with the configured uplink grant. The wireless device may attempt to send (e.g., transmit) in the next available resource with configured grant, for example, if dynamic grant for configured grant retransmission is blocked due to LBT.

Downlink Feedback Information (DFI) may be sent (e.g., using DCI) and may include HARQ feedback for configured grant transmission. The wireless device may perform transmission/retransmission using configured grant according to DFI comprising HARQ feedback. Wideband carrier with more than one channels may be supported, for example, via an unlicensed cell.

There may be one active BWP in a carrier. A BWP with one or more channels may be activated. LBT may be performed in units of 20 MHz, for example, if absence of Wi-Fi cannot be guaranteed (e.g., by regulation). There may be multiple parallel LBT procedures for a BWP. The actual transmission bandwidth may be subject to subband with LBT success, which may result in dynamic bandwidth transmission within the active wideband BWP.

One or more active BWPs may be supported. The BWP bandwidth may be the same as the bandwidth of subband for LBT (e.g., LBT may be carried out on each BWP), for example, which may improve the BWP utilization efficiency. The network may activate and/or deactivate the BWPs based on data volume to be sent.

One or more non-overlapped BWPs may be activated for a wireless device within a wide component carrier (e.g., which may be similar to carrier aggregation in LTE LAA). The BWP bandwidth may be the same as the bandwidth of subband for LBT (e.g., LBT may be carried out on each BWP), for example, which may improve the BWP utilization efficiency. A wireless device may have a capability to support one or more narrow RF and/or a wide RF which may comprise the one or more activated BWPs, for example, if more than one subband LBT success occurs.

A single wideband BWP may be activated for a wireless device within a component carrier. The bandwidth of wideband BWP may be in the unit of subband for LBT. The wideband BWP bandwidth may comprise multiple 20 MHz, for example, if the subband for LBT is 20 MHz in 5 GHz band. An actual transmission bandwidth may be subject to subband with LBT success, which may result in dynamic bandwidth transmission within this active wideband BWP.

Active BWP switching may be achieved using scheduling DCI. The network may indicate to a wireless device a new active BWP to use for an upcoming, and/or any subsequent, data transmission/reception. A wireless device may monitor multiple, configured BWPs to determine which has been acquired for DL transmissions by the base station. A wireless device may be configured with a monitoring occasion periodicity and/or offset for each configured BWP. The wireless device may determine if a BWP has been acquired by the base station during the monitoring occasions. The wireless device may continue with a BWP as its active BWP, for example, at least until indicated otherwise or a Maximum Channel Occupancy Time (MCOT) has been reached, and/or after successfully determining that the channel is acquired. A wireless device may attempt blind detection of PDCCH information in configured CORESETs, for example, if a wireless device has determined that a BWP is active. The wireless device may perform measurements on aperiodic and/or SPS resources.

A wireless device may be configured with multiple UL resources, which may be in different BWPs, for example, for UL transmissions. The wireless device may have multiple LBT configurations, each associated with a BWP and/or a beam pair link. The wireless device may be granted with UL resources associated with (e.g., linked to) one or more LBT configurations. The wireless device may be provided with (e.g., made available, received, stored, etc.) multiple autonomous uplink (AUL) and/or grant-free resources, each using different LBT configurations. Providing a wireless device with multiple AUL resources over multiple BWPs may ensure that if LBT fails using a first LBT configuration for a first AUL resource in one BWP, a wireless device may attempt transmission in a second AUL resource in another BWP. This use of multiple AUL resources may reduce the channel access latency and/or improve spectral efficiency of the over-all unlicensed carrier.

Carrier aggregation with at least one SCell operating in an unlicensed spectrum may be performed in LAA. A configured set of serving cells for a wireless device may include at least one SCell operating in an unlicensed spectrum according to a first frame structure (e.g., frame structure Type 3). An SCell operating in LAA may be referred to as an LAA SCell.

A maximum frequency separation between any two carrier center frequencies on which LAA SCell transmissions are performed may be less than or equal to 62 MHz (or any other frequency), for example, if the absence of devices (e.g., IEEE802.11n/11ac devices) sharing the carrier cannot be guaranteed on a long term basis (e.g., by regulation), and/or if the maximum quantity of unlicensed channels via which a network may simultaneously send is equal to or less than 4 (or any other quantity). A wireless device may be required to support frequency separation.

A base station and/or a wireless device may apply LBT before performing a transmission on an LAA SCell. A transmitter (e.g., of a wireless device and/or of a base station) may listen to and/or sense the channel to determine whether the channel is free or busy, for example, if LBT is applied. The transmitter may perform the transmission, if the channel is determined to be free and/or clear. The transmitter may not perform the transmission, if the channel is not determined to be free and/or clear. A base station may continue to meet a LAA maximum energy detection threshold requirement, for example, if the base station uses channel access signals (e.g., of other technologies) for the purpose of channel access.

A combined time of transmissions compliant with the channel access procedure by a base station may not exceed a threshold time period (e.g., 50 ms) in any contiguous time period (e.g., 1 second period) on an LAA SCell. An LBT type (e.g., type 1 or type 2 uplink channel access) that the wireless device applies may be signaled via uplink grant for uplink PUSCH message transmission on LAA SCells. For AUL message transmissions the LBT may not be signaled via the uplink grant.

FIG. 24 shows an example channel access priority class values. A base station may signal the channel access priority class for a logical channel, for example, for type 1 uplink channel access on AUL. A wireless device may select a highest channel access priority class (e.g., with a lower number) of the logical channel(s) with a MAC SDU multiplexed into a MAC PDU. The MAC CEs (e.g., except padding BSR) may use the lowest channel access priority class. The wireless device may select logical channels corresponding to any channel access priority class for UL transmission in the subframes signaled by a base station via common downlink control signaling, for example, for type 2 uplink channel access on AUL.

A base station may not schedule a wireless device with more subframes than a minimum necessary to send (e.g., transmit) traffic corresponding to a selected channel access priority class or lower (e.g., having a lower number) than the channel access priority class signaled in a UL grant. The base station may schedule the wireless device, for example, based on: the latest BSR and/or received uplink traffic from the wireless device (e.g., for uplink LAA operation), if type 1 uplink channel access procedure is signaled to the wireless device; channel access priority class used by the base station based on the downlink traffic; and/or the latest BSR and/or received UL traffic from the wireless device, if type 2 uplink channel access procedure is signaled to the wireless device.

A first quantity (e.g., four) of channel access priority classes may be used during performing uplink and downlink transmissions in LAA carriers. A channel access priority class may be used by traffic belonging to different standardized QCIs. A non-standardized QCI (e.g., operator specific QCI) may use a suitable channel access priority class of the standardized QCIs that best matches the traffic class of the non-standardized QCI. For uplink, the base station may select a channel access priority class by taking into account the lowest priority QCI in a logical channel group.

Four (or any other quantity) channel access priority classes may be used. A base station may ensure several requirements and/or limitations, for example, if a DL transmission burst with PDSCH is sent, for which channel access has been obtained using channel access priority class P (1 . . . 4). The base station may limit the transmission duration of the DL transmission burst so as to not exceed a minimum duration needed to send (e.g., transmit) all available buffered traffic corresponding to channel access priority class(es)≤P. The base station may limit the transmission duration of the DL transmission burst so as to not exceed a maximum channel occupancy time for channel access priority class P. The base station may ensure additional traffic corresponding to channel access priority class(s)>P be included in the DL transmission burst once no more data corresponding to channel access priority class≤P is available for transmission. The base station may maximize occupancy of the remaining transmission resources in the DL transmission burst with such additional traffic. A DL transmission burst may refer to a continuous transmission by the base station after a successful LBT.

A wireless device may be scheduled for downlink transmission via a PDCCH of a serving cell. A wireless device may be scheduled for uplink transmission via a PDCCH of one other serving cell, for example, if the PDCCH of an LAA SCell is configured and/or if cross-carrier scheduling applies to uplink transmission. The wireless device may be scheduled for uplink transmission and downlink transmission via its PDCCH, for example, if the PDCCH of an LAA SCell is configured and/or if self-scheduling applies to both uplink transmission and downlink transmission.

Autonomous uplink may be supported on SCells. One or more autonomous uplink configurations may be supported per SCell. Multiple autonomous uplink configurations may be active simultaneously, for example, if there is more than one SCell.

Information may be provided in an AUL configuration information element (e.g., AUL-Config), for example, if autonomous uplink is configured by RRC. AUL C-RNTI, HARQ process IDs, and/or aul-harq-processes may be configured for autonomous UL HARQ operation. A time period in a parameter (e.g., aul-retransmissionTimer) may be configured before triggering a new transmission and/or a retransmission of the same HARQ process using an autonomous uplink. A bitmap parameter (e.g., aul-subframes), that may indicate the subframes that are configured for autonomous UL HARQ operation, may be configured.

A corresponding configured grant may be cleared, for example, if an autonomous uplink configuration is released via RRC signaling. The wireless device (e.g., a MAC entity of a wireless device) may consider that a configured uplink grant occurs in subframes for which aul-subframes is set to 1, for example, if AUL-Config is configured. The wireless device (e.g., a MAC entity of a wireless device) may instruct a multiplexing and assembly procedure to generate an AUL confirmation MAC CE, for example, if AUL confirmation has been triggered and not cancelled, and/or if the wireless device (e.g., a MAC entity of a wireless device) has UL resources allocated for new transmission for this time interval or time duration (e.g., TTI). The wireless device (e.g., a MAC entity of a wireless device) may cancel the triggered AUL confirmation. The wireless device (e.g., a MAC entity of a wireless device) may clear the configured uplink grant for the SCell based on or in response first transmission of AUL confirmation MAC CE triggered by the AUL release for this SCell. Retransmissions for uplink transmissions using autonomous uplink may continue, for example, after clearing the corresponding configured uplink grant.

A wireless device (e.g., a MAC entity of a wireless device) may be configured with AUL-RNTI for AUL operation. An uplink grant may be received for a transmission time interval for a serving cell via the PDCCH for the wireless device's (e.g., a MAC entity of a wireless device) AUL C-RNTI. The wireless device (e.g., a MAC entity of a wireless device) may consider the NDI for the corresponding HARQ process to not to have been switched (e.g., enabled), for example, if the NDI in the received HARQ information is 1. The wireless device (e.g., a MAC entity of a wireless device) may deliver the uplink grant and the associated HARQ information to the HARQ entity for this transmission time interval. The wireless device (e.g., a MAC entity of a wireless device) may trigger an AUL confirmation, for example, if the NDI in the received HARQ information is 0, and if PDCCH contents indicate an AUL release. The wireless device (e.g., a MAC entity of a wireless device) may consider the NDI bit for the corresponding HARQ process to have been switched (e.g., enabled), for example, if an uplink grant for this time interval or time duration (e.g., TTI) has been configured. The wireless device (e.g., a MAC entity of a wireless device) may deliver the configured uplink grant and the associated HARQ information to the HARQ entity for this time interval or time duration (e.g., TTI). The wireless device (e.g., a MAC entity of a wireless device) may trigger an AUL confirmation, for example, if the NDI in the received HARQ information is 0, and if PDCCH contents indicate AUL activation.

The wireless device (e.g., a MAC entity of a wireless device) may deliver the configured uplink grant, and the associated HARQ information to the HARQ entity for this time interval or time duration (e.g., TTI), for example: if the retransmission timer (e.g., aul-retransmissionTimer) is not running; if there is no uplink grant previously delivered to the HARQ entity for the same HARQ process; if the previous uplink grant delivered to the HARQ entity for the same HARQ process was not an uplink grant received for the wireless device's (e.g., MAC entity) C-RNTI; and/or if the HARQ_FEEDBACK is set to ACK for the corresponding HARQ process.

The NDI sent in a message via the PDCCH for the wireless device's (e.g., a MAC entity of a wireless device) AUL C-RNTI may be set to 0. The HARQ Process ID associated with a time interval or time duration (e.g., TTI) for transmission on a serving cell may be selected, by a wireless device implementation, for example: from the HARQ process IDs that are configured for autonomous UL HARQ operation by upper layer entities (e.g., in AUL-HARQ-processes) for configured uplink grants; and/or if UL HARQ operation is autonomous. A HARQ process may maintain a state variable (e.g., HARQ_FEEDBACK), which may indicate the HARQ feedback for the MAC PDU currently in the buffer. A HARQ process may maintain a timer (e.g., aul-retransmissionTimer) which may prohibit new transmission or retransmission for the same HARQ process if the timer is running, for example, for autonomous HARQ. The HARQ process may set HARQ_FEEDBACK to the received value. The HARQ process may stop the timer (e.g., aul-retransmissionTimer) for example, if running, and/or if the HARQ feedback is received for a TB.

A HARQ process may start a timer (e.g., aul-retransmissionTimer), for example, if a transmission via PUSCH is performed for a TB, and/or if the uplink grant is a configured grant for the wireless device's (e.g., a MAC entity of a wireless device) AUL C-RNTI. The HARQ process may set HARQ_FEEDBACK to NACK, for example, if UL HARQ operation is autonomous asynchronous, and/if the HARQ entity requests a new transmission. The HARQ process may set CURRENT_IRV to 0, for example, if the uplink grant was addressed to the AUL C-RNTI. The wireless device (e.g., a MAC entity of a wireless device) may not generate a MAC PDU for the HARQ entity if the grant indicated to the HARQ entity is a configured uplink grant activated by the wireless device's (e.g., a MAC entity of a wireless device) AUL C-RNTI, for example, if aperiodic CSI is requested for a time interval or time duration (e.g., TTI).

The wireless device may use autonomous uplink feedback information, for example, if the wireless device detects on the scheduling cell for UL transmissions, via an LAA SCell, a transmission of a DCI message (e.g., Format 0A/4A) with the CRC scrambled by AUL C-RNTI carrying AUL-DFI. The wireless device may deliver corresponding HARQ-ACK feedback to higher layers (e.g., higher layer entities of the wireless device), for example, for a HARQ process configured for autonomous uplink transmission. The wireless device may not deliver corresponding HARQ-ACK feedback to higher layers (e.g., higher layer entities of the wireless device), for example, for the HARQ processes not configured for autonomous uplink transmission. The wireless device may expect HARQ-ACK feedback in the AUL-DFI at earliest in subframe n+4, for example, for an uplink transmission in subframe/slot/TTI n. The wireless device may not be expected to receive AUL-DFI indicating ACK for the same HARQ process prior to 4 ms after the wireless device sends another uplink transmission associated with that HARQ process, for example, if the wireless device receives AUL-DFI in a subframe indicating ACK for a HARQ process.

A wireless device may validate an autonomous uplink assignment via PDCCH/EPDCCH, for example, if one or more of the following conditions are met: the CRC parity bits obtained for the PDCCH/EPDCCH payload are scrambled with the AUL C-RNTI; and/or the 'Flag for AUL differentiation' indicates activating and/or releasing AUL transmission. One or more fields in an activation DCI may be pre-configured values for validation.

Figure 25:
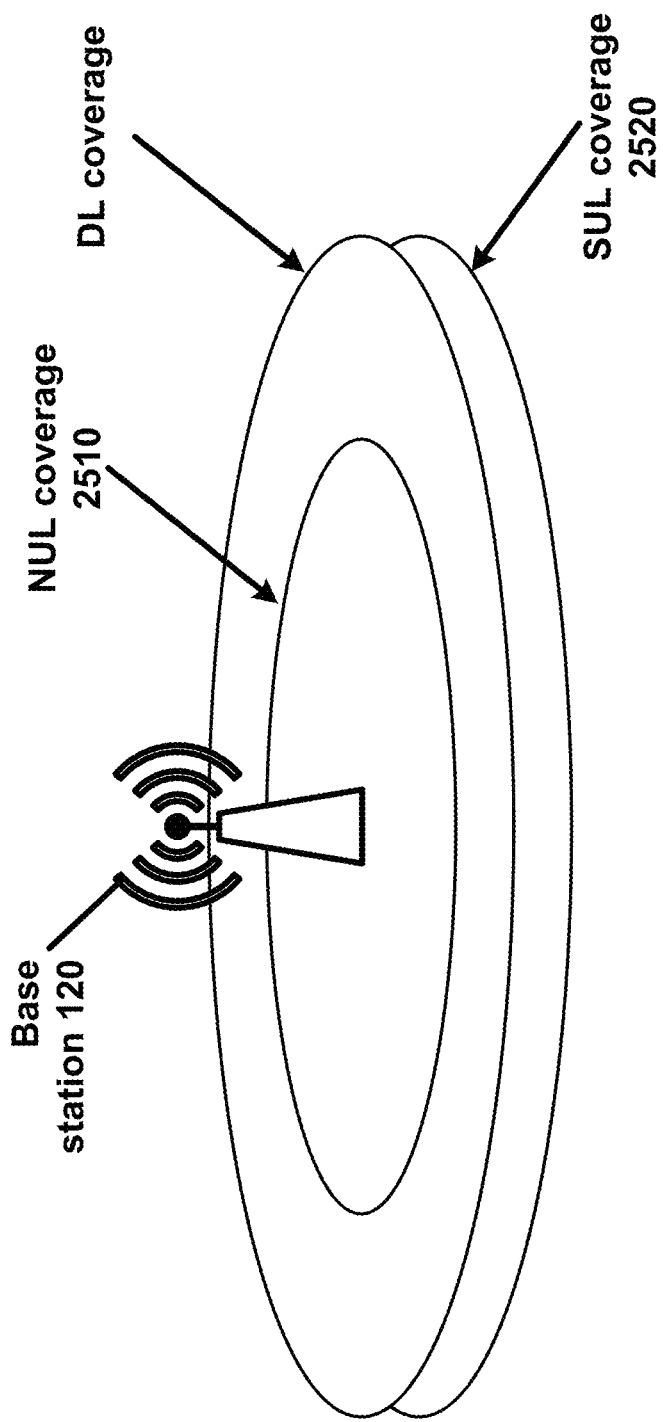
FIG. 25 shows an example coverage of a cell configured with a downlink carrier and two uplink carriers.

FIG. 25 shows an example coverage of a cell configured with a downlink carrier and two uplink carriers. A base station 120 may configure a wireless device with one or more UL carriers with coverage 2510 and 2520 associated with one DL carrier with coverage 2520 of a cell. One of one or more UL carriers configured with a DL carrier may be referred to as a supplementary uplink (SUL) carrier or a normal UL (NUL or may be referred to as a non-SUL)

carrier. A base station may enhance UL coverage 2510 and 2520 and/or capacity by configuring an SUL carrier. A base station may configure a BWP configuration per an uplink (e.g., per uplink carrier) in a cell. A base station may configure one or more BWPs on an SUL separately from one or more BWPs on a NUL. A base station may control an active BWP of an SUL independently of an active BWP of a NUL. A base station may control two uplink transmissions on two ULs (e.g., NUL and SUL) to avoid overlapping PUSCH transmissions in time.

A base station may avoid configuring parallel uplink transmissions via SUL and NUL of a cell, wherein the parallel uplink transmissions may be PUCCH (and/or PUSCH) via SUL and PUCCH (and/or PUSCH) via NUL. A base station may send (e.g., transmit) one or more RRC message (e.g., wireless device specific RRC signaling) to (re-) configure a location of a PUCCH on an SUL carrier and/or on a NUL carrier. A base station may send (e.g., transmit), to a wireless device, one or more RRC messages comprising configuration parameters for a carrier, wherein the configuration parameters may indicate at least one of random access procedure configuration, BWP configurations (e.g., number of DL/UL BWPs, bandwidth and/or index of configured DL/UL BWP, and/or initial, default, and/or active DL/UL BWP), PUSCH configurations, PUCCH configurations, SRS configurations, and/or power control parameters.

A base station may configure an SUL carrier and a NUL carrier to support a random access procedure (e.g., initial access). To support a random access to a cell configured with SUL (e.g., as shown in FIG. 12), a base station may configure a RACH configuration 1210 of SUL independent of a RACH configuration 1210 of NUL. One or more parameters associated with Msg1 1220, Msg 2 1230, Msg 3 1240, and/or contention resolution 1250 via SUL may be configured independent of one or more parameters associated with Msg1 1220, Msg 2 1230, Msg 3 1240, and/or contention resolution 1250 via NUL. One or more parameters associated with PRACH transmissions in Msg 1 1220 via SUL may be independent of one or more parameters associated with PRACH transmission via NUL.

A wireless device may determine which carrier (e.g., between NUL and SUL) to use, for example, based on a measurement (e.g., RSRP) of one or more DL pathloss references and/or for a random access procedure in licensed bands. A wireless device may select a first carrier (e.g., SUL or NUL carrier), for example, if a measured quality (e.g., RSRP) of DL pathloss references is less than a broadcast threshold (e.g., an RRC parameter, rsrp-ThresholdSSB-SUL). One or more uplink transmissions associated with the random access procedure may remain on the selected carrier, for example, if a wireless device selects a carrier between SUL carrier and NUL carrier for a random access procedure.

A base station may configure NUL and SUL with a TAG. A wireless device may use a TA value received during a random access procedure via a second carrier (e.g., NUL) of the cell, for example, for an uplink transmission of a first carrier (e.g., SUL) of a cell.

FIG. 25 shows an example of a coverage of a cell configured with a DL and two ULs. A base station may configure a NUL and DL over a first frequency (e.g., high frequency). An SUL may be configured over a second frequency (e.g., low frequency) to support uplink transmission (e.g., in terms of coverage and/or capacity) of a cell. A broadcast threshold (e.g., an RRC parameter, rsrp-ThresholdSSB-SUL) for a wireless device to select a carrier may be determined such that a wireless device located outside a NUL coverage 2510 but inside an SUL coverage 2520 may start a random access procedure via an SUL. A wireless device located inside a NUL coverage 2510 may start a random access procedure via a NUL. A wireless device may use a RACH configuration associated with a selected carrier for a random access procedure.

A wireless device may perform a contention based random access procedure and/or a contention free random access procedure. A wireless device may perform a random access procedure on an UL selected based on a broadcast threshold (e.g., rsrp-ThresholdSSB-SUL). A base station may not indicate (e.g., explicitly) to the wireless device which carrier to start a random access procedure. A base station may indicate which carrier a wireless device performs a random access procedure by sending a RACH configuration with an SUL indicator (e.g., 0 may indicates a NUL carrier, 1 may indicate an SUL carrier or vice versa). A base station may indicate (e.g., explicitly) to a wireless device which UL carrier is to be used for a contention free or contention based random access procedure. A base station may indicate a contention free random access procedure by sending a RACH configuration with a dedicated preamble index. A base station may indicate a contention based random access procedure by sending a RACH configuration without a dedicated preamble index.

It may be beneficial for a network to receive one or more measurements of NUL carrier(s) and/or SUL carrier(s) to initiate a (contention free or contention based) random access procedure for a wireless device. A base station may configure a wireless device (e.g., a wireless device in RRC Connected) with one or more measurements on one or more DL reference signals associated with NUL carrier(s) and/or SUL carrier(s) of a cell.

A base station may select a carrier between NUL carrier(s) and/or SUL carrier(s), for example, based on the quality of the one or more measurements and/or if a wireless device sends quality information of one or more measurements on one or more DL reference signals associated with NUL carrier(s) and/or SUL carrier(s). A base station may indicate, to a wireless device, a selected carrier via RRC signaling (e.g., handover) and/or PDCCH order (e.g., SCell addition) for initiating a (contention free or contention based) random access procedure. For load balancing between NUL carrier(s) and/or SUL carrier(s), a base station may select one of NUL and SUL carrier by taking into consideration congestion in NUL carrier(s) and/or SUL carrier(s). A base station may better select a carrier (e.g., NUL or SUL) of a target cell for a (contention free or contention based) random access procedure for a handover, for example, based on one or more measurement reports associated with NUL carrier(s) and/or SUL carrier(s). A base station may better select a carrier (e.g., NUL or SUL) of an SCell (e.g., if the SCell is configured with at least a NUL carrier and an SUL carrier) for a (contention free or contention based) random access procedure for an SCell addition, for example, based on one or more measurement reports associated with NUL carrier(s) and/or SUL carrier(s).

A source base station may make a decision on a handover to one or more target cells, for example, for a handover of a wireless device. A source base station may indicate a handover decision to a target base station associated with one or more target cells that the source base station selects. A target base station may indicate to a wireless device (e.g., through a cell of a source gNB) which carrier (between NUL carrier(s) and SUL carrier(s)) to use via a handover command. A handover command received by a wireless device may comprise an SUL indicator (e.g., 1 bit) along with one or more RACH parameters (e.g., dedicated preamble index, and/or PRACH mask index), wherein the SUL indicator may indicate if the one or more RACH parameters are associated with an SUL or NUL carrier.

It may be useful that a source base station informs a target base station about measured results on NUL carrier(s) and SUL carrier(s), e.g., high frequency carrier(s) and low frequency carrier(s), so that the target base station determines a carrier on which a wireless device may perform a (contention free or contention based) random access procedure for a handover. The source base station may need to know whether SUL carrier(s) is (are) configured in the target gNB, and/or which carrier is allowed to be used for a handover, for example, if a source base station configures DL measurements on one or more cells association with a NUL carrier(s) and/or SUL carrier(s) of a target gNB. A target base station may inform a source base station of one or more configurations of NUL carrier(s) and/or SUL carrier(s) of one or more cells in the target gNB. A source base station may configure DL measurement on one or more cells in the target gNB, based on one or more configurations indicating carrier configurations at the one or more cells in the target gNB.

A base station may be aware of whether SUL carrier(s) is (are) configured in an SCell, and/or which carrier is allowed to be used for an SCell addition. A base station may configure DL measurements on NUL carrier(s) and/or SUL carrier(s). A base station may configure a wireless device with one or more RACH configurations for an SCell, e.g., a first RACH configuration for an SUL carrier, a second RACH configuration for a NUL carrier, and so on. A base station may send (e.g., transmit), to a wireless device via a PDCCH order comprising a parameter indicating in which carrier the wireless device starts a (contention free or contention based) random access procedure. A PDCCH order triggering a (contention free or contention based) random access procedure may comprise one or more parameters indicating at least one of at least one preamble (e.g., preamble index), one or more PRACH resources (e.g., PRACH mask index), an SUL indicator, and/or a BWP indicator. A wireless device receiving a PDCCH order may send (e.g., transmit) at least one preamble via one or more PRACH resources of a BWP indicated by a BWP indicator of a carrier indicated by an SUL indicator, for example, for a random access procedure.

A wireless device may determine a random access procedure unsuccessfully completed. The wireless device may consider the random access procedure unsuccessfully completed, for example, if a wireless device receives no RAR corresponding to one or more preambles sent by the wireless device during a random access procedure. There may be a number of preamble transmissions allowed during a random access procedure (e.g., preambleTransMax in FIG. 20), wherein the number of preamble transmissions may be semi-statically configured by RRC. The wireless device may consider a random access procedure unsuccessfully completed, for example, if a wireless device receives no RAR corresponding to the number of preamble transmissions. A wireless device may indicate a problem to upper layer(s), for example, after an unsuccessful completion of a random access procedure, and after the indicated problem. The upper layers(s) may trigger radio link failure that may lead to prolonged random access delay and degraded user experience.

A base station (source base station and/or a target gNB) configuring a wireless device with a RACH configuration for a random access (for a handover and/or SCell addition) may not allow to reuse the RACH configuration if the random access is unsuccessfully completed.

A failure of a (contention free or contention based) random access may result in a long delay of random access. A wireless device may initiate a contention based random access procedure, for example, if a contention free random access is unsuccessfully completed, instead of a contention free random access. The wireless device may perform an initial access to the target base station based on a contention based random access, for example, if a wireless device fails a contention free random access to a target base station during a handover. A wireless device performing a contention based random access procedure may compete with one or more wireless devices to get an access to a gNB, which may not guarantee a success of the contention based random access procedure, and/or which may take long (e.g., four step procedure of the contention based random access procedure comparing with a contention free random access comprising MSG 1 1220 and MSG 2 1230 transmissions) to receive a corresponding RAR.

The wireless device may wait until a base station sends a message (e.g., PDCCH order) indicating a RACH configuration, for example, based on which the wireless device may initiate a random access for an SCell addition and/or if a wireless device fails a contention free random access for an SCell addition. It may take long for a base station to detect a failure of a random access for an SCell addition. A wireless device may wait for a message (e.g., PDCCH order) sent to a base station for an SCell addition unnecessarily long.

Figure 26:
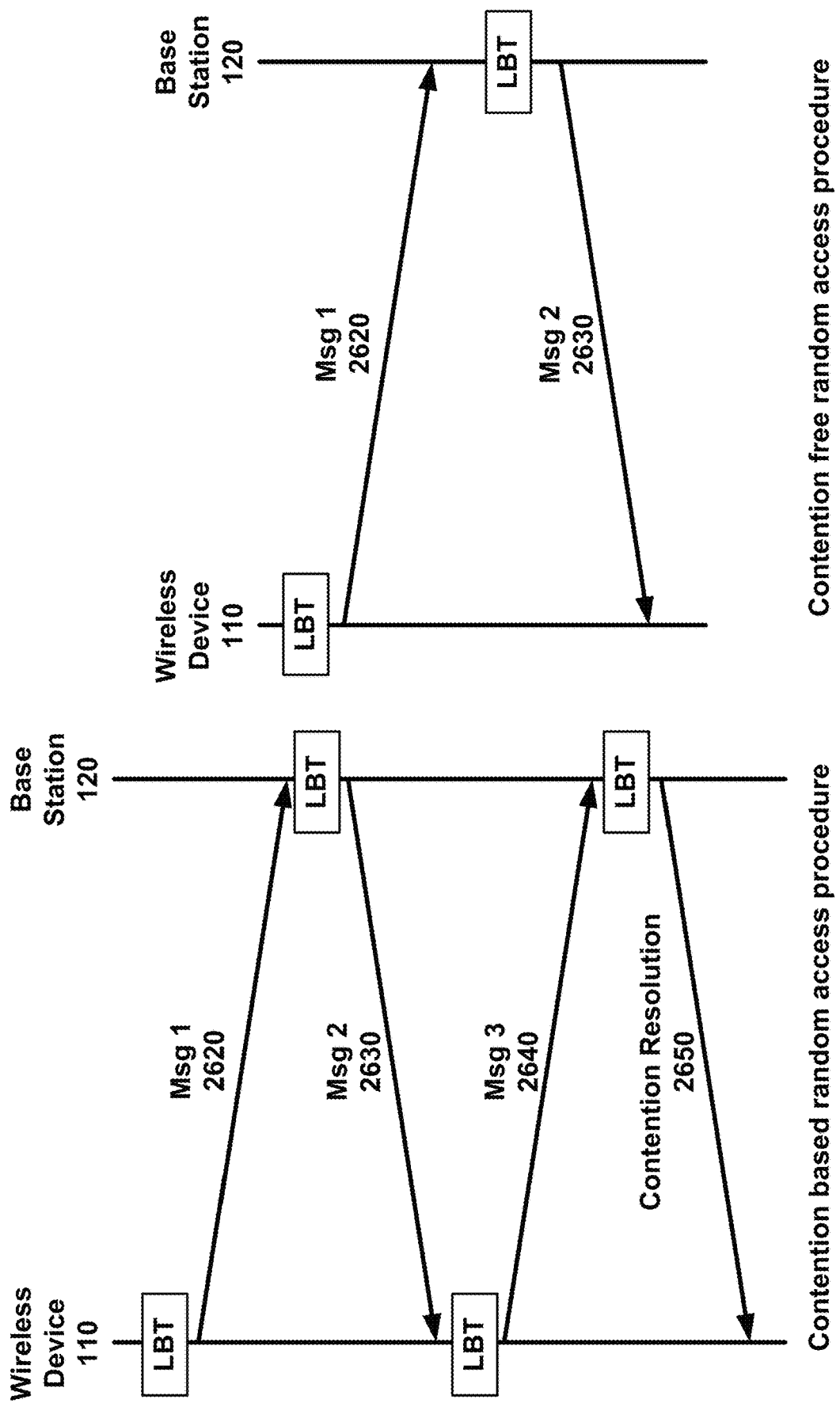
FIG. 26 shows contention based and contention-free random access procedures with LBT.

FIG. 26 shows contention based and contention-free random access procedures with LBT. A successful contention based random access procedure may use Msg 1 2620, Msg 2 2630, Msg 3 2640, and contention resolution 2650 to perform the random access procedure with the wireless device 110 and base station 120. The wireless device may perform a first LBT, determine that the medium is clear, and send Msg 1 2620 to a base station 120. The base station 120 may perform a second LBT, determine that the medium is clear, and send Msg 2 2630 to the wireless device 110. The wireless device 110 may perform a third LBT, determine the medium is clear, and send Msg 1 2640 to the base station 120. The base station 1120 may perform a fourth LBT, determine that the medium is clear, and sends contention resolution 2650 to the wireless device 110.

A successful contention-free based random access procedure may use Msg 1 2620 and Msg 2 2630 to perform the random access procedure with the wireless device 110 and the base station 120. The wireless device 110 may perform a first LBT, determine that the medium is clear, and send Msg 1 2620 to the base station 120. The base station 120 may perform a second LBT, determine that the medium is clear, and send Msg 2 2630 to the wireless device 110.

A failure of a random access may occur due to LBT, for example, in an unlicensed band. At least one LBT may be performed prior to DL and/or UL transmission. Msg 1 1220, Msg 2 1230, Msg 3 1240, and/or contention resolution 1250 may require at least one LBT before the transmission (e.g., at least 4 LBTs), for example, in a contention based random access procedure. Msg 1 1220 and Msg2 1230 may require at least one LBT each (e.g., at least 2 LBTs), for example, for a contention-free random access procedure. A base station and/or a wireless device may not send (e.g., transmit) a message (e.g., Msg 1 2620, Msg 2 2630, Msg 3 2640, and/or contention resolution 2650) for a random access procedure, for example, if the LBT procedure has failed prior to sending the message (e.g., CCA in LBT determines that a channel in unlicensed band is busy (e.g., occupied by another device)).

A failure of an LBT procedure may result in degrading a user experience (e.g., in terms of QoS, capacity (e.g., throughput), and/or coverage). A base station and/or a wireless device may wait until the channel becomes idle. This waiting may result in a latency problem to make a radio link connection between a base station and a wireless device. A failure of an LBT during a random access procedure may lead a long delay for a wireless device to receive an UL grant and/or TA value from a base station. This delay may result in a call drop and/or traffic congestion. A failure of an LBT procedure in a random access procedure for an SCell addition may lead a cell congestion (e.g., load imbalancing) on one or more existing cells (e.g., if an SCell may not take over traffic from the one or more existing cells in time).

Selecting two or more SSBs, and performing one or more LBTs on one or more random access resource occasions (e.g., PRACH occasions) associated with the two or more SSBs, may increase a success rate of an LBT procedure. A wireless device may measure a plurality of downlink reference signals (e.g., SSBs or CSI-RSs, if CSI-RS is configured by RRC signaling). The wireless device may select two or more SSBs, for example, by comparing RSRPs of the plurality of downlink reference signals with one or more thresholds. The wireless device may determine one or more random access resource occasions (e.g., PRACH occasions) associated with the selected two or more downlink reference signals. The wireless device may perform one or more LBT procedures prior to each of the random access resource occasions (e.g., PRACH occasions), for example, at least until an LBT procedure is successful. The wireless device may send (e.g., transmit) one or more preambles associated with a random access resource occasion (e.g., PRACH occasion) based on the LBT being successful. The use of more than one random access resource occasions (e.g., PRACH occasions) may improve an efficiency of random access procedure operating in unlicensed band, for example, which may compensate for and/or reduce a latency/delay and/or a performance degradation, that may otherwise result from an LBT failure.

A threshold may comprise an SSB threshold parameter (e.g., rsrp-ThresholdSSB), for example, if the plurality of downlink reference signals are SSBs. A threshold may comprise a CSI-RS threshold parameter (e.g., rsrp-ThresholdCSI-RS), for example, if the plurality of downlink reference signals are CSI-RSs. A wireless device may select two or more downlink reference signals (e.g., SSBs or CSI-RSs) corresponding to RSRPs that may be greater than the threshold. A wireless device may determine one or more random access resource occasions (e.g., PRACH occasions) associated with the selected two or more downlink reference signals (e.g., SSBs), for example, if SSBs are configured with the wireless device. A wireless device may determine the one or more PRACH, for example, based on an association between random access resource occasions (e.g., PRACH occasions) and SSBs that may be indicated by one or more RRC parameters (e.g., ra-ssb-OccasionMaskIndex). A wireless device may determine one or more random access resource occasions (e.g., PRACH occasions) associated with the selected two or more downlink reference signals (e.g., CSI-RSs), for example, if CSI-RSs are configured for the wireless device. A wireless device may determine the one or more PRACH based on an association between random access resource occasions (e.g., PRACH occasions) and CSI-RSs that may be indicated by one or more RRC parameters (e.g., ra-OccasionList).

A wireless device may perform random access resource selection. A wireless device (e.g. a MAC entity of the wireless device) may select an SSB with SS-RSRP above rsrp-ThresholdSSB among the SSBs in candidate-BeamRSList or a CSI-RS with CSI-RSRP above rsrp-ThresholdCSI-RS among the CSI-RSs in candidate-BeamRSList, for example, if at least one of the SSBs with SS-RSRP above rsrp-ThresholdSSB among the SSBs in candidateBeamRSList or the CSI-RSs with CSI-RSRP above rsrp-ThresholdCSI-RS among the CSI-RSs in candidateBeamRSList is available. The wireless device may (e.g., for contention-based random access preamble selection) select an SSB with SS-RSRP above rsrp-ThresholdSSB, if at least one of the SSBs with SS-RSRP above rsrp-ThresholdSSB is available.

Figure 27:
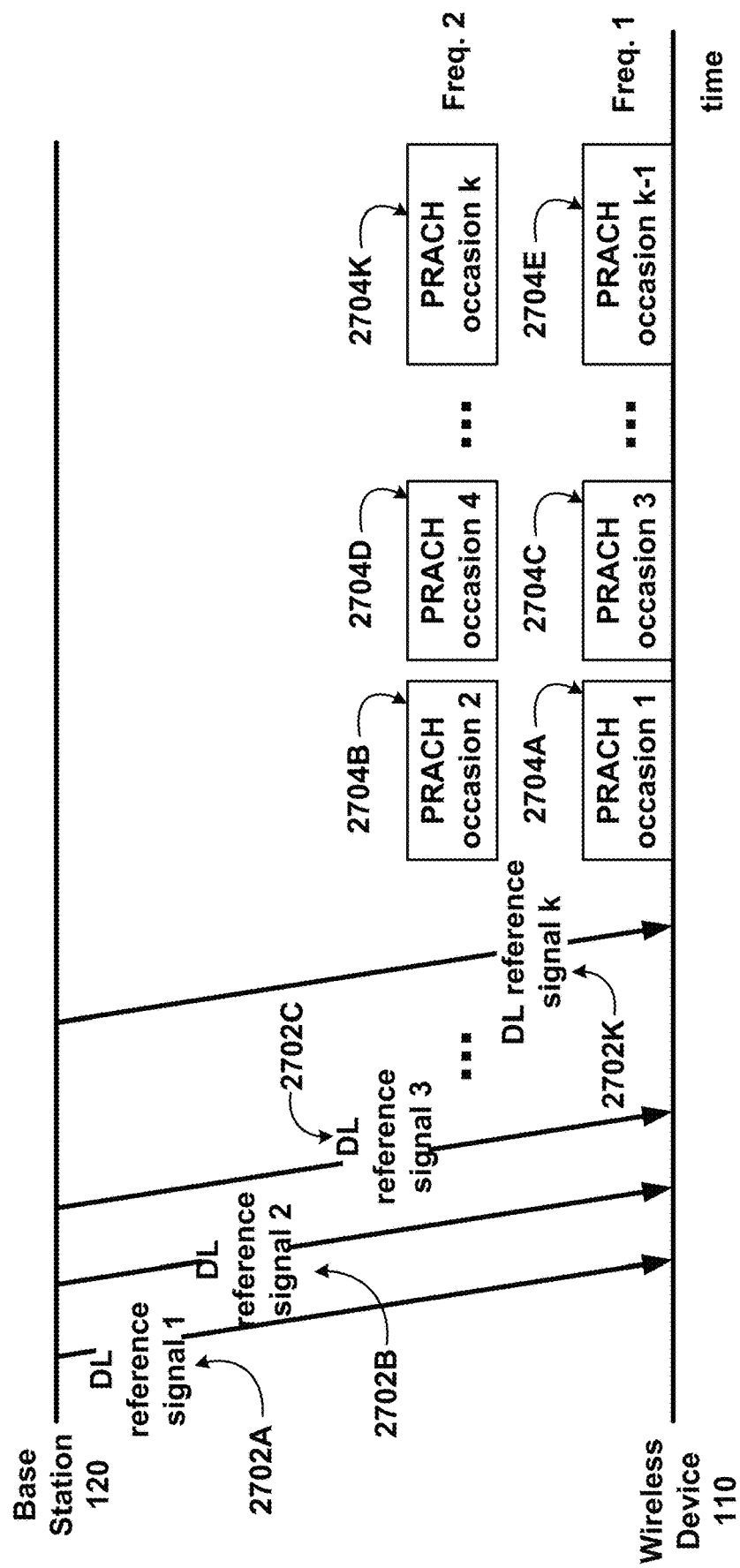
FIG. 27 shows example associations between downlink reference signals and random access resource occasions.

A POWER_RAMPING_COUNTER may not be increased, for example, if a preamble is not sent (e.g., due to LBT failure). An LBT failure indication or equivalent (e.g., for other LBT outcome dependencies) from PHY may be used. A wireless device (e.g., a MAC entity of a wireless device) may return to a resource selection step, for example, if LBT fails for a Msg1 transmission opportunity or opportunities. Multiple Msg1 transmissions may not be supported, for example, from a MAC perspective. Lack of multiple msg 1 transmissions support may not preclude beam sweeping enhancement (e.g., for NR or other technologies). An actual transmission for Msg1 (e.g., an LBT success) may be used for starting a RAR window FIG. 27 shows an example of an association between downlink reference signals and random access resource (e.g., PRACH) occasions. A base station 120 may send a plurality (e.g., a burst, such as up to K quantity) of DL reference signals 2702A-2702K. A wireless device 110 may select one or more random access resources (e.g., PRACH occasions 2704A-2704K that may each correspond to at least one of a K quantity of DL reference signals 2702A-2702K) to attempt a random access procedure (e.g., send a random access preamble). The wireless device 110 may perform the random access procedure on a first available (e.g., clear) random access resource.

An association between a DL reference signal and random access resources (e.g., PRACH occasions) may be one-to-one mapping and/or multi-to-one mapping between DL reference signals and random access resource occasions (e.g., PRACH occasions). A wireless device 110 may measure k DL reference signals. A wireless device 110 may select DL reference signal 1 2702A, DL reference signal 2 2702B, and DL reference signal 3 2702C. The wireless device 110 may perform up to a particular quantity of LBT procedures (e.g., at most 3 LBTs). Each LBT procedure may be performed prior to each of the selected random access resource occasions (e.g., PRACH occasions), for example, if random access resource occasion (e.g., PRACH occasion) 1 2704A, random access resource occasion (e.g., PRACH occasion) 2 2704B, and random access resource occasion (e.g., PRACH occasion) 3 2704C are associated with DL reference signal 1 2702A, DL reference signal 2 2702B, and DL reference signal 3 2702C, respectively.

A type of LBT may be pre-defined and/or semi-statically by a base station. A base station may indicate a type of LBT of random access resource occasions (e.g., PRACH occasions) in a RACH configuration. The type may be one of CAT 1, CAT 2, CAT 3, CAT 4 (or long LBT and/or short LBT).

A wireless device may send (e.g., transmit) one or more preambles via the first random access resource occasion (e.g., PRACH occasion). The wireless device may not perform one or more LBT procedures in other random access resource occasions (e.g., PRACH occasions) that may be available after the first random access resource occasions (e.g., PRACH occasions) in the same PRACH burst, for example, if an LBT success occurs (e.g., channel is idle) in a first random access resource occasion (e.g., PRACH occasion). The wireless device may not perform another LBT procedure on random access resource occasion (e.g., PRACH occasion) 3 2704C, for example, if the wireless device selects random access resource occasion (e.g., PRACH occasion) 1 2704A and a random access resource occasion (e.g., PRACH occasion) 3 2704C, and an LBT procedure on random access resource occasion (e.g., PRACH occasion) 1 2704A is successful. The wireless device may perform one or more LBT procedures prior to each of random access resource occasions (e.g., PRACH occasions) in a first frequency (e.g., Freq. 1) at least until an LBT procedure is successful, for example, if a wireless device selects all random access resource occasions (e.g., PRACH occasions) in the first frequency (e.g., Freq. 1 in FIG. 27). The wireless device may send (e.g., transmit) one or more preambles associated with a random access resource occasion (e.g., PRACH occasion) if the LBT procedure is successful, for example, based on or in response to the LBT procedure being successful.

A wireless device may perform an LBT procedure for the one or more random access resource occasions (e.g., PRACH occasions) FDM-ed, which may be firstly available and/or may be randomly selected, for example, if one or more random access resource occasions (e.g., PRACH occasions) are frequency domain multiplexed (FDM-ed), e.g., random access resource occasion (e.g., PRACH occasion) 1 2704A and random access resource occasion (e.g., PRACH occasion) 2 2704B. A wireless device may (e.g., based on RSRPs of DL reference signals) select random access resource occasion (e.g., PRACH occasion) 1 2704A and random access resource occasion (e.g., PRACH occasion) 2 2704B FDM-ed. The wireless device may perform LBT procedure(s) on random access resource occasion (e.g., PRACH occasion) 1 2704A and random access resource occasion (e.g., PRACH occasion) 2 2704B. The wireless device may randomly select one of these random access resource occasions, for example, if both LBT procedures are successful. The wireless device may select an available random access resource occasion first in time domain, for example, if both LBT procedures are successful. The wireless device may select a random access resource occasion corresponding to a DL reference signal having an RSRP that is greater than other DL reference signals, for example, if both LBT procedures are successful. Random access resource occasion (e.g., PRACH occasion) 1 2704A and random access resource occasion (e.g., PRACH occasion) 2 2704B may be FDM-ed within a threshold (e.g., less than a bandwidth threshold). The wireless device may perform a wideband LBT procedure that may cover a frequency range of random access resource occasion (e.g., PRACH occasion) 1 2704A and random access resource occasion (e.g., PRACH occasion) 2 2704B. The wireless device may select one of the random access resource occasions (e.g., PRACH occasions) based on: a random selection, time location of random access resource occasions (e.g., PRACH occasions), and/or RSRPs of corresponding DL reference signals, for example, if the wideband LBT procedure is successful.

A wireless device may perform a long LBT on a first random access resource occasion (e.g., PRACH occasion) firstly available. The wireless device may perform a short LBT on a second random access resource occasion (e.g., PRACH occasion) following (e.g., after) the first random access resource occasion (e.g., PRACH occasion), for example, if the LBT on the first random access resource occasion (e.g., PRACH occasion) fails (e.g., a long LBT procedure for random access resource occasion (e.g., PRACH occasion) 1 2704A fails and/or a short LBT procedure for random access resource occasion (e.g., PRACH occasion) 3 2704C fails). A type of LBT procedure on the second random access resource occasion (e.g., PRACH occasion) may be configured by a base station. A type of LBT procedure on the second random access resource occasion (e.g., PRACH occasion) may be determined by a time difference of two random access resource occasions (e.g., PRACH occasions). The first random access resource occasion (e.g., PRACH occasion) and the second random access resource occasion (e.g., PRACH occasion) may have a guard time less than a threshold (e.g., configurable or pre-defined, such as 25 µs, 16 µs, or any other duration). The wireless device may perform a short LBT procedure on the second random access resource occasion (e.g., PRACH occasion), for example, if the first random access resource occasion and the second random access resource occasion have a guard time less than a threshold. The wireless device may perform a long LBT procedure, for example, if the first random access resource occasion and the second random access resource occasion have a guard time greater than or equal to the threshold.

Figure 28:
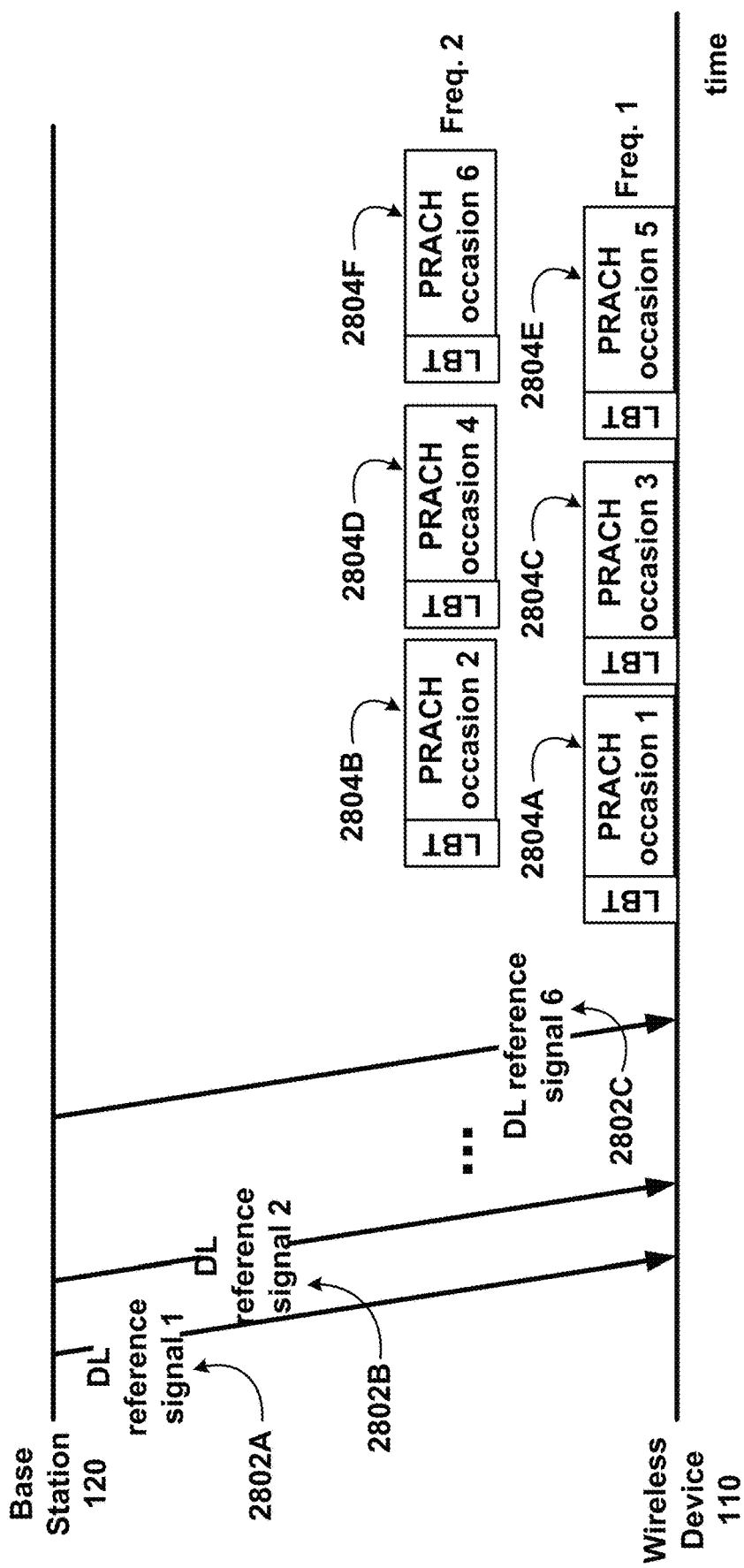
FIG. 28 shows example associations between downlink reference signals and one or more random access resource occasion configurations with listen before talk (LBT).

FIG. 28 shows example associations between downlink reference signals and one or more random access resource occasion configurations. A base station 120 may send (e.g., transmit) two or more DL reference signals 2802A-2802C that may be associated with two or more random access resource occasions (e.g., PRACH occasions) 2804A-2804F. The two or more random access resource occasions may be for transmissions via two or more frequency bands. A wireless device 110 may select two or more random access resource occasions (e.g., PRACH occasions) based on measurements of the two or more DL reference signals 2802A-2802C. The wireless device 110 may perform an LBT procedure before each selected random access resource occasion, for example, at least until successful or until an LBT procedure before each of the selected random access resource occasions have failed. The wireless device 110 may perform a random access procedure on a random access resource occasion associated with a successful LBT procedure. The two or more random access resource occasions (e.g., PRACH occasions) 2804A-2804F may not be aligned.

A wireless device may select two or more random access resource occasions (e.g., PRACH occasions), for example, based on RSRPs of DL reference signals. A wireless device may select random access resource occasion (e.g., PRACH occasion) 1 2804A, random access resource occasion (e.g., PRACH occasion) 2 2804B, and/or random access resource occasion (e.g., PRACH occasion) 3 2804C. The wireless device may perform a first LBT procedure on a first random access resource occasion (e.g., PRACH occasion) available firstly in time (e.g., random access resource occasion (e.g., PRACH occasion) 1 2804A). The wireless device may determine a second LBT procedure on a second random access resource occasion (e.g., PRACH occasion), for example, based on the first LBT procedure. The wireless device may send (e.g., transmit) a preamble via the first random access resource occasion (e.g., PRACH occasion), for example, if the first LBT procedure was successful. The wireless device may determine to perform a second LBT procedure on a second random access resource occasion (e.g., PRACH occasion) available firstly after the first random access resource occasion (e.g., PRACH occasion) (e.g., random access resource occasion (e.g., PRACH occasion) 2 2804B), for example, if the first LBT procedure was not successful. The wireless device may perform a third LBT procedure on a third random access resource occasion (e.g., PRACH occasion), for example, if the second LBT procedure on the second random access resource occasion (e.g., PRACH occasion) has failed. The wireless device may perform a wideband LBT, for example, if one or more FDM-ed random access resource occasions (e.g., PRACH occasions) are configured within a guard time less than a threshold. The wireless device may perform LBT procedures on the one or more FDM-ed random access resource occasions (e.g., PRACH occasions). A wireless device may send (e.g., transmit) a plurality of preambles via a plurality of random access resource occasions (e.g., PRACH occasions).

Figure 29:
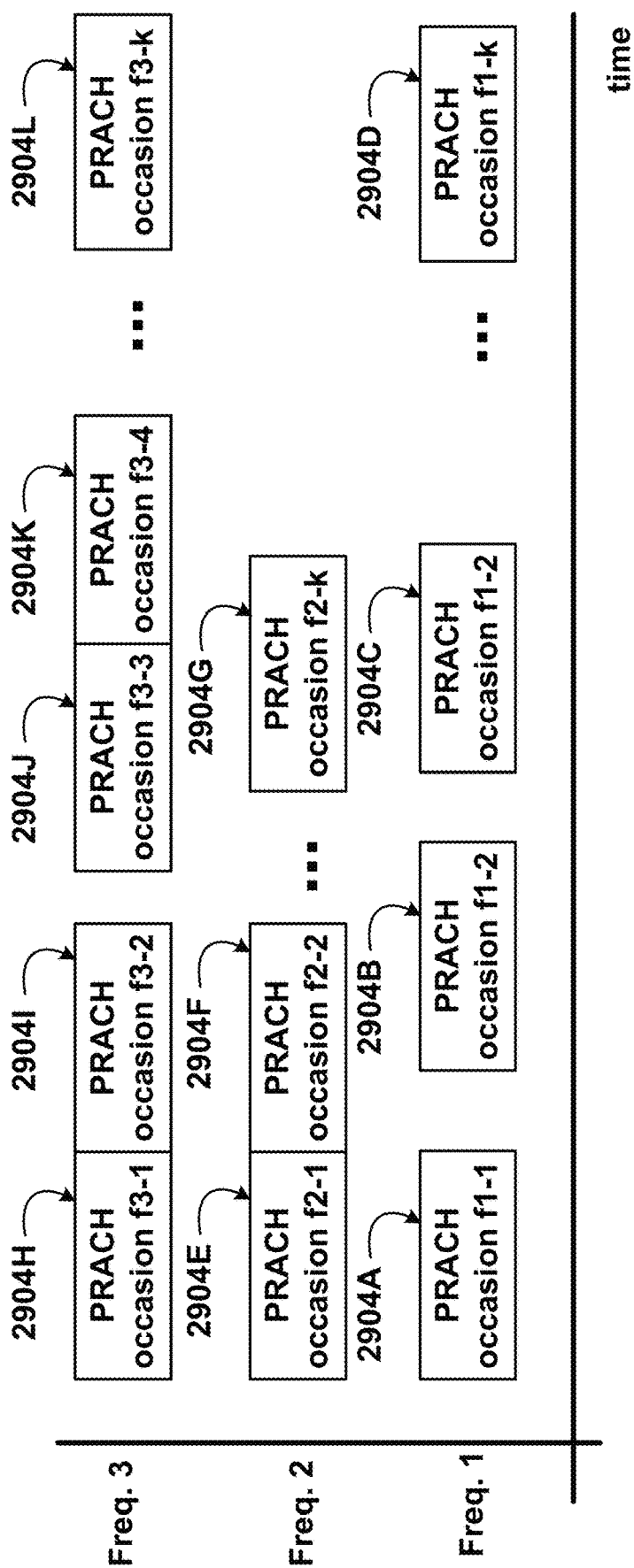
FIG. 29 shows an example one or more random access resource occasion configurations.

FIG. 29 shows an example one or more random access resource occasion configurations (e.g., PRACH occasions). The random access resource occasions may be separated by time and/or frequencies (e.g., TDM-ed and/or FDM-ed). The random access resource occasions may be separated by gaps (e.g., PRACH occasions 2904A-2904D via freq. 1). The random access resources may not be separated by gaps (e.g., PRACH occasions 2904E-2904G via freq. 2). Groups of random access resources occasions may be separated by gaps (e.g., PRACH occasions 2904H-2904L via freq. 3). The random access resources occasions may occur in different frequencies (e.g., PRACH occasions 2904A-2904D via freq. 1, PRACH occasions 2904E-2904G via freq. 2, and/or PRACH occasions 2904H-2904L via freq. 3).

Random access resource occasions (e.g., PRACH occasions) may be time division multiplexed (TDM-ed) with a guard time (e.g., a time difference or gap), for example, via Freq 1. A wireless device may perform an LBT procedure in each random access resource occasion (e.g., PRACH occasion) in a first frequency (e.g., Freq. 1). For example, for multiple preamble transmissions. A wireless device may perform a long LBT procedure and/or short LBT procedure, for example, depending on the guard time between two random access resource occasions (e.g., PRACH occasions). A wireless device may perform a short LBT procedure (or no LBT procedure) on a random access resource occasion (e.g., PRACH occasion) available later than the other, for example, if the guard time (e.g., time difference) is less than a threshold (25 µs, 16 µs, or any other duration). The wireless device may perform a long LBT procedure, for example, if the guard time (e.g., time difference) is greater than or equal to the threshold. A type of LBT procedure in each random access resource occasion (e.g., PRACH occasion) may be configured by an RRC message. A type of LBT procedure in each random access resource occasion (e.g., PRACH occasion) may be determined by a wireless device by comparing with a guard time between random access resource occasions (e.g., PRACH occasions) and the threshold.

One or more random access resource occasions (e.g., PRACH occasions) may be TDM-ed without a guard time (or less than a threshold), for example, via a second frequency (e.g., Freq 2 in FIG. 29). A wireless device may perform an LBT procedure on the first random access resource occasion (e.g., PRACH occasion) that occurs firstly among the selected random access resource occasions (e.g., PRACH occasions) via the second frequency (e.g., Freq 2).

A wireless device may avoid performing an LBT procedure if the LBT on the first random access resource occasion (e.g., PRACH occasion) was successful, for example, for subsequent random access resource occasions (e.g., PRACH occasions) followed by the first random access resource occasion (e.g., PRACH occasion) via the second frequency (e.g., Freq 2). The LBT procedure on the first random access resource occasion (e.g., PRACH occasion) may be a long LBT procedure. An LBT procedure on subsequent random access resource occasions (e.g., PRACH occasions) may be a short LBT procedure if the LBT on the first random access resource occasion (e.g., PRACH occasion) was successful. A wireless device may perform a long LBT or a short LBT, for example, if the selected random access resource occasions (e.g., PRACH occasions) are not contiguous in time. A type of LBT may be configured by a base station and/or determined based on a time difference of the selected random access resource occasions (e.g., PRACH occasions) that may be non-contiguous. One or more random access resource occasions (e.g., PRACH occasions) may be grouped without a guard time, for example, via a third frequency (e.g., Freq 3 in FIG. 29). There may be a guard time between two groups as shown in random access resource occasion (e.g., PRACH occasion) f3-2 2904I and random access resource occasion (e.g., PRACH occasion) f3-3 2904J in FIG. 29. Similar procedures for determining an LBT procedure via a second frequency (e.g., Freq. 2) and via a first frequency (e.g., Freq. 1) may be applied to the grouped PRACH occasions via the first frequency (e.g., Freq. 3), for example, using no LBT procedure, a long LBT procedure, or a short LBT procedure, for example, based on gaps and/or timing.

A wireless device may send (e.g., transmit), via a random access resource occasion (e.g., PRACH occasion), a preamble (e.g., dedicated preamble or a preamble selected (e.g., randomly selected from a plurality of preambles) that may be configured by a base station (e.g., if an LBT procedure is successful), for example, if a wireless device identifies at least on clear channel based on the LBT procedure. The wireless device may start to monitor a PDCCH channel for an RAR during an RAR window, for example, after or in response to sending the preamble. The wireless device may perform one or more preamble transmission attempts before starting the RAR window, for example, depending on one or more result(s) of one or more LBT procedures. For example, the wireless device may attempt a preamble transmission based on or in response to performing an LBT procedure. The wireless device may attempt another preamble transmission based on or in response to the LBT procedure having failed (e.g., a channel may be busy). The wireless device may send (e.g., transmit) one preamble (e.g., may not perform multiple preamble transmissions), for example, before starting the RAR window. A start timing of the RAR window may be determined based on time index of the random access resource occasion (e.g., PRACH occasion) and/or an offset (e.g., 3 TTIs predefined and/or semi-statically configured).

A wireless device may receive, from a base station, a message comprising configuration parameters indicating: a plurality of reference signals; one or more preambles; an association between the plurality of reference signals and the one or more preambles; and/or a first threshold. The wireless device may select a plurality of first reference signals of the plurality of reference signals, wherein received signal strengths of the plurality of first reference signals may be greater than the first threshold. The wireless device may perform a first LBT procedure corresponding to a first transmission of a first preamble, wherein the first preamble may be associated with at least a first one of the plurality of first reference signals. The wireless device may perform (e.g., based on or in response to a failure of the first listen-before-talk) a second LBT procedure corresponding to a second transmission of a second preamble, wherein the second preamble may be associated with at least second one of the plurality of first reference signals. The wireless device may send (e.g., transmit) the second preamble, for example, based on or in response to a success of the second LBT procedure.

A wireless device may start to monitor a downlink control channel, for example, based on or in response to sending the second preamble. The one or more reference signals may be synchronization signals. The one or more reference signals may be channel state information reference signals. The configuration parameters may indicate: one or more random access channels; and/or an association between the one or more reference signals and the one or more random access channels. A first radio channel via which the first LBT procedure was performed may be TDM-ed with a second radio channel. A first radio channel via which the first LBT procedure was performed may be FDM-ed with a second radio channel. A first radio channel via which the first LBT was performed may be TDM-ed and FDM-ed with a second radio channel. The second preamble may be sent via a random access channel associated with the at least second one of the plurality of reference signals. The first LBT procedure may be one of a CAT1, CAT2, CAT3, and/or CAT4. The second LBT procedure may be one of a CAT1, CAT2, CAT3, and/or CAT4.

Figure 30:
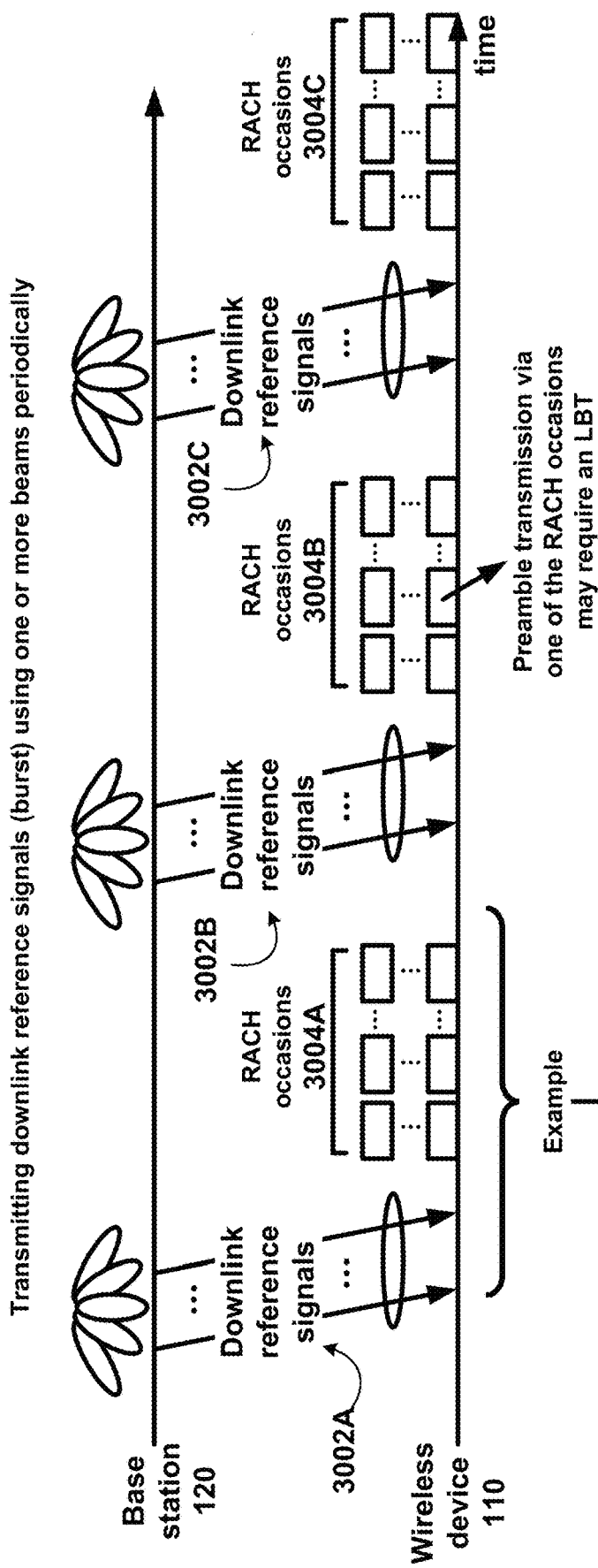
FIG. 30 shows an example of multiple bursts of downlink reference signals and random access resource occasions (e.g., PRACH occasions).

FIG. 30 shows an example of multiple bursts of downlink reference signals and random access resource occasions (e.g., PRACH occasions). A base station 120 may send a plurality (e.g., a burst) of downlink reference signals 3002A. A wireless device 110 may measure one or more of the downlink reference signals 3002A. The plurality of downlink reference signals 3002A may be associated with a plurality of RACH occasions 3004A. The wireless device 110 may select one or more RACH occasions 3004A, for example, based on the measurement of the one or more of the downlink reference signals 3002A. The wireless device may attempt to use RACH occasions from the selected one or more RACH occasions for a random access procedure. The wireless device may repeat the process with a next plurality of reference signals 3002B, for example, if not successful. The operation of a base station sending a plurality of downlink reference signals (e.g., 3002A, 3002B, 3002C, etc.) that reference a plurality of RACH occasions (e.g., 3004A, 3004B, 3004C, etc.) may repeat (e.g., periodically, aperiodically, etc.).

Figure 31:
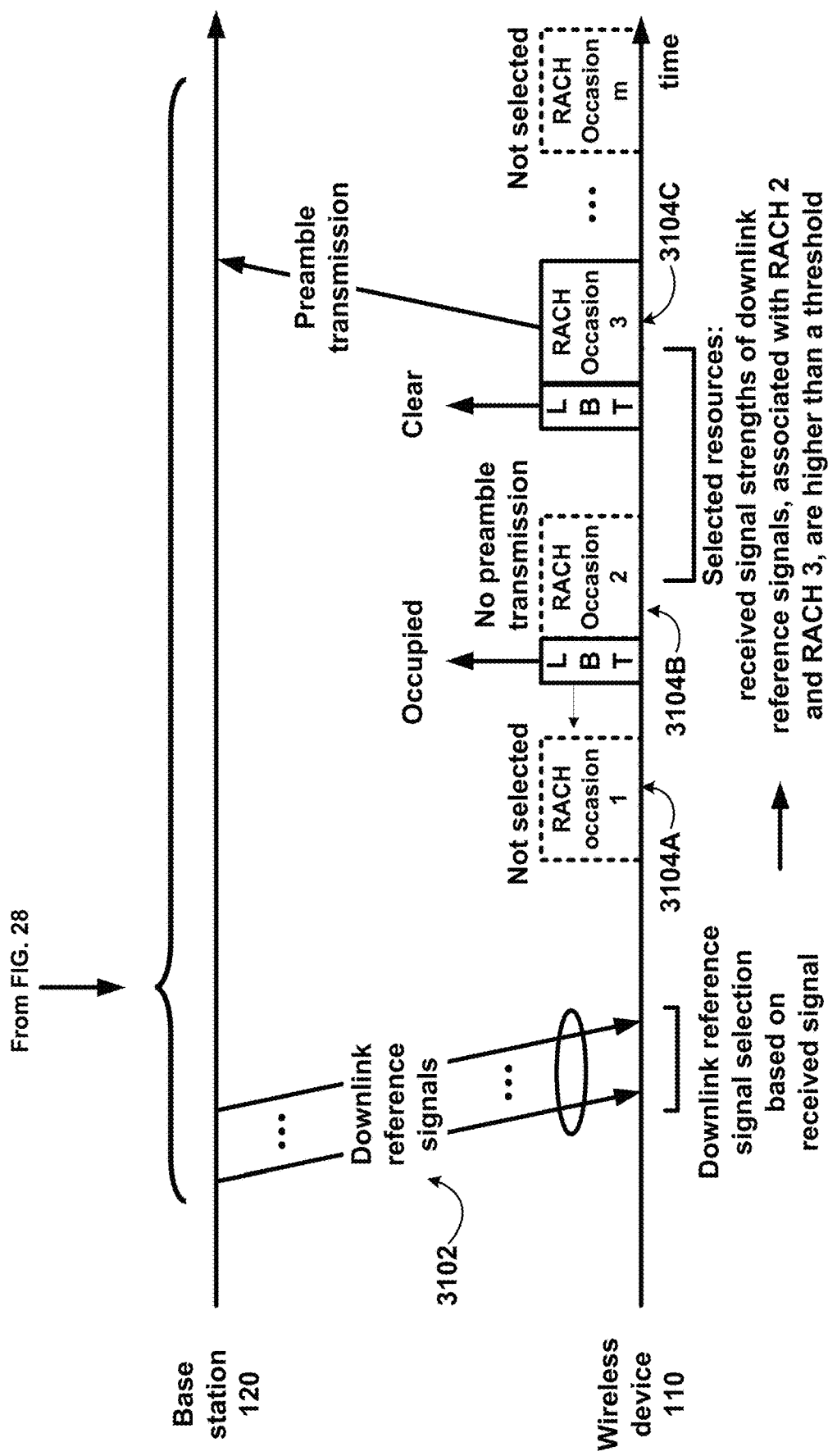
FIG. 31 shows an example of a burst of downlink reference signals with associated random access resource occasions (e.g., PRACH occasions).

FIG. 31 shows an example of a burst of downlink reference signals with associated random access resource occasions (e.g., PRACH occasions). A base station 120 may send a plurality of downlink reference signals 3102 that may correspond to random access resource occasions (e.g., RACH occasions 3104A-3104C). A wireless device 110 may select random access resource occasions (e.g., RACH occasions 3104B and 3104C), for example, based on measurements of the plurality of downlink reference signals 3102 (e.g., the received signal strengths of downlink reference signals associated with RACH occasions 3104B and 3104C are above a threshold). The wireless device 110 may skip a first random access resource occasion (e.g., PRACH occasion 3104A), for example, if it was not selected. The wireless device 110 may perform an LBT procedure before or during a second random access resource occasion (e.g., RACH occasion 2 3104B), and the wireless device 110 may determine that the medium is occupied or busy. The wireless device 110 may perform an LBT procedure, for example, before or during a third random access resource occasion (e.g., RACH occasion 3 3104C), and the wireless device may determine that the medium is clear. The wireless device 110 may send a preamble to the base station 120, for example, during the third random access resource occasion (e.g., RACH occasion 3 3104C).

Figure 32:
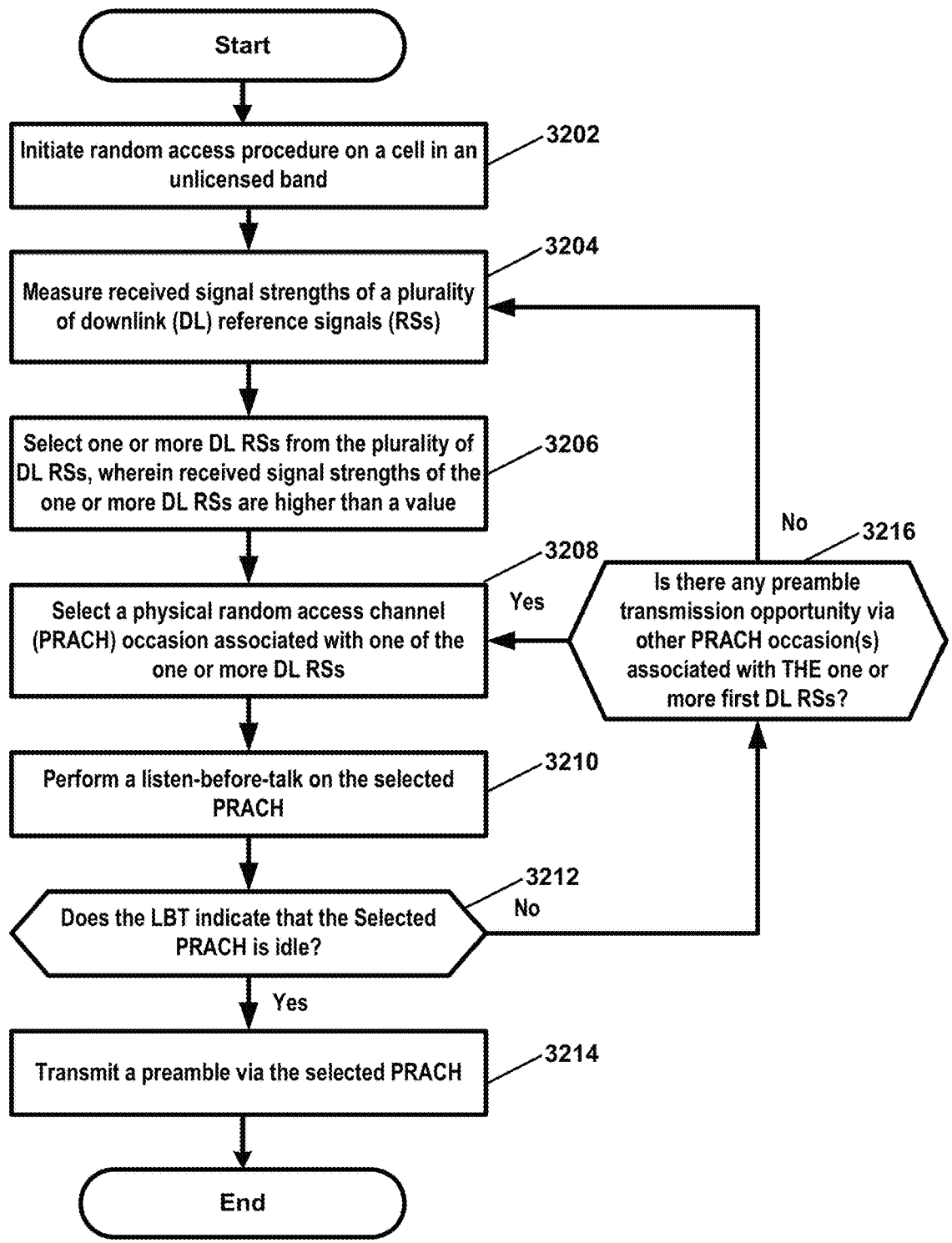
FIG. 32 shows an example of a method of selecting a random access resource occasion (e.g., PRACH occasion) from a set of random access resource occasions (e.g., PRACH occasions).

FIG. 32 shows an example of a method of selecting a random access resource occasion (e.g., PRACH occasion) from a set of random access resource occasions (e.g., PRACH occasions). The method may be performed by a wireless device. The method may be performed by systems such as those shown in FIG. 1, among others, including base stations 120 and wireless devices 110. At step 3202, a wireless device may initiate a random access procedure on a cell in an unlicensed band. At step 3204, the wireless device may measure received signal strengths of a plurality of downlink (DL) reference signals (RSs). At step 3206, the wireless device may select one or more DL RSs from the plurality of DL RSs, wherein received signal strengths of the one or more DL RSs may be greater than a value or threshold. At step 3208, the wireless device may select a physical random access channel (PRACH) occasion associated with one of the one or more DL RSs. At step 3210, the wireless device may perform an LBT procedure on the selected PRACH. At step 3212, the wireless device may determine whether (e.g., if) the LBT indicates that the selected PRACH is clear (e.g., idle, unoccupied, not busy or available). If yes at step 3212, at step 3214 the wireless device may send (e.g., transmit) a preamble via the selected PRACH. If no at step 3212, at step 3216 the wireless device may determine whether (e.g., if) there is any preamble transmission opportunity via other random access resource occasion(s) (e.g., PRACH occasion) associated with the one or more first DL RSs. If yes at step 3216, the wireless device may repeat step 3208 and further via another random access resource occasion (e.g., PRACH occasion). If no at step 3216, the wireless device may return to step 3204 and await new DL RSs.

Figure 33:
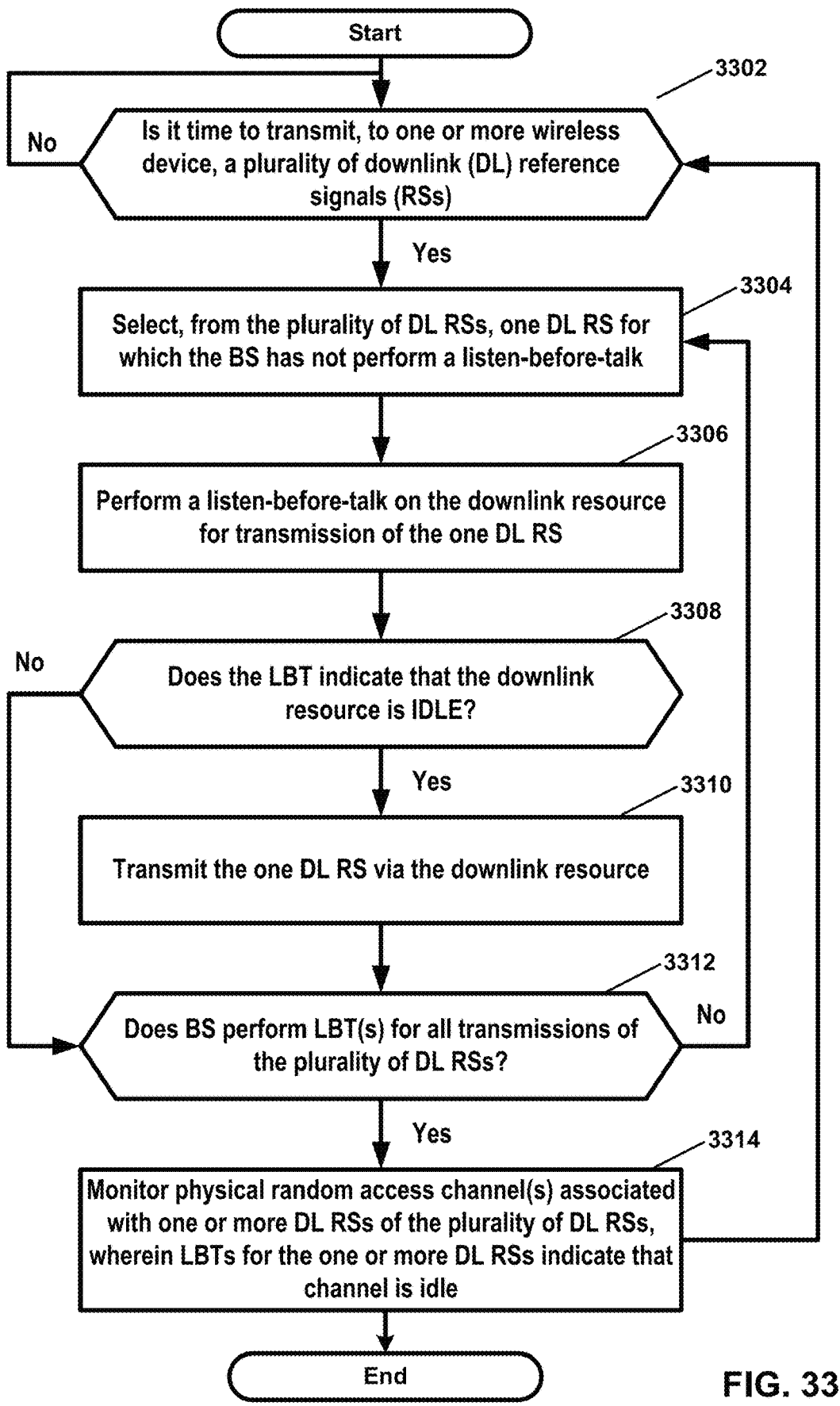
FIG. 33 shows an example of a method of providing a set of random access resource occasions (e.g., PRACH occasions) for a random access procedure.

FIG. 33 shows an example of a method of providing a set of random access resource occasions (e.g., PRACH occasions) to a mobile device for a random access procedure. The method may be performed by a base station. The method may be performed by systems such as those shown in FIG. 1, among others, including base stations 120 and wireless devices 110. At step 3302, a base station may determine whether it may begin to send (e.g., transmit), to one or more wireless devices, a plurality of downlink (DL) reference signals (RSs). If yes at step 3302, at step 3304 the base station may select, from the plurality of DL RSs, one DL RS for which the BS has not perform an LBT procedure. At step 3306, the base station may perform an LBT procedure on the downlink resource for transmission of the one DL RS. At step 3308, the base station may determine whether (e.g., if) the LBT indicates that the downlink resource is clear (e.g., idle, unoccupied, not busy or available). If yes at step 3308, at step 3310 the base station may send (e.g., transmit) the one DL RS via the downlink resource. At step 3312, the base station may determine whether (e.g., if) it is configured to perform LBT procedure(s) for all transmissions of the plurality of DL RSs. If yes at step 3312, at step 3314, the base station may monitor physical random access channel(s) associated with one or more DL RSs of the plurality of DL RSs, wherein LBT procedures for the one or more DL RSs may indicate that channel is idle. The base station may return to step 3302 and/or repeat the process.

Alternatively, if no at step 3302, the base station may repeat step 3302, for example, at least until the base station determines that it may be time to send (e.g., transmit), to one or more wireless devices, a plurality DL RSs. Alternatively, if no at 3308, the base station may skip step 3310 and/or may go to step 3312 to determine, for example, if the base station may perform LBT procedure(s) for all transmissions of the plurality of DL RSs. Alternatively, if no at step 3312, the base station may return to step 3304, for example, to select, from the plurality of DL RSs, a DL RS for which the BS may not have performed an LBT procedure.

A wireless device may perform a method comprising multiple operations. The wireless device may receive a plurality of downlink reference signals of a cell. The wireless device may determine a first physical random access channel (PRACH) resource of a first PRACH, wherein the first PRACH is associated with a first downlink reference signal of the plurality of downlink reference signals. The wireless device may determine, based on a first listen-before-talk (LBT) procedure, that the first PRACH resource is occupied. The wireless device may determine a second PRACH resource from a second PRACH, wherein the second PRACH is associated with a second downlink reference signal of the plurality of downlink reference signals. The wireless device may transmit a preamble via the second PRACH resource based on a second LBT procedure indicating that the second PRACH resource is clear.

The wireless device may also perform one or more additional operations or include additional elements in conjunction with the described method. The first PRACH may be the same as the second PRACH. The first downlink reference signal may be the same as the second downlink reference signal. The wireless device may receive a radio resource control message indicating a first value. The wireless device may determine the first downlink reference signal, based on a first received signal strength of the first downlink reference signal being greater than the first value. The wireless device may determine the second downlink reference signal, based on a second received signal strength of the second downlink reference signal being greater than the first value. The wireless device may receive first parameters based on which the wireless device generates a plurality of preambles. Each of the plurality of downlink reference signals may comprises at least one of a synchronization signal and physical broadcast channel block (SSB), or a channel state information reference signal (CSI RS). The wireless device may receive a radio resource control message indicating that the cell comprises: a downlink carrier, an uplink carrier, and a supplementary uplink carrier, and/or a second value. The wireless device may select at least one of the uplink carrier or the supplementary uplink carrier based on a third received signal strength of one of the plurality of downlink reference signals. The wireless device may select the uplink carrier, based on the third received signal strength being greater than the second value. The wireless device may select the supplementary uplink carrier, based on the third received signal strength being less than or equal to the second value. The wireless device may receive a radio resource control message comprising beam failure recovery configuration parameters indicating a candidate beam reference signal list, and/or a preamble identifier of the preamble. The candidate beam reference signal list may comprise an identifier of each of the plurality of downlink reference signals. The wireless device may initiate a random access procedure for a beam failure recovery. The wireless device may start a beam failure recovery timer, based on beam failure recovery configuration parameters comprising a third value for a beam failure recovery timer. The determining the first PRACH resource may be based on a beam failure recovery timer running, if the beam failure recovery configuration parameters comprise a third value of a beam failure recovery timer, or the beam failure recovery configuration parameters not comprising a third value of a beam failure recovery timer. The wireless device may monitor a downlink control channel for a response to the preamble. The wireless device may monitor the downlink control channel during a time interval, based on or in response to the transmitting the preamble. The wireless device may determine a quantity of preamble transmissions, based on transmitting the preamble. The quantity of preamble transmissions may no bet updated based on the first LBT procedure indicating that the first PRACH is occupied. The wireless device may select the preamble randomly from a plurality of preambles. The first PRACH and the second PRACH may be located in different frequencies. The cell may be a primary cell or a secondary primary cell.

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to send the plurality of downlink reference signals of the cell. A computer-readable medium may store instructions that, when executed, cause performance of the described method, additional operations and/or include the additional elements.

A wireless device may perform a method comprising multiple operations. The wireless device may receive at least one radio resource control message indicating a first value, and a plurality of downlink reference signals of a cell. The wireless device may determine, from the plurality of downlink reference signals, a first downlink reference signal and a second downlink reference signal. A first received signal strength of the first downlink reference signal and a second received signal strength of the second downlink reference signal may be greater than the first value. The wireless device may determine a first random access channel (RACH) associated with the first downlink reference signal. The wireless device may determine a second RACH associated with the second downlink reference signal, based on a first listen-before-talk (LBT) procedure indicating that the first RACH is occupied. The wireless device may transmit a preamble via the second RACH, based on a second LBT procedure indicating that the second RACH is clear.

The wireless device may also perform one or more additional operations or include additional elements in conjunction with the described method. The first RACH may be the same as the second RACH. The first downlink reference signal may be the same as the second downlink reference signal. The wireless device may determine the first downlink reference signal, based on the first received signal strength of the first downlink reference signal being greater than the first value. The wireless device may determine the second downlink reference signal, based on the second received signal strength of the second downlink reference signal being greater than the first value. The wireless device may select a first RACH occasion for the first LBT procedure, based on the determining of the first downlink reference signal. The wireless device may select a second RACH occasion for the second LBT procedure, based on the determining of the second downlink reference signal. The wireless device may receive first parameters based on which the wireless device generates a plurality of preambles. Each of the plurality of downlink reference signals may comprise at least one of: a synchronization signal and physical broadcast channel block (SSB), or a channel state information reference signal (CSI RS). The wireless device may receive a radio resource control message. The radio resource message may indicate that the cell comprises: a downlink carrier, an uplink carrier, and a supplementary uplink carrier, and/or a second value. The wireless device may select at least one of the uplink carrier or the supplementary uplink carrier, based on a third received signal strength of one of the plurality of downlink reference signals. The wireless device may select the uplink carrier, based on the third received signal strength being greater than the second value. The wireless device may select the supplementary uplink carrier, based on the third received signal strength being less than or equal to the second value. The wireless device may receive a radio resource control message comprising beam failure recovery configuration parameters indicating the first value, a candidate beam reference signal list, and/or a preamble identifier of the preamble. The candidate beam reference signal list may comprise an identifier of each of the plurality of downlink reference signals. The wireless device may initiate a random access procedure for a beam failure recovery. The wireless device may start a beam failure recovery timer, based on beam failure recovery configuration parameters comprising a third value for a beam failure recovery timer. Determining the first RACH may be based on a beam failure recovery timer running, if beam failure recovery configuration parameters comprise a third value of a beam failure recovery timer, or the beam failure recovery configuration parameters not comprising a third value of the beam failure recovery timer. The wireless device may monitor a downlink control channel for a response to the preamble. The wireless device may monitor the downlink control channel during a time interval, for example, based on or in response to the transmitting the preamble. The wireless device may determine a quantity of preamble transmissions, based on transmitting the preamble. The quantity of preamble transmissions may not be updated based on the first LBT procedure indicating that the first RACH is occupied. The wireless device may select the preamble randomly from the plurality of preambles. The first RACH and the second RACH may be located in different frequencies. The cell may be a primary cell or a secondary primary cell.

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to send the plurality of downlink reference signals of the cell. A computer-readable medium may store instructions that, when executed, cause performance of the described method, additional operations and/or include the additional elements.

A wireless device may perform a method comprising multiple operations. The wireless device may receive a plurality of downlink reference signals of a cell. The plurality of downlink reference signals may comprise a first downlink reference signal associated with a first random access. The wireless device may determine that a first received signal strength of the first downlink reference signal and a second received signal strength of the second downlink reference signal both exceed a first value. The wireless device may determine that the first RACH is occupied, for example, based on a first listen-before-talk (LBT) procedure. The wireless device may determine that the second RACH is clear, for example, based on the first RACH being occupied and a second LBT procedure. The wireless device may transmit, via the second RACH, a preamble.

The wireless device may also perform one or more additional operations or include additional elements in conjunction with the described method. The first RACH may be the same as the second RACH. The first downlink reference signal may be the same as the second downlink reference signal. The wireless device may receive a radio resource control message indicating the first value. The wireless device may determine the first downlink reference signal, for example, based on the first received signal strength of the first downlink reference signal being greater than the first value. The wireless device may determine the second downlink reference signal, based on the second received signal strength of the second downlink reference signal being greater than the first value. The wireless device may receive first parameters based on which a wireless device generates a plurality of preambles. Each of the plurality of downlink reference signals may comprise at least one of a synchronization signal and physical broadcast channel block (SSB), and/or a channel state information reference signal (CSI RS). The wireless device may receive a radio resource control message indicating that the cell comprises: a downlink carrier, an uplink carrier, and a supplementary uplink carrier. The wireless device may receive a radio resource control message indicating a second value. The wireless device may select at least one of the uplink carrier or the supplementary uplink carrier, for example, based on a third received signal strength of one of the plurality of downlink reference signals. The wireless device may select the uplink carrier, for example, based on the third received signal strength being greater than the second value. The wireless device may select the supplementary uplink carrier, based on the third received signal strength being less than or equal to the second value. The wireless device may receive a radio resource control message comprising beam failure recovery configuration parameters indicating the first value, a candidate beam reference signal list; and/or a preamble identifier of the preamble. The candidate beam reference signal list comprises an identifier of each of the plurality of downlink reference signals. The wireless device may comprise initiating a random access procedure for a beam failure recovery. The wireless device may start a beam failure recovery timer, for example, based on beam failure recovery configuration parameters comprising a third value for a beam failure recovery timer. The wireless device may determine the first RACH is based on a beam failure recovery timer running, if beam failure recovery configuration parameters comprise a third value of a beam failure recovery timer, and/or the beam failure recovery configuration parameters not comprising a third value of the beam failure recovery timer. The wireless device may monitor a downlink control channel for a response to the preamble. The wireless device may monitor the downlink control channel during a time interval, for example, in response to the transmitting the preamble. The wireless device may determine a quantity of preamble transmissions, for example, based on transmitting the preamble. The quantity of preamble transmissions may not be updated, for example, based on the first LBT procedure indicating that the first RACH is occupied. The wireless device may select the preamble randomly from a plurality of preambles. The first RACH and the second RACH may be located in different frequencies. The cell may be a primary cell or a secondary primary cell.

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to send the plurality of downlink reference signals of the cell. A computer-readable medium may store instructions that, when executed, cause performance of the described method, additional operations and/or include the additional elements.

Figure 34:
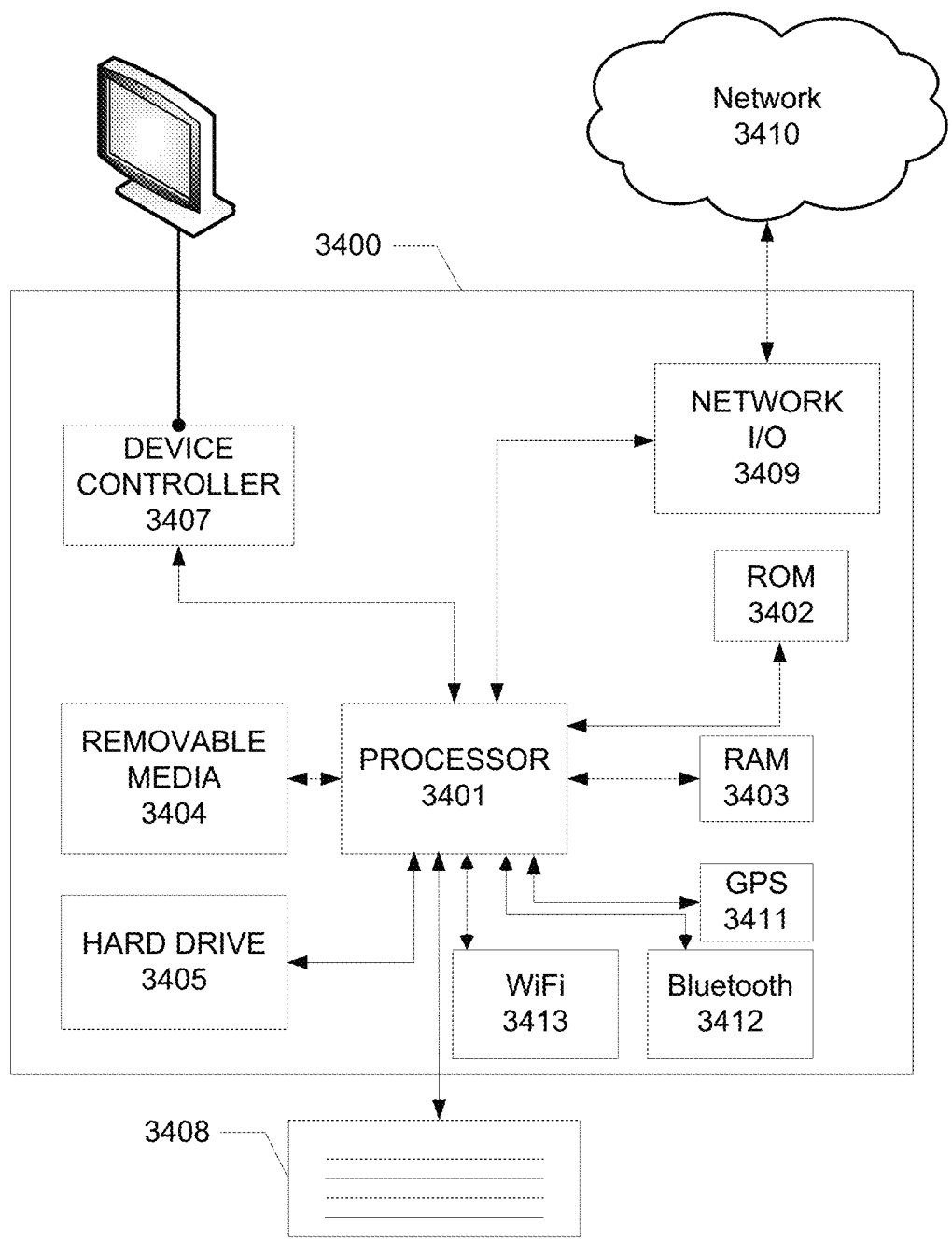
FIG. 34 shows example elements of a computing device that may be used to implement any of the various devices described herein.

FIG. 34 shows example elements of a computing device that may be used to implement any of the various devices described herein, including, e.g., the base station 122A and/or 122B, the wireless device 110 (e.g., 110A and/or 110B), or any other base station, wireless device, or computing device described herein. The computing device 3400 may include one or more processors 3401, which may execute instructions stored in the random access memory (RAM) 3403, the removable media 3404 (such as a Universal Serial Bus (USB) drive, compact disk (CD) or digital versatile disk (DVD), or floppy disk drive), or any other desired storage medium. Instructions may also be stored in an attached (or internal) hard drive 3405. The computing device 3400 may also include a security processor (not shown), which may execute instructions of one or more computer programs to monitor the processes executing on the processor 3401 and any process that requests access to any hardware and/or software components of the computing device 3400 (e.g., ROM 3402, RAM 3403, the removable media 3404, the hard drive 3405, the device controller 3407, a network interface 3409, a GPS 3411, a Bluetooth interface 3412, a WiFi interface 3413, etc.). The computing device 3400 may include one or more output devices, such as the display 3406 (e.g., a screen, a display device, a monitor, a television, etc.), and may include one or more output device controllers 3407, such as a video processor. There may also be one or more user input devices 3408, such as a remote control, keyboard, mouse, touch screen, microphone, etc. The computing device 3400 may also include one or more network interfaces, such as a network interface 3409, which may be a wired interface, a wireless interface, or a combination of the two. The network interface 3409 may provide an interface for the computing device 3400 to communicate with a network 3410 (e.g., a RAN, or any other network). The network interface 3409 may include a modem (e.g., a cable modem), and the external network 3410 may include communication links, an external network, an in-home network, a provider's wireless, coaxial, fiber, or hybrid fiber/coaxial distribution system (e.g., a DOCSIS network), or any other desired network. Additionally, the computing device 3400 may include a location-detecting device, such as a global positioning system (GPS) microprocessor 3411, which may be configured to receive and process global positioning signals and determine, with possible assistance from an external server and antenna, a geographic position of the computing device 3400.

The example in FIG. 34 may be a hardware configuration, although the components shown may be implemented as software as well. Modifications may be made to add, remove, combine, divide, etc. components of the computing device 3400 as desired. Additionally, the components may be implemented using basic computing devices and components, and the same components (e.g., processor 3401, ROM storage 3402, display 3406, etc.) may be used to implement any of the other computing devices and components described herein. For example, the various components described herein may be implemented using computing devices having components such as a processor executing computer-executable instructions stored on a computer-readable medium, as shown in FIG. 34. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
   receiving, by a wireless device, a plurality of downlink reference signals of a cell;
   determining a first physical random access channel (PRACH) resource of a first PRACH, wherein the first PRACH is associated with random access and a first downlink reference signal of the plurality of downlink reference signals of the cell;
   determining, based on a failure of a first listen-before-talk (LBT) procedure, that the first PRACH resource is occupied;
   determining, based on the failure of the first LBT procedure, a second PRACH resource of a second PRACH, wherein the second PRACH is associated with random access and a second downlink reference signal of the plurality of downlink reference signals of the cell; and
   based on a success of a second LBT procedure, transmitting, via the second PRACH resource a preamble for a random access procedure.

2. The method of claim 1, wherein:
   the first PRACH is the same as the second PRACH; and
   the first downlink reference signal is the same as the second downlink reference signal.

3. The method of claim 1, wherein each of the plurality of downlink reference signals of the cell comprises:
   a synchronization signal and physical broadcast channel block (SSB); or
   a channel state information reference signal (CSI RS).

4. The method of claim 1, further comprising:
   receiving a radio resource control message indicating:
      that the cell comprises: a downlink carrier, a normal uplink carrier, and a supplementary uplink carrier; and
      a threshold value; and
   selecting, based on a received signal strength of one of the plurality of downlink reference signals, at least one of the normal uplink carrier or the supplementary uplink carrier.

5. The method of claim 4, wherein the selecting comprises at least one of:
   selecting the normal uplink carrier, based on the received signal strength being greater than the threshold value; or
   selecting the supplementary uplink carrier, based on the received signal strength being less than or equal to the threshold value.

6. The method of claim 1, further comprising receiving a radio resource control message comprising beam failure recovery configuration parameters indicating:
   a candidate beam reference signal list; and
   a preamble identifier of the preamble.

7. The method of claim 1, wherein the determining the first PRACH resource is based on a value of a beam failure recovery timer.

8. A method comprising:
   receiving, by a wireless device:
      at least one radio resource control message indicating a first value; and
      a plurality of downlink reference signals of a cell;
   determining, from the plurality of downlink reference signals of the cell, a first downlink reference signal and a second downlink reference signal, wherein a first received signal strength of the first downlink reference signal and a second received signal strength of the second downlink reference signal are greater than the first value;

determining a first random access channel (RACH) associated with random access and the first downlink reference signal;

based on failure of a first listen-before-talk (LBT) procedure indicating that the first RACH is occupied, determining a second RACH associated with random access and the second downlink reference signal; and based on a success of a second LBT procedure, transmitting, via the second RACH a preamble associated with a random access procedure.

9. The method of claim 8, wherein:
the first RACH is the same as the second RACH; and
the first downlink reference signal is the same as the second downlink reference signal.

10. The method of claim 8, wherein each of the plurality of downlink reference signals of the cell comprises:
a synchronization signal and physical broadcast channel block (SSB); or
a channel state information reference signal (CSI RS).

11. The method of claim 8, further comprising:
receiving a radio resource control message indicating:
that the cell comprises: a downlink carrier, a normal uplink carrier, and a supplementary uplink carrier; and
a second value; and
based on a third received signal strength of one of the plurality of downlink reference signals, selecting at least one of the normal uplink carrier or the supplementary uplink carrier.

12. The method of claim 11, wherein the selecting comprises at least one of:
selecting the normal uplink carrier, based on the third received signal strength being greater than the second value; or
selecting the supplementary uplink carrier, based on the third received signal strength being less than or equal to the second value.

13. The method of claim 8, further comprising receiving a radio resource control message comprising beam failure recovery configuration parameters indicating:
the first value;
a candidate beam reference signal list; and
a preamble identifier of the preamble.

14. The method of claim 8, wherein the determining the first RACH is based on a value of a beam failure recovery timer.

15. A method comprising:
receiving a plurality of downlink reference signals of a cell, wherein the plurality of downlink reference signals comprises:
a first downlink reference signal of the plurality of downlink reference signals of the cell, wherein the first downlink reference signal is associated with a first random access channel (RACH), and wherein the first RACH is associated with random access; and
a second downlink reference signal of the plurality of downlink reference signals of the cell, wherein the first downlink reference signal is associated with a second RACH, and wherein the second RACH is associated with random access;

determining that a first received signal strength of the first downlink reference signal and a second received signal strength of the second downlink reference signal both exceed a first value;

determining, based on a failure of a first listen-before-talk (LBT) procedure, that the first RACH is occupied;

determining, based on the first RACH being occupied and based on a success of a second LBT procedure, that the second RACH is idle; and transmitting, via the second RACH, a preamble associated with a random access procedure.

16. The method of claim 15, wherein:
the first RACH is the same as the second RACH; and
the first downlink reference signal is the same as the second downlink reference signal.

17. The method of claim 15, wherein each of the plurality of downlink reference signals comprises:
a synchronization signal and physical broadcast channel block (SSB); or
a channel state information reference signal (CSI RS).

18. The method of claim 15, further comprising:
receiving a radio resource control message indicating:
that the cell comprises: a downlink carrier, a normal uplink carrier, and a supplementary uplink carrier; and
a second value; and
based on a third received signal strength of one of the plurality of downlink reference signals, selecting at least one of the normal uplink carrier or the supplementary uplink carrier.

19. The method of claim 18, wherein the selecting comprises at least one of:
selecting the normal uplink carrier, based on the third received signal strength being greater than the second value; or
selecting the supplementary uplink carrier, based on the third received signal strength being less than or equal to the second value.

20. The method of claim 15, further comprising receiving a radio resource control message comprising beam failure recovery configuration parameters indicating:
the first value;
a candidate beam reference signal list; and
a preamble identifier of the preamble.

21. The method of claim 15, wherein the determining the first RACH is based on a value of a beam failure recovery timer.

22. The method of claim 1, wherein the success of the second LBT procedure comprises not having received a failure indication for the second LBT procedure.

23. The method of claim 8, wherein the success of the second LBT procedure comprises not having received a failure indication for the second LBT procedure.

24. The method of claim 15, wherein the success of the second LBT procedure comprises not having received a failure indication for the second LBT procedure.

* * * * *

UNITED STATES PATENT AND TRADEMARK OFFICE
CERTIFICATE OF CORRECTION

PATENT NO. : 11,219,062 B2
APPLICATION NO. : 16/536788
DATED : January 4, 2022
INVENTOR(S) : Jeon et al.

It is certified that error appears in the above-identified patent and that said Letters Patent is hereby corrected as shown below:

On the Title Page

Page 2, Column 2, Other Publications, Line 52:
Delete "RZ-1701360," and insert --R2-1701360,-- therefor Page 3, Column 2, Other Publications, Line 57:
Delete "Universial" and insert --Universal-- therefor Page 4, Column 2, Other Publications, Line 52:
Delete "RZ-1700205," and insert --R2-1700205,-- therefor Page 4, Column 2, Other Publications, Line 55:
Delete "RZ-1700237," and insert --R2-1700237,-- therefor Page 4, Column 2, Other Publications, Line 55:
Delete "Z017," and insert --2017,-- therefor In the Specification Column 13, Detailed Description, Line 42:
After "station 2", insert --120B--

Column 28, Detailed Description, Line 3:
Delete "1119)." and insert --1118).-- therefor Column 41, Detailed Description, Line 65:
Delete "1 0" and insert --1_0-- therefor Column 49, Detailed Description, Line 17:
Delete "PREABLE" and insert --PREAMBLE-- therefor Signed and Sealed this
Thirteenth Day of June, 2023

Katherine Kelly Vidal
*Director of the United States Patent and Trademark Office*

CERTIFICATE OF CORRECTION (continued)
U.S. Pat. No. 11,219,062 B2

Column 52, Detailed Description, Line 19:
After "period", insert --.--

Column 62, Detailed Description, Line 43:
Delete "2640" and insert --2620-- therefor Column 62, Detailed Description, Line 44:
Delete "1120" and insert --120-- therefor Column 64, Detailed Description, Line 31:
After "window", insert --.--

In the Claims

Column 78, Claim 1, Line 23:
After "resource", insert --,--

Column 79, Claim 8, Line 13:
After "RACH", insert --,--